(12) United States Patent
Uchimura et al.

(10) Patent No.: US 11,330,226 B2
(45) Date of Patent: May 10, 2022

(54) INFORMATION PROCESSING APPARATUS, INFORMATION RECORDING MEDIUM AND INFORMATION PROCESSING METHOD

(71) Applicant: SONY CORPORATION, Tokyo (JP)

(72) Inventors: Kouichi Uchimura, Kanagawa (JP); Kenjiro Ueda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 214 days.

(21) Appl. No.: 16/478,958

(22) PCT Filed: Jan. 22, 2018

(86) PCT No.: PCT/JP2018/001781
§ 371 (c)(1),
(2) Date: Jul. 18, 2019

(87) PCT Pub. No.: WO2018/142985
PCT Pub. Date: Aug. 9, 2018

(65) Prior Publication Data
US 2020/0045263 A1 Feb. 6, 2020

(30) Foreign Application Priority Data

Feb. 1, 2017 (JP) .............................. JP2017-016462
Mar. 9, 2017 (JP) .............................. JP2017-044975

(51) Int. Cl.
*H04N 5/913* (2006.01)
*H04N 21/433* (2011.01)
(Continued)

(52) U.S. Cl.
CPC ........... *H04N 5/913* (2013.01); *H04N 21/435* (2013.01); *H04N 21/4334* (2013.01);
(Continued)

(58) Field of Classification Search
None
See application file for complete search history.

(56) References Cited

U.S. PATENT DOCUMENTS

2006/0122946 A1* 6/2006 Fahrny .............. G06Q 20/3829
705/71
2007/0081669 A1 4/2007 Takashima et al.
(Continued)

FOREIGN PATENT DOCUMENTS

BR 112017017220 A2 4/2018
CN 105230006 A 1/2016
(Continued)

OTHER PUBLICATIONS

International Search Report and Written Opinion of PCT Application No. PCT/JP2018/001781, dated Apr. 24, 2018, 06 pages of ISRWO.

(Continued)

*Primary Examiner* — Heather R Jones
(74) *Attorney, Agent, or Firm* — Chip Law Group

(57) ABSTRACT

A configuration capable of recording MMT format data on a medium as BDAV format data and performing copy control according to the original copy control information is achieved. The MMT format data, for which copy control information is set, is input and recorded on an information recording medium as BDAV format data. As record data, (a) a stream file including a packet string in which the MMT format data is stored, and (b) copy control information corresponding to the stream file, in which the copy control information corresponding to the MMT format data is reflected, are generated and recorded as an additional header of a packet included in the stream file or as another file.

17 Claims, 48 Drawing Sheets

(51) Int. Cl.
  *H04N 21/435* (2011.01)
  *H04N 21/4402* (2011.01)
  *H04W 12/037* (2021.01)

(52) U.S. Cl.
  CPC ...... *H04N 21/4402* (2013.01); *H04W 12/037* (2021.01); *H04N 2005/91307* (2013.01)

(56) References Cited

U.S. PATENT DOCUMENTS

| | | | |
|---|---|---|---|
| 2007/0223691 A1* | 9/2007 | Takashima | G11B 20/00507 380/200 |
| 2015/0039654 A1* | 2/2015 | Kato | G06F 16/13 707/803 |
| 2016/0099026 A1 | 4/2016 | Iguchi et al. | |
| 2018/0041808 A1 | 2/2018 | Kitazato | |
| 2019/0364341 A1 | 11/2019 | Kitazato | |

FOREIGN PATENT DOCUMENTS

| | | | |
|---|---|---|---|
| CN | 110266985 | A | 9/2019 |
| CN | 110691211 | A | 1/2020 |
| EP | 3026898 | A1 | 6/2016 |
| EP | 3261355 | A1 | 12/2017 |
| EP | 3570538 | A1 | 11/2019 |
| JP | 2010-152999 | A | 7/2010 |
| JP | 2011-023071 | A | 2/2011 |
| JP | 2012-055014 | A | 3/2012 |
| JP | 2017-005642 | A | 1/2017 |
| JP | 6498882 | B2 | 4/2019 |
| JP | 6524362 | B1 | 6/2019 |
| JP | 2019-134489 | A | 8/2019 |
| PH | 12017501442 | A1 | 1/2018 |
| WO | 2015/011905 | A1 | 1/2015 |
| WO | 2016/132898 | A1 | 8/2016 |
| WO | 2016/203833 | A1 | 12/2016 |

OTHER PUBLICATIONS

"Information technology—High efficiency coding and media delivery in heterogeneous environments—Part 1 : MPEG media transport (MMT)", ISO/IEC JTC 1/SC29/WG11, Apr. 26, 2013, 92 pages.

Extended European Search Report of EP Application No. 18748718.6, dated Jan. 24, 2020, 08 pages.

* cited by examiner

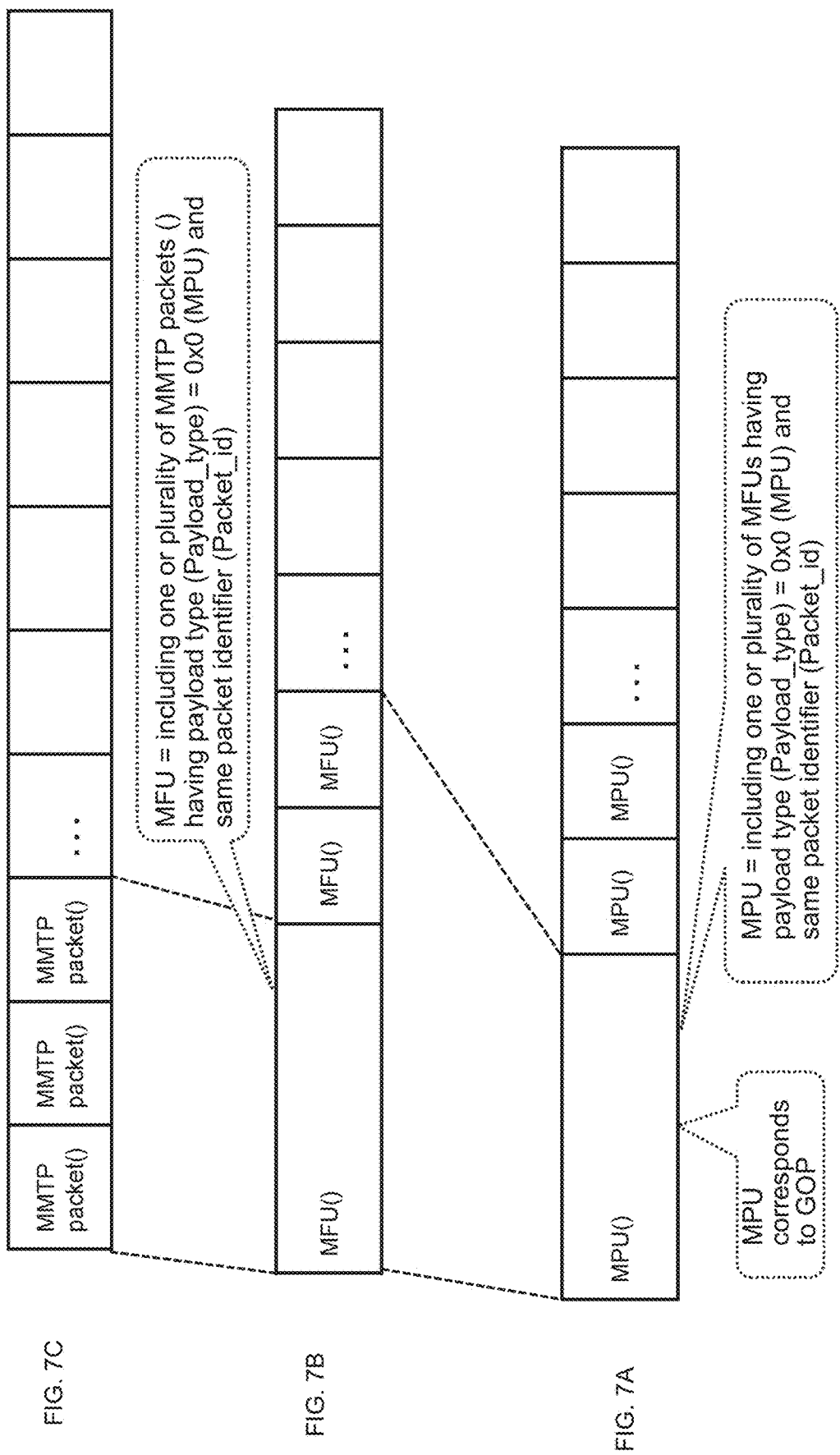

| Data structure(Syntax) | Number of bits (No. of bits) | Notation (Mnemonic) |
|---|---|---|
| MH-Service_Description_Table () { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   tlv_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for(i=0; i<N; i++){ | | |
|     service_id | 16 | uimsbf |
|     reserved_future_use | 3 | bslbf |
|     EIT_user_defined_flags | 3 | bslbf |
|     EIT_schedule_flag | 1 | bslbf |
|     EIT_present_following_flag | 1 | bslbf |
|     running_status | 3 | bslbf |
|     free_CA_mode | 1 | bslbf |
|     descriptors_loop_length | 12 | uimsbf |
|     for (j=0; j<N; j++) { | | |
|       descriptor () ← Content copy control descriptor / Content usage control descriptor | | |
|     } | | |
|   } | | |
|   CRC_32 | 32 | rpchof |
| } | | |

FIG.15

| Data structure (Syntax) | Number of bits (No. of bits) | Notation (Mnemonic) |
|---|---|---|
| Content_Copy_Control_Descriptor () {      descriptor_tag         — Descriptor tag (0x8038)      descriptor_length      digital_recording_control_data — Digital recording control data      maximum_bit_rate_flag      component_control_flag — Component control flag(O)      reserved_future_use      reserved_future_use      if( maximum_bit_rate_flag == 1 ) {          maximum_bit_rate      }      if( component_control_flag == 1 ){          component_control_length          for(j=0;j<N;j++){              component_tag              digital_recording_control_data              maximum_bitrate_flag              reserved_future_use              reserved_future_use              if(maximum_bitrate_flag==1){                  maximum_bitrate              }          }      } } | 16 8 2 1 1 4 8 8 8 16 2 1 5 8 8 | uimsbf uimsbf bslbf bslbf bslbf bslbf bslbf uimsbf uimsbf uimsbf bslbf bslbf bslbf bslbf uimsbf |

FIG.16

| Data structure (Syntax) | Number of bits (No. of bits) | Notation (Mnemonic) |
|---|---|---|
| Content_Usage_Control_Descriptor () { | | |
|   descriptor_tag | 16 | uimsbf |
|   descriptor_length | 8 | uimsbf |
|   remote_view_mode | 1 | bslbf |
|   copy_restriction_mode ---- Copy number restriction mode | 1 | bslbf |
|   image_constraint_token | 1 | bslbf |
|   reserved_future_use | 5 | bslbf |
|   reserved_future_use | 3 | bslbf |
|   retention_mode | 1 | bslbf |
|   retention_state | 3 | bslbf |
|   encryption_mode ---- Encryption mode | 1 | bslbf |
|   for(j=0;j<Nj;j++){ | | |
|     reserved_future_use | 8 | bslbf |
|   } | | |
| } | | |

FIG.17

| Type of digital copy control mode | Content copy control descriptor | Content usage control descriptor | |
|---|---|---|---|
| | (A) Digital recording control information (digital_recording_control_data) | (B) Encryption information (encryption_mode) | (C) Copy number restriction information (copy_restriction_mode) |
| (1) Copy allowed without constraint condition but encryption necessary for output copy data | 00 (Digital recording allowed) | 0 (Encryption necessary for output copy data) | Don't Care (Not defined) |
| (2) Copy allowed without constraint condition and encryption unnecessary for output copy data | 00 (Digital recording allowed) | 1 (Encryption unnecessary for output copy data) | Don't Care (Not defined) |
| (3) Copy prohibited | 11 (Digital recording not allowed) | Don't Care (Not defined) | Don't Care (Not defined) |
| (4) Copy allowed for only first generation with copy number restriction | 10 (Digital recording allowed for only first generation) | 0 (Encryption necessary for output copy data) | 1 (With copy number restriction) |
| (5) Copy allowed for only first generation without copy number restriction | 10 (Digital recording allowed for only first generation) | 0 (Encryption necessary for output copy data) | 0 (Without copy number restriction) |

FIG.18

| Data configuration (Syntax) | Number of bits | Notation (Mnemonic) |
|---|---|---|
| MMTP_packet_length | 16 | Uimsbf |
| digital_recording_control_data | 2 | bslbf |
| encryption_mode | 1 | Bslbf |
| copy_restriction_mode | 1 | bslbf |
| Reserved_for_future_use | 11 | Bslbf |
| extension_flag | 1 | Bslbf |
| If (extension==1) { | | |
| extension_length | 16 | Uimsbf |
| For (i=0; i<extension_length; i++) { | | |
| extension_bytes | 8 | Bslbf |
| } | | |
| } | | |

- 201 (A) Digital recording control information (digital_recording_control_data)
- 202 (B) Encryption information (encryption_mode)
- 203 (C) Copy number restriction information (copy_restriction_mode)

FIG.21

| Data configuration(Syntax) | Number of bits | Notation (Mnemonic) |
|---|---|---|
| digital_recording_control_data | 2 | bslbf |
| encryption_mode | 1 | Bslbf |
| copy_restriction_mode | 1 | bslbf |
| Reserved_for_future_use | 27 | Bslbf |
| extension_flag | 1 | Bslbf |
| If (extension==1) { | | |
| extension_length | 16 | Uimsbf |
| For (i=0; i<extension_length; i++) { | | |
| extension_bytes | 8 | Bslbf |
| } | | |
| } | | |

(A) Digital recording control information (digital_recording_control_data) — 211
(B) Encryption information (encryption_mode) — 212
(C) Copy number restriction information (copy_restriction_mode) — 213

FIG.22

| Data configuration(Syntax) | Number of bits | Notation (Mnemonic) |
|---|---|---|
| MMTP_packet_length  *(A) Digital recording control information (digital_recording_control_data)* 201 | 16 | Uimsbf |
| digital_recording_control_data | 2 | bslbf |
| encryption_mode  *(B) Encryption information (encryption_mode)* 202 | 1 | Bslbf |
| encryption_flag  *(D) Encryption flag (encryption_flag)* 204 | 2 | bslbf |
| copy_restriction_mode  *(C) Copy number restriction information (copy_restriction_mode)* 203 | 1 | bslbf |
| Reserved_for_future_use | 9 | Bslbf |
| extension_flag | 1 | Bslbf |
| If (extension==1) { | | |
| extension_length | 16 | Uimsbf |
| For (i=0; i<extension_length; i++) { | | |
| extension_bytes | 8 | Bslbf |
| } | | |
| } | | |

FIG.23

| Data configuration(Syntax) | Number of bits | Notation (Mnemonic) |
|---|---|---|
| digital_recording_control_data | 2 | bslbf |
| encryption_mode | 1 | Bslbf |
| encryption_flag | 2 | bslbf |
| copy_restriction_mode | 1 | bslbf |
| Reserved_for_future_use | 25 | Bslbf |
| extension_flag | 1 | Bslbf |
| If (extension==1) { | | |
| extension_length | 16 | Uimsbf |
| For (i=0; i<extension_length; i++) { | | |
| extension_bytes | 8 | Bslbf |
| } | | |
| } | | |

(A) Digital recording control information (digital_recording_control_data) 211
(B) Encryption information (encryption_mode) 212
(C) Copy number restriction information (copy_restriction_mode) 213
(D) Encryption flag (encryption_flag) 214

FIG.24

| Data configuration (Syntax) | Number of bits (No. of bits) | Notation (Mnemonic) |
|---|---|---|
| Header_extension_byte{<br>  for (i=0; i<N; i++) {<br>    header_ext_end_flag<br>    header_ext_type<br>    header_ext_length<br>    for (j=0; j<M; j++) {<br>      hdr_ext_byte   ← Extension information<br>    }<br>  }<br>} | <br><br>1<br>15<br>16<br><br>8 | <br><br>bslbf<br>uimsbf<br>uimsbf<br><br>bslbf |

FIG.26

FIG.30
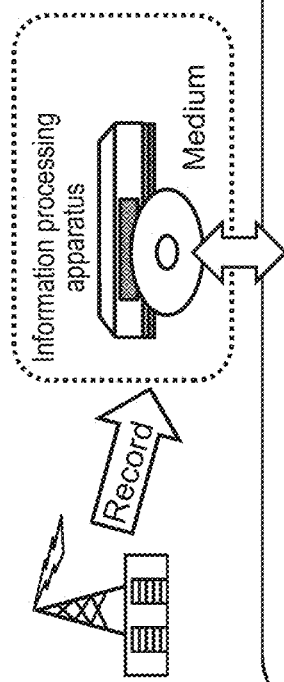
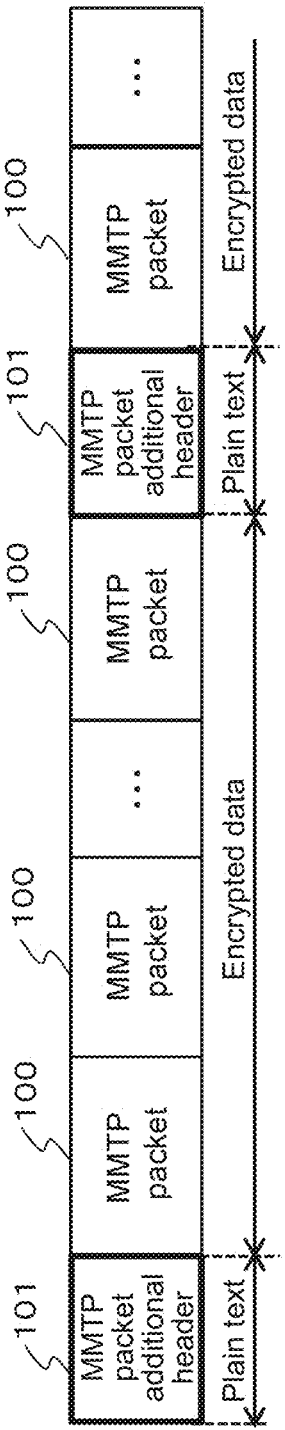
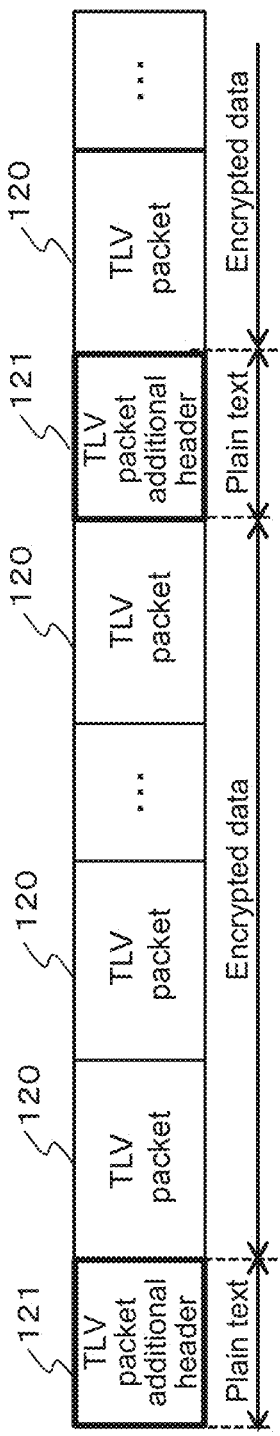

| Data configuration(Syntax) | Number of bits | Notation (Mnemonic) |
|---|---|---|
| encryption_block_length | 16 | Uimsbf |
| digital_recording_control_data | 2 | bslbf |
| encryption_mode | 1 | Bslbf |
| copy_restriction_mode | 1 | bslbf |
| Reserved_for_future_use | 11 | Bslbf |
| extension_flag | 1 | Bslbf |
| If (extension==1) { | | |
| extension_length | 16 | Uimsbf |
| For (i=0; i<extension_length; i++) { | | |
| extension_bytes | 8 | Bslbf |
| } | | |
| } | | |

271 Encryption block length
201
(A) Digital recording control information (digital_recording_control_data)
202
(B) Encryption information (encryption_mode)
203
(C) Copy number restriction information (copy_restriction_mode)

FIG.31

| Data configuration (Syntax) | Number of bits | Notation (Mnemonic) |
|---|---|---|
| encryption_block_length | 32 | Uimsbf |
| digital_recording_control_data | 2 | bslbf |
| encryption_mode | 1 | Bslbf |
| copy_restriction_mode | 1 | bslbf |
| Reserved_for_future_use | 27 | Bslbf |
| extension_flag | 1 | Bslbf |
| If (extension==1) { | | |
| extension_length | 16 | Uimsbf |
| For (i=0; i<extension_length; i++) { | | |
| extension_bytes | 8 | Bslbf |
| } | | |
| } | | |

271 ··· Encryption block length
211 ··· (A) Digital recording control information (digital_recording_control_data)
212 ··· (B) Encryption information (encryption_mode)
213 ··· (C) Copy number restriction information (copy_restriction_mode)

FIG.32

| | (1) Control information of MMT format (control information included in broadcast wave) | (2) Record information of usage control information file (control information recorded in medium) | Note |
|---|---|---|---|
| (a) Information of necessity/unnecessity of encryption of output data at copy processing | encryption_mode | EPN | |
| | 0: Encryption necessary (IP interface output is protected) | 0: EPN-asserted | |
| | 1: Encryption unnecessary | 1: EPN-unasserted | |
| (b) Copy control information | digital_recording_control_data | CCI | |
| | 00: Copy allowed without constraint condition | 00: Copy Control Not Asserted | |
| | 11: Copy prohibited | N/A (Recording impossible) | |
| | 10: Copy allowed for only first generation | 01: No More Copy | Need to be rewritten to "Copy prohibited" at copying |
| (c) Move processing allowance information | (To be defined as operation rules for broadcast recording) | Move_Not_Allowed | |
| | | 0: Move is allowed | |
| | | 1: Move is not allowed | |
| (d) Information of necessity/unnecessity of source confirmation processing (watermark detection processing) | (To be defined as operation rules for broadcast recording) | Trusted_Source_Mark_Screening_Required | |
| | | 0: Trusted Source Mark Screening is required. | |
| | | 1: Trusted Source Mark Screening is not required. | |
| (e) Digital output allowance standard information | (To be defined as operation rules for broadcast recording) | Digital_Output_Flag | |
| | | 0: Allowed to be output to only new protection technologies | Allowed to be output to e.g., HDCP2.2 |
| | | 1: Allowed to be output to old and new protection technologies | Allowed to be output to e.g., both of HDCP1.4 and 2.2 |

FIG.37

INFORMATION PROCESSING APPARATUS, INFORMATION RECORDING MEDIUM AND INFORMATION PROCESSING METHOD

CROSS REFERENCE TO RELATED APPLICATIONS

This application is a U.S. National Phase of International Patent Application No. PCT/JP2018/001781 filed on Jan. 22, 2018, which claims priority benefit of Japanese Patent Application No. JP 2017-044975 filed in the Japan Patent Office on Mar. 9, 2017 and also claims priority benefit of Japanese Patent Application No. JP 2017-016462 filed in the Japan Patent Office on Feb. 1, 2017. Each of the above-referenced applications is hereby incorporated herein by reference in its entirety.

TECHNICAL FIELD

The present disclosure relates to an information processing apparatus, an information recording medium, an information processing method, and a program. More specifically, the present disclosure relates to an information processing apparatus, an information recording medium, an information processing method, and a program, in which MPEG media transport (MMT) format data that has been standardized as a future data transmission standard in a broadcasting wave and the like is input and recorded on a medium, and copy control or the like in a case of performing copy processing for medium record data is executed.

BACKGROUND ART

Currently, standardization for achieving data transmission of a high image quality image such as broadcasting of a 4K image, an 8K image, and the like has progressed, and as one of the standardization, a data distribution system using an MPEG media transport (MMT) format has been considered.

The MMT format defines a data transfer system (a transport format) of transmitting encoded data configuring content, such as an image (Video), a sound (Audio), and a caption (Subtitle), and data such as control information (signaling information (SI)) including various management information items such as control information and attribute information through a broadcasting wave or a network.

The MMT format, for example, is planned to be used for broadcasting of next-generation contents such as a 4K image and a high dynamic range (HDR) image, and the like.

Note that, an MPEG-2TS format has been widely used as a transmission format of the existing image (Video), the existing sound (Audio), the existing caption (Subtitle), and the like, or a data record format with respect to a medium.

In addition, a BDMV or BDAV standard (format) has been widely used as a record and reproduction application standard (format) corresponding to the MPEG-2TS format.

Note that, BDMV or BDAV is an application standard of data record and reproduction mainly using a Blu-ray (Registered Trademark) disc (BD), but the standard is not limited to the BD, and can also be applied to data record and reproduction using a medium other than the BD, such as a flash memory or an HD.

A data record and reproduction processing configuration using the BD, for example, is described in Patent Literature 1 (JP-A-2011-023071) and the like.

The BDMV, for example, is an application standard that has been developed for a BD-ROM in which movie contents and the like are recorded in advance, and has been widely used mainly in a BD-ROM that is not capable of rewriting package contents and the like.

On the other hand, the BDAV is a standard that has been developed to be applied to data record and reproduction processing mainly using a rewritable BD-RE type disk, a write-once recordable BD-R type disk, and the like. The BDAV, for example, is used for recording and reproducing a video that is captured by a user with a video camera and the like, or for recording and reproducing television broadcasting.

In order to record distribution contents according to the MMT format described above in an information recording medium (medium), and to perform contents reproduction processing from the medium by using a reproduction application corresponding to the BDAV format, it is necessary to perform data record in accordance with the BDAV format.

Currently, a configuration for enabling the MMT format data to be recorded and reproduced by extending the BDAV format extend has been discussed.

For example, it has been discussed that in a case where distribution data according to the MMT format, transmitted by a broadcasting station and the like, is received by an information processing apparatus such as a television, and the received data is recorded in a recording medium such as a BD, a flash memory, or a hard disk (HD), image data, sound data, caption data, or data such as control information (SI) is recorded on a medium as a packet string of a packet in which data according to the MMT format is stored.

Specifically, it has been discussed that a packet string of an MMT protocol (MMTP) packet, or a type length value (TLV) packet that is an upper packet of the MMTP packet is recorded on the medium.

An image, a sound, and a caption that are reproduction data, control information (the signaling information (SI)) including various management information items, and the like are stored in the MMTP packet or the TLV packet.

For example, in order to record the MMTP packet or the TLV packet in which contents such as an image, a sound, and a caption are stored in a recording medium such as a Blu-ray (Registered Trademark) disc (BD), a flash memory, or a hard disk (HD), and to perform contents reproduction from the medium by using the reproduction application corresponding to the BDAV format described above, it is necessary to perform data record in accordance with the BDAV format.

The BDAV format defines a database file such as a playlist file or a clip information file, as a reproduction control information file, and a reproduction application corresponding to BDAV executes data reproduction processing with reference to the reproduction control information file (the database file).

Accordingly, it is also necessary to perform the reproduction processing with respect to the MMT format data by using reproduction control information that is recorded in the playlist file or the clip information file.

However, in the database file such as a playlist file or a clip information file of BDAV format definition, the reproduction control information corresponding to MPEG-2TS format data is originally recorded.

Accordingly, in a case where MMT format data having a format different from the MPEG-2TS format is reproduced, there is a possibility that the reproduction control information that is recorded in the playlist file or the clip information file of the existing BDAV format definition is not capable of being applied.

In order to solve this problem, it is necessary to perform processing of generating a playlist file or a clip information file corresponding to MMT format data and recording it on the medium.

Furthermore, for example, in a case where an MMTP packet or TLV packet in which content such as an image, a sound, or a caption is stored is recorded on a recording medium such as a BD (Blu-ray (registered trademark) Disc), a flash memory, or an HD (hard disk), a user may further copy that medium record data to another second medium.

However, much of the broadcasting content is content protected by copyright, and various types of copy control information are set in a unit of content such as programs.

For example, various types of copy control information are set in a unit of content (program) such as copy-allowed content, copy-prohibited content, and content for which an allowed number of times of copying or the number of copies is set.

Those copy control information items regarding the broadcasting content are stored in packets (TLV packet/MMTP packet) transmitted together with program content via the broadcast wave and are transmitted to a reception apparatus on the user side.

After those data items are recorded on a medium such as a BD, copy processing is performed by using, for example, an application corresponding to a BDAV format.

However, the existing application corresponding to a BDAV format does not include an algorithm to perform processing of referring to copy control information stored in the MMTP packet and determining whether copy processing is allowed or not.

So, if some countermeasures are not taken, unregulated copy processing in which the copy control information transmitted by the broadcast wave is ignored may be performed.

CITATION LIST

Patent Literature

Patent Literature 1: Japanese Patent Application Laid-open No. 2011-023071

DISCLOSURE OF INVENTION

Technical Problem

The present disclosure, for example, has been made in consideration of the problems described above, and it is an object of the present disclosure to provide an information processing apparatus, an information recording medium, an information processing method, and a program, which are capable of inputting distribution data according to an MMT format and then recording it on a recording medium such as a BD, and further performing reliable copy control conforming to copy control information set in the original MMT format data.

Solution to Problem

A first aspect of the present disclosure is an information processing apparatus including a data processing unit that receives an input of MPEG media transport (MMT) format data, for which copy control information is set, and generates record data according to a BDAV format or an SPAV format that is a data record format with respect to an information recording medium, in which the data processing unit generates, as the record data, (a) a stream file including a packet string in which the MMT format data is stored as reproduction data, and (b) copy control information corresponding to the stream file, in which the copy control information corresponding to the MMT format data included in the input data is reflected.

Further, a second aspect of the present disclosure is an information processing apparatus including a data processing unit that copies record data of a first medium to a second medium, in which the first medium is a medium on which a stream file including a packet string in which MPEG media transport (MMT) format data is stored as reproduction data, and copy control information corresponding to the stream file are recorded, and the data processing unit executes copy control of the stream file in accordance with reference information by referring to the copy control information.

Further, a third aspect of the present disclosure is an information recording medium including a configuration in which a stream file including an MMTP packet string or a TLV packet string in which MPEG media transport (MMT) format data is stored, and copy control information in a unit of MMTP packet or TLV packet are recorded in an additional header of each packet, in which the information recording medium includes record data with which an information processing apparatus that executes copy processing of the record data on the information recording medium is capable of executing copy control in a unit of packet included in the stream file.

Further, a fourth aspect of the present disclosure is an information processing method that is executed in an information processing apparatus, the information processing apparatus including a data processing unit that receives an input of MPEG media transport (MMT) format data, for which copy control information is set, and generates record data according to a BDAV format or an SPAV format that is a data record format with respect to an information recording medium, the information processing method including generating, by the data processing unit, as the record data, (a) a stream file including a packet string in which the MMT format data is stored as reproduction data, and (b) copy control information corresponding to the stream file, in which the copy control information corresponding to the MMT format data included in the input data is reflected.

Further, a fifth aspect of the present disclosure is an information processing method that is executed in an information processing apparatus, the information processing apparatus including a data processing unit that copies record data of a first medium to a second medium, the first medium being a medium on which a stream file including a packet string in which MPEG media transport (MMT) format data is stored as reproduction data, and copy control information corresponding to the stream file are recorded, the information processing method including executing, by the data processing unit, copy control of the stream file in accordance with reference information by referring to the copy control information.

Further, a sixth aspect of the present disclosure is a program that causes an information processing apparatus to execute information processing, the information processing apparatus including a data processing unit that receives an input of MPEG media transport (MMT) format data, for which copy control information is set, and generates record data according to a BDAV format or an SPAV format that is a data record format with respect to an information recording medium, the program causing the data processing unit to generate, as the record data, (a) a stream file including a packet string in which the MMT format data is stored as reproduction data, and (b) copy control information corresponding to the stream file, in which the copy control information corresponding to the MMT format data included in the input data is reflected.

Further, a seventh aspect of the present disclosure is a program that causes an information processing apparatus to execute information processing, the information processing apparatus including a data processing unit that copies record data of a first medium to a second medium, the first medium being a medium on which a stream file including a packet string in which MPEG media transport (MMT) format data is stored as reproduction data, and copy control information corresponding to the stream file are recorded, the program causing the data processing unit to execute copy control of the stream file in accordance with reference information by referring to the copy control information.

Note that, the program of the present disclosure, for example, is a program that can be provided to an information processing apparatus, a computer, or a system that is capable of executing various programs and codes, by a storage medium provided in a computer-readable form or a communication medium. Such a program is provided in a computer-readable form, and thus, processing according to the program is achieved on the information processing apparatus, the computer, or the system.

Other objects, characteristics, or advantages of the present disclosure will be apparent by more detailed description based on examples or attached drawings of the present disclosure described below. Note that, herein, the system is a logical assembly configuration of a plurality of apparatuses, and the apparatuses of each configuration are not limited to be in the same housing.

Advantageous Effects of Invention

According to the configuration of one example of the present disclosure, the configuration capable of recording MMT format data on a medium as BDAV format data and performing copy control according to the original copy control information is achieved.

Specifically, the MMT format data, for which copy control information is set, is input and recorded on an information recording medium as BDAV format data. As record data, (a) a stream file including a packet string in which the MMT format data is stored, and (b) copy control information corresponding to the stream file, in which the copy control information corresponding to the MMT format data is reflected, are generated and recorded as an additional header of a packet included in the stream file or as another file.

The configuration capable of reproducing the MMT format data by recording it on a medium as BDAV format data or SPAV format data is achieved.

According to this configuration, the configuration capable of recording the MMT format data on a medium as BDAV format data and performing copy control according to the original copy control information is achieved.

Note that, the effects described herein are merely an example, are not limited, and may have additional effects.

BRIEF DESCRIPTION OF DRAWINGS

FIGS. 7A, 7B, and 7C are diagrams for describing the MMT format.

FIG. 13 is a diagram for describing copy control information transmitted together with program content from a broadcast station or the like.

FIG. 14 is a diagram for describing copy control information transmitted together with program content from a broadcast station or the like.

FIG. 15 is a diagram showing a data configuration (syntax) of a service description table (MH-SDT) stored in an MMTP packet.

FIG. 16 is a diagram for describing a data configuration (Syntax) of a content copy control descriptor.

FIG. 17 is a diagram for describing a data configuration (Syntax) of a content usage control descriptor.

FIG. 18 is a diagram showing types (five types) of digital copy control modes and settings of three types of control information defined in the MMT format in a list.

FIG. 21 is a diagram showing an example of a data configuration (Syntax) of an MMTP packet additional header.

FIG. 22 is a diagram showing an example of a data configuration (Syntax) of a TLV packet additional header.

FIG. 23 is a diagram showing an example of a data configuration (Syntax) of an MMTP packet additional header.

FIG. 24 is a diagram showing an example of a data configuration (Syntax) of an MMTP packet additional header.

FIG. 26 is a diagram showing an example of data recorded in a header extension byte (header_extention) region of an MMTP packet header.

FIG. 30 is a diagram for describing a setting example of a packet string and an additional header recorded on a medium.

FIG. 31 is a diagram showing an example of a data configuration (Syntax) of the MMTP packet additional header.

FIG. 32 is a diagram showing an example of a data configuration (Syntax) of the TLV packet additional header.

FIG. 37 is a diagram for describing record data of the usage control information file (Usage File).

MODE(S) FOR CARRYING OUT THE INVENTION

Hereinafter, the details of an information processing apparatus, an information recording medium, an information processing method, and a program of the present disclosure will be described with reference to the drawings. Note that, the description will be given as follows.
 1. Configuration Example of Communication System
 2. MPEG Media Transport (MMT) Format
 3. BDAV Format and SPAV Format
 4. Processing in case where MMT Format Data is Recorded in accordance with BDAV Format
 5. Regarding Mode of Copy Processing and Copy Control Information in MMT Format Data
 6. Configuration Enabling Information Processing Apparatus that Executes Copy Processing to Acquire Copy Control Information of MMT Format Data Recorded on Medium
  6-1. Additional Header in which Copy Control Information is Recorded
  6-2. Example of Additional Header in which Copy Control Information is Recorded (Example 1)
  6-3. Example of Additional Header in which Copy Control Information is Recorded (Example 2)
 7. Data Encryption Processing of Setting Additional Header and Performing Recording on Medium
 8. Example of Setting Additional Header in which One Copy Control Information Item is Recorded for Plurality of Packets
  8-1. (Example 1) Example of Setting Additional Header in which One Copy Control Information Item is Recorded for N Packets (MMTP Packets or TLV Packets)
  8-2. (Example 2) Example of Setting Additional Header in which One Copy Control Information Item is Recorded for Data Including Packets (MMTP Packets or TLV Packets) with Fixed Length
  8-3. (Example 3) Example of Setting Additional Header in which One Copy Control Information Item is Recorded for Data Including Packets (MMTP Packets or TLV Packets) with Variable Length
 9. Example of Recording Copy Control Information in Usage Control Information File
 10. Example of Recording Encryption-Relevant Information Together with Copy Control Information in Usage Control Information File
 11. Configuration and Processing of Information Processing Apparatus Executing Data Record Processing with respect to Information Recording Medium
 12. Configuration and Processing of Information Processing Apparatus that Executes Data Copy Processing Between Information Recording Media
 13. Configuration Example of Information Processing Apparatus
 14. Summary of Configuration of Present Disclosure

[1. Configuration Example of Communication System]

First, an example of a communication system that is one usage configuration example of an information processing apparatus that executes processing of the present disclosure will be described with reference to FIG. 1.

Figure 1:
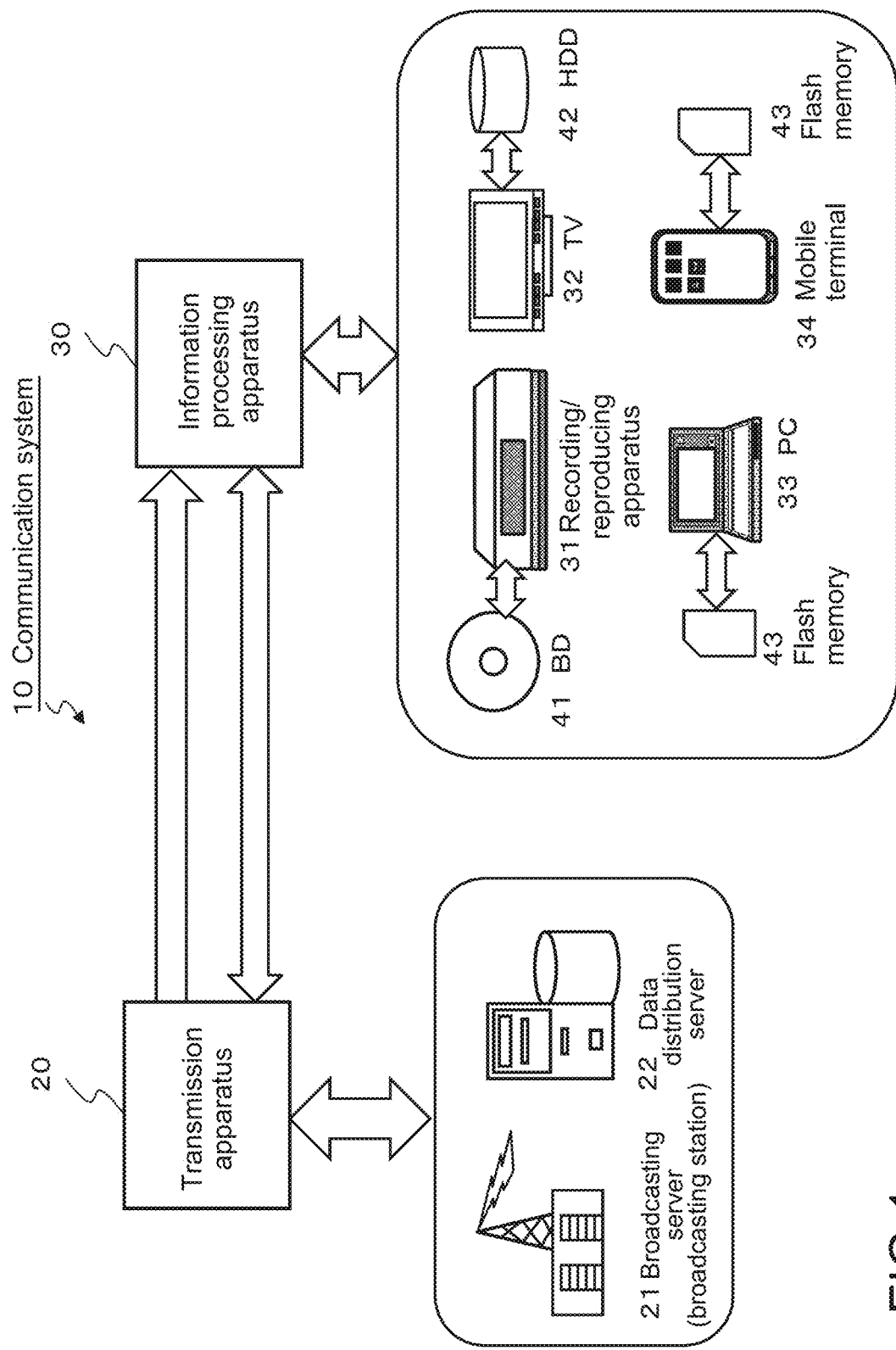
FIG. 1 is a diagram for describing a usage configuration example of an information processing apparatus executing processing of the present disclosure.

An information processing apparatus 30 shown in FIG. 1 is mounted with a medium such as a Blu-ray (Registered Trademark) disc (BD), a flash memory, or a hard disk (HDD), and executes data record processing with respect to the mounted medium, data reproduction processing from the mounted medium, and data copy processing with respect to another medium, or the like.

Data that is recorded on the medium by the information processing apparatus 30, for example, is transmission contents provided by a transmission apparatus 20 such as a broadcasting station (a broadcasting server) 21 or a data distribution server 22. Specifically, the data is a broadcasting program provided by a television station, and the like.

The transmission contents are transmitted to the information processing apparatus 30 from the transmission apparatus 20 through a broadcasting wave, or a network such as the internet.

The information processing apparatus 30, for example, is a recording/reproducing apparatus 31, a television 32, a PC 33, a mobile terminal 34, and the like, and such information processing apparatuses, for example, are mounted with various media such as a Blu-ray (Registered Trademark) disc (BD) 41, a hard disk (HDD) 42, and a flash memory 43, and execute data record processing with respect to the media, data reproduction processing from the media, data copy processing between media, or the like.

Data transmission from the transmission apparatus 20 to the information processing apparatus 30 is executed in accordance with an MPEG media transport (MMT) format.

The MMT format defines a data transfer system (a transport format) at the time of transmitting encoded data that is contents configuration data, such as an image (Video), a sound (Audio), and a caption (Subtitle), through the broadcasting wave or the network.

The transmission apparatus 20 encodes contents data, generates a data file including the encoded data and metadata of the encoded data, stores the generated encoded data in an MMT protocol (MMTP) packet defined by the MMT, and transmits the encoded data through the broadcasting wave or the network.

The data that is provided to the information processing apparatus 30 by the transmission apparatus 20 includes guide information such as broadcasting program guide, notification information, or control information (signaling information (SI)) including various management information items such as a control message, in addition to reproduction target data such as the image, the sound, and the caption.

[2. MPEG Media Transport (MMT) Format]

As described above, the data transmission from the transmission apparatus 20 to the information processing apparatus 30 is executed in accordance with the MPEG media transport (MMT) format.

The MPEG media transport (MMT) format will be described with reference to FIG. 2 and the like.

Figure 2:
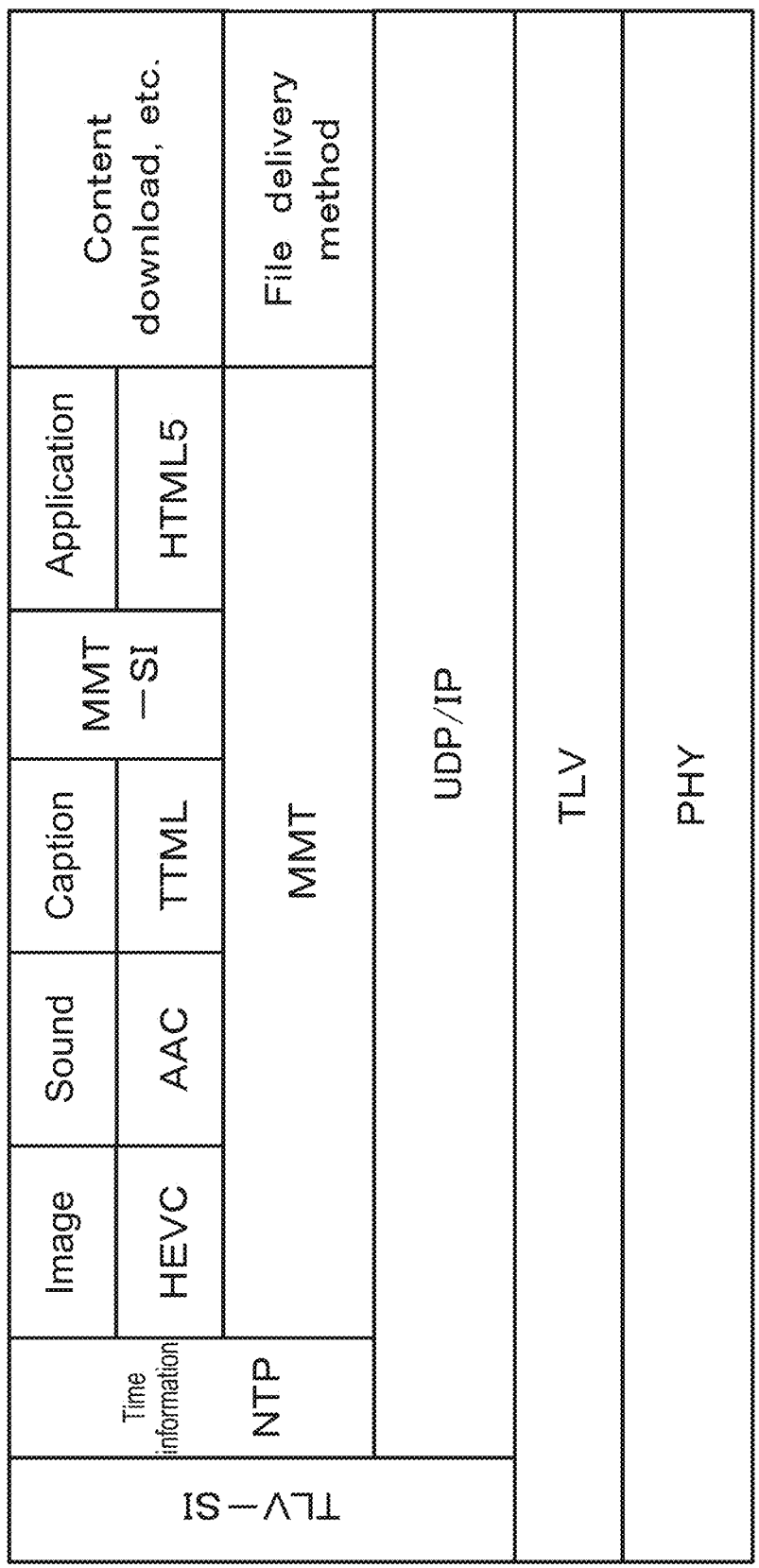
FIG. 2 is a diagram for describing an MMT format.

FIG. 2 is a diagram showing a stack model of the MMT format.

In the MMT stack model shown in FIG. 2, a physical layer (PHY) is on the lowermost layer. The physical layer is divided into a broadcast (Broadcasting) layer of performing processing of a broadcasting system, and a broadband (Broadband) layer of performing processing of a network system.

The MMT enables processing using two communication networks of the broadcasting system and the network system to be performed.

An upper layer of the physical layer (PHY) is a type length value (TLV) layer. The TLV is a format definition layer in which a multiplexing system of an IP packet is defined. A plurality of IP packets are subjected to multiplexing, and are transmitted as a TLV packet. TLV-SI is a transmission layer of the control information (SI) such as the control message according to a TLV format.

The control information (SI) includes setting information necessary for receiving and reproducing contents (a broadcasting program) on the information processing apparatus 30 side, the guide information such as the broadcasting program guide, the notification information, the control information, and the management information.

The control information (SI) stored in the TLV packet that is generated by the processing of the TLV layer is TLV-SI, and mainly includes control information relevant to reception processing.

The control information (SI) stored in the MMTP packet that is a packet generated in accordance with an MMT protocol (MMTP) is MMT-SI represented in the uppermost layer, and mainly includes control information relevant to reproduction control.

A UDP/IP layer is set on the TLV layer.

Specifically, the UDP/IP layer is a layer that can be divided into the IP layer and the UDP layer, and defines transmission of storing a UDP packet in a payload of the IP packet.

An MMT layer and a file delivery method layer are set on the UDP/IP layer.

A system in which the MMTP packet is transmitted by being stored in the IP packet and a system in which the MMTP packet is transmitted as the IP packet by using a file delivery method that is a data transmission system not using the MMTP packet are set to be used in combination.

The following layers of:
image (Video) data that is encoded image data according to high efficiency video coding (HEVC) that is an image encoding standard;
sound (Audio) data that is encoded sound data according to advanced audio coding (AAC) that is a sound encoding standard;
caption (Subtitle) data that is encoded caption data according to a timed text markup language (TTML) that is a caption encoding standard;
control information (MMT-SI) that is transmitted by using the MMTP packet; and
various applications described in accordance with a hyper text markup language 5 (HTML5) are set on the MMT layer, and each of the data items is transmitted by being stored in the MMTP packet.

The control information (MMT-SI) is the control information (the signaling information) that is transmitted by the MMTP packet, and includes setting information necessary for reproducing the contents (the broadcasting program) on the information processing apparatus 30 side, the guide information such as the broadcasting program guide, the notification information, and various management information items such as the control information.

Note that, time information (network time protocol (NTP)) is absolute time information, and is transmitted by being directly stored in the UDP packet.

Data service (Data service) performing other data distributions, contents download and the like (Contentdownload, etc.) can be distributed by using a file distribution method (File delivery method) different from the MMT.

As shown in FIG. 2, the control information (MMT-SI) such as the image, the sound, and the caption, various notification information items, and various management information items such as the control information, or an application is transmitted by the MMTP packet.

A specific configuration example of the MMTP packet will be described with reference to FIGS. 3A, 3B, 3C, and 3D.

FIGS. 3A, 3B, 3C, and 3D show four types of data configuration examples described below.

Figure 3:
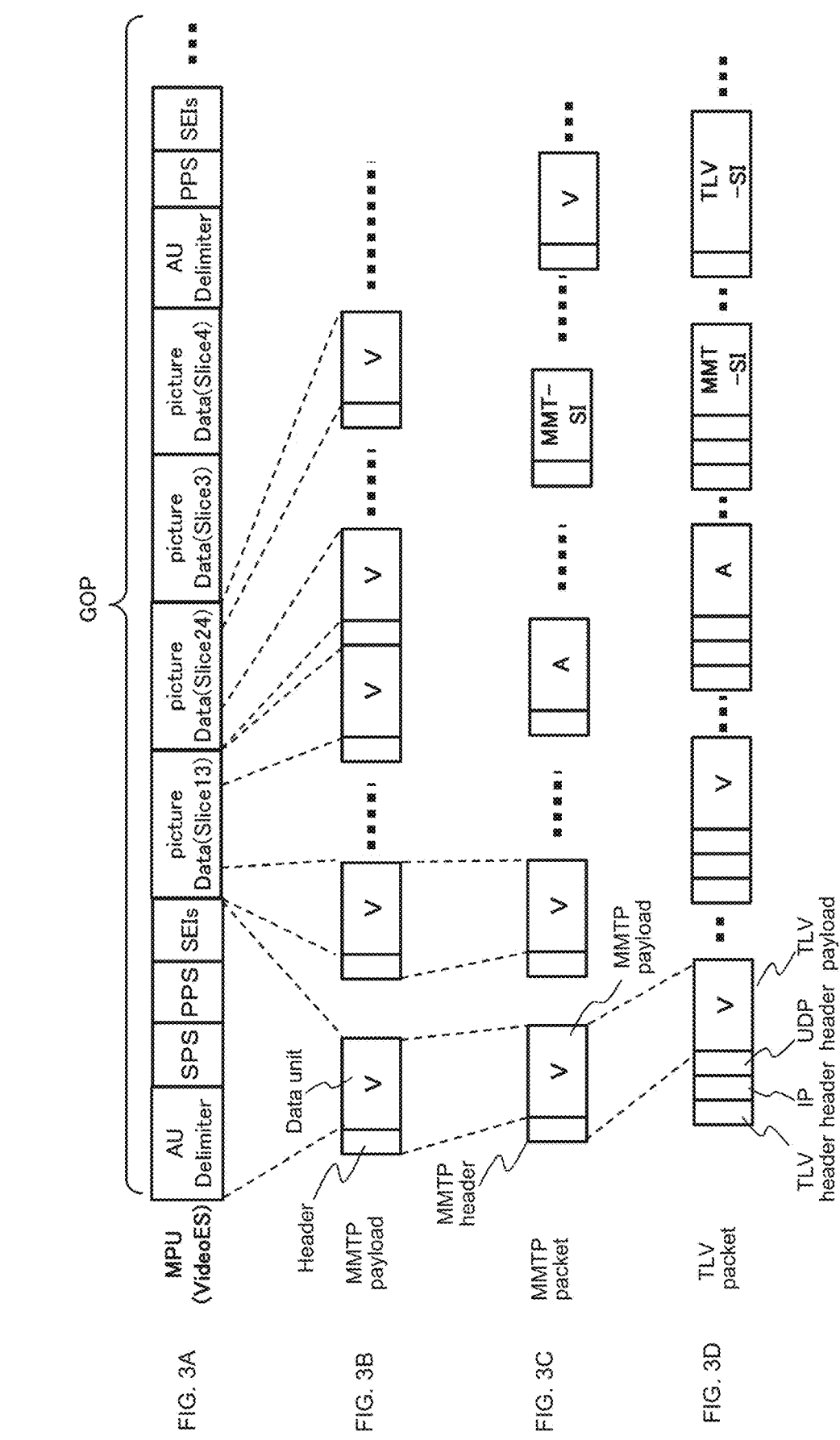
FIGS. 3A, 3B, 3C, and 3D are diagrams for describing an image data storage configuration example according to the MMT format.

FIG. 3A Media Presentation Unit (MPU)
FIG. 3B MMTP Payload
FIG. 3C MMTP Packet
FIG. 3D TLV Packet (d) The TLV packet is a packet that is transmitted through the broadcasting wave or the network, and each header information item of a UDP header, an IP header, and a TLV header is set in the TLV packet. The TLV packet is set for each data type as an individual packet.

In other words, one type of data is stored in a TLV payload of one TLV packet. Specifically, for example, the control information (SI) including the image (V), the sound (A), the caption (S), and various management information items is individually stored.

Note that, the control information (SI) includes the control information (MMT-SI) that is stored in the MMTP packet, and the control information (TLV-SI) that is transmitted by the TLV packet, and the control information (MMT-SI) and the control information (TLV-SI) are stored in individual TLV packets different from each other.

An example of the TLV payload that is a payload of the TLV packet is the MMTP packet shown in FIG. 3C.

The MMTP packet shown in FIG. 3C includes an MMTP header and an MMTP payload.

One type of data is stored in the MMTP payload of one MMTP packet. Specifically, for example, the image (V), the sound (A), and the caption (S), the control information (MMT-SI) stored in the MMTP packet, and any one type of data is stored in an individual MMTP packet.

FIGS. 3A and 3B show the detailed configuration of the image data that is stored in the MMTP payload of the MMTP packet shown in FIG. 3C.

FIG. 3B shows only an MMTP packet in which an MMTP payload is the image data (V) by selecting the MMTP packet from the MMTP packets shown in FIG. 3C.

The MMTP payload shown in FIG. 3B includes a header and data unit.

As shown in FIG. 3A, image data, and the following various parameters are stored in the data unit.

Access Unit Delimiter (AU Delimiter)
Sequence Parameter Set (SPS)
Picture Parameter Set (PPS)
Supplemental Enhancement Information (SEIs)

Such parameters are parameters that are used for displaying an image.

Media presentation unit (MPU) shown in FIG. 3A is one data processing unit of the reproduction target data such as the image, the sound, and the caption in the MMT format. The example shown in FIG. 3A is an example of the MPU of the image data, and is the same unit as that of a group of pictures (GOP) as so-called encoding and decoding processing unit.

As described above, for example, the image data is divided into a parameter and image configuration data defined in the MMT format, as shown in FIG. 3A, is stored in the MMTP payload shown in FIG. 3B, and is configured as the MMTP packet shown in FIG. 3C.

Further, the MMTP packet is set as the payload of the TLV packet shown in FIG. 3D, and the TLV packet is transmitted through the broadcasting wave or the network.

Note that, the MMTP packet and the TLV packet in data type unit are respectively set and transmitted with respect to each data item such as the sound and the caption, and each data item of the MMT-SI.

The TLV-SI is transmitted by being stored in the TLV packet without being stored in the MMTP packet.

[3. BDAV Format and SPAV Format]

Next, a BDAV format and an SPAV format that are a record data format in a case where distribution contents according to the MMT format described above are reproduced by being recorded, for example, in a medium such as a Blu-ray (Registered Trademark) disc (BD), a flash memory, or a hard disk (HD) will be described with reference to FIG. 4.

For example, in a case where contents such as the image, the sound, and the caption are reproduced from the medium such as the Blu-ray (Registered Trademark) disc (BD), the flash memory, or the HD, reproduction control information or index information for performing reproduction processing of the contents is necessary. The reproduction control information or the index information, in general, is referred to as a database file.

The reproduction control information or the index information is different in accordance with a reproduction application of executing the reproduction processing of record data in the medium.

As described above, the existing record and reproduction application standard (=Data Record Format) includes a BDMV standard or a BDAV standard (the data record format). The application standard is designed as a data record and reproduction application standard mainly using a Blu-ray (Registered Trademark) disc (BD).

Note that, BDMV or BDAV is an application standard of data record and reproduction mainly using the BD, and is the data record format (the standard), but the standard is not limited to the data record and reproduction using the BD, and can also be applied to data record and reproduction using a medium other than the BD, such as a flash memory.

The BDMV, for example, is an application standard that has been developed for a BD-ROM in which movie contents and the like are recorded in advance, and has been widely used mainly in a BD-ROM that is not capable of rewriting package contents and the like.

On the other hand, the BDAV is a standard that has been developed to be applied to data record and reproduction processing mainly using a rewritable BD-RE type disk, a write-once recordable BD-R type disk, and the like. The BDAV, for example, is used for recording and reproducing a video that is captured by a user with a video camera and the like, or for recording and reproducing television broadcasting.

In order to perform contents reproduction processing from the medium on which the distribution contents according to the MMT format described above are recorded, by using a reproduction application corresponding to the BDAV format, it is necessary to data record in accordance with the BDAV format.

As described above, the BDAV format defines a playlist file, a clip information file, or the like, as a record file of the reproduction control information, and a reproduction application corresponding to BDAV executes the data reproduction processing by using record information of a reproduction control information file (the database file).

Figure 4:
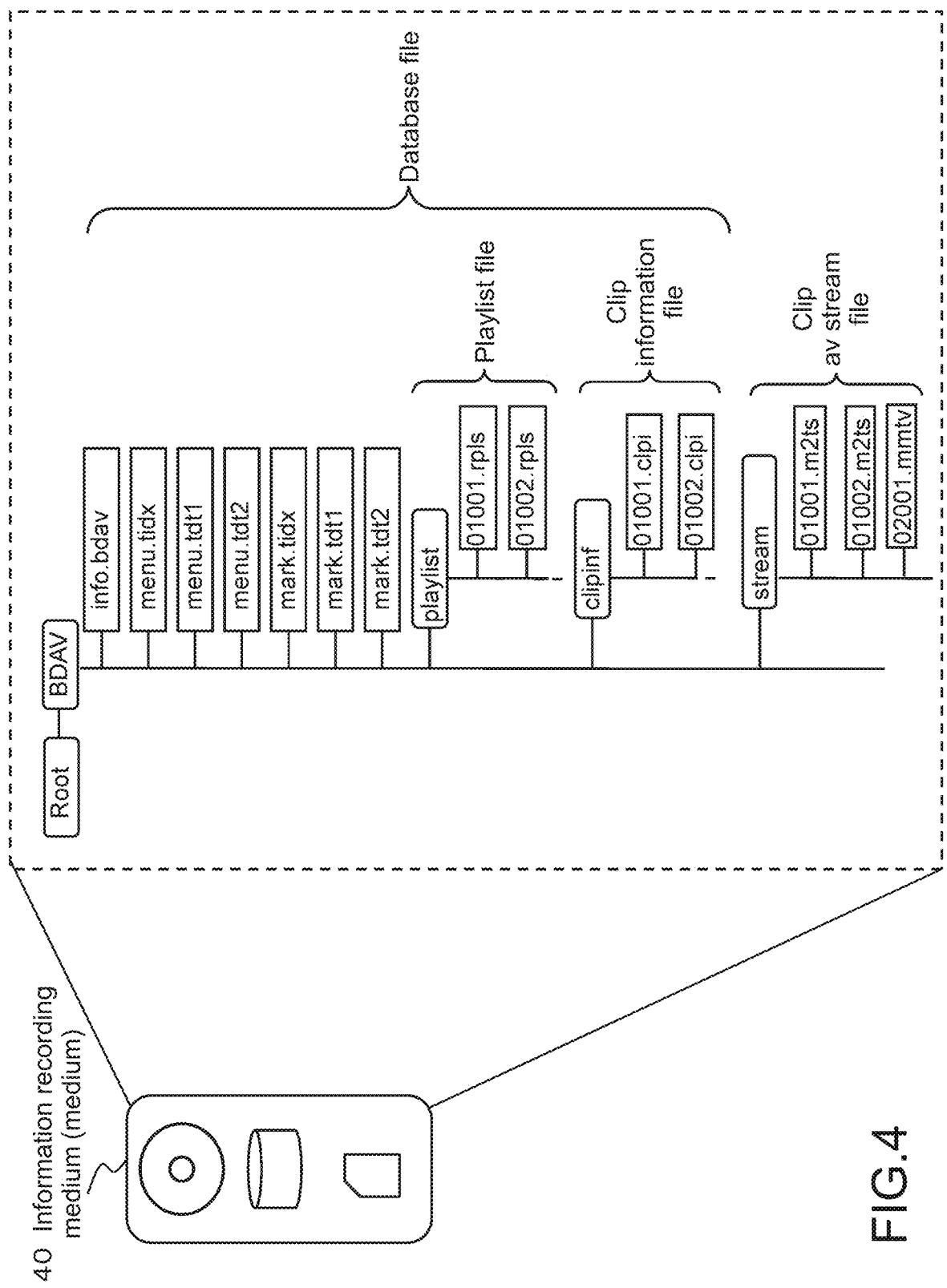
FIG. 4 is a diagram for describing a BDAV format.

FIG. 4 is a diagram showing a directory configuration example of data that is recorded in an information recording medium (medium) 40 in accordance with the BDAV format.

As shown in FIG. 4, various management information items, the reproduction control information, and a storage file of the reproduction target data are set in the directory.

A management information file, for example, includes an info file (info), a menu file (menu), a mark file (mark), and the like shown in FIG. 4. Management information of a title shown to the user, and the like are mainly stored in such files.

In addition, for example:
a playlist file (playlist); and
a clip information file (clipinf)
are recorded as the reproduction control information file.

Further, a clip AV stream file (stream) is recorded as a reproduction data storage file.

The playlist file is a file in which a reproduction order of the contents, and the like are defined in accordance with program information of a reproduction program designated by the title, and for example, includes designation information and the like of the clip information file in which reproduction position information and the like are recorded.

The clip information file is a file that is designated by the playlist file, and includes reproduction position information and the like of the clip AV stream file.

The clip AV stream file is a file in which AV stream data or the management information to be a reproduction target is stored. The clip AV stream file includes a packet in which each data item such as the image, the sound, and the caption to be the reproduction target, or the management information is stored.

Note that, the management information that is defined in the MPEG-2TS format and is recorded in the clip AV stream file, for example, includes program specific information/ service information (PSI/SI).

Note that, broadcasting data or network distribution data of the related art is MPEG-2TS format data including a transport stream (TS) packet, and it is expected that data including a high-definition image and the like, such as a 4K image and an 8K image of the future, is MMT format data including the MMTP packet described above.

FIG. 4 shows two types of stream files of:
a stream file (nnnnn.m2ts) including MPEG-2TS format data including the TS packet; and
MMT format data (nnnnn.mmtv) including the MMTP packet,
as the clip AV stream file (stream).

A directory example shown in FIG. 4 is a directory example of setting in which in a case where the data received by the information processing apparatus 30 is the MPEG-2TS format data, the received data is recorded on the medium as the MPEG-2TS format data, as it is, and in a case where the received data is the MMT format data, the received data is recorded on the medium as the MMT format data.

Note that, it has been discussed that the clip AV stream file in a case where the MMT format data is recorded on the medium is recorded as a packet string of a packet in which data according to the MMT format is stored.

Specifically, it has been discussed that the clip AV stream file is recorded as a packet string of the MMT protocol (MMTP) packet, or a type length value (TLV) packet that is an upper packet of the MMTP packet.

A specific example thereof will be described below in detail.

The management information file, the playlist file, the clip information file, and the data file thereof are a storage file of the management information that is applied to the reproduction processing of the image, the sound, the caption, and the like that are the reproduction data stored in the clip AV stream file. The files are a file in which the reproduction control information, attribute information of the reproduction data, and the like are stored, and are referred to as the database file.

A sequence of reproducing the contents recorded in the information recording medium is as follows.

(a) First, a specific title is designated from the management information file by the reproduction application.

(b) A playlist associated with the designated title is selected.

(c) An AV stream or a command as contents actual data is read out by clip information defined in the selected playlist, and reproduction of the AV stream or execution processing of the command is performed.

Figure 5:
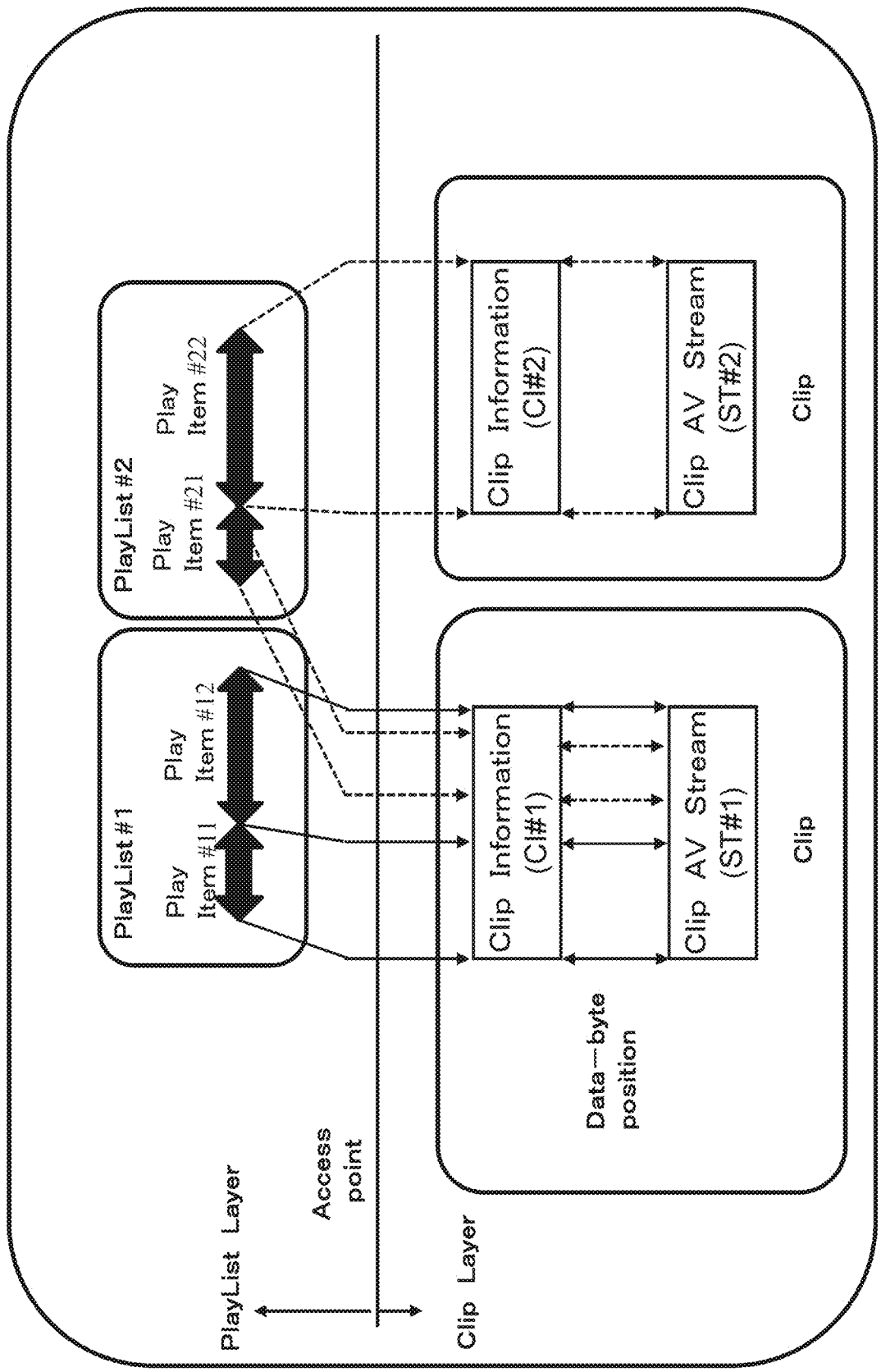
FIG. 5 is a diagram for describing a data reproduction processing example according to the BDAV format.

FIG. 5 is a diagram showing a correspondence relationship in the following data items that are recorded in the information recording medium (medium) 40, that is:
the playlist file;
the clip information file; and
the clip AV stream file.

The AV stream including the reproduction target data such as the image, the sound, and the caption that are actual reproduction target data is recorded as a clip AV stream (Clip AV Stream) file, and a playlist (PlayList) file and a clip information (Clip Information) file are defined as the management information and the reproduction control information file of the AV stream.

As shown in FIG. 5, such files of a plurality of categories can be partitioned into two layers of:
a playlist layer including the playlist (PlayList) file; and
a clip layer including the clip AV stream (Clip AV Stream) file and the clip information (Clip Information) file.

Note that, one clip information (Clip Information) file is associated with one clip AV stream (Clip AV Stream) file, a pair of such files is considered as one object, and such files are collectively referred to as a clip (Clip) or a clip file.

Detailed information of the data included in the clip AV stream file, for example, the management information such as an EP map in which I picture position information of MPEG data, and the like are recorded is recorded in the clip information file.

Note that, the clip AV stream (Clip AV Stream) file includes the TS packet in the case of the MPEG-2TS format data.

In addition, the clip AV stream (Clip AV Stream) file includes the MMTP packet in the case of the MMT format data.

For example, management information for acquiring a reproduction start position of storage data of the clip AV stream file such as correspondence data of a data position of byte string data of the clip AV stream file, and a reproduction time position such as an entry point (EP) that is a reproduction start point on a time axis at the time of performing decompression, and the like is stored in the clip information (Clip Information) file.

The playlist includes information indicating the reproduction start position of the clip (Clip) or an access point corresponding to a reproduction end position with a time stamp that is information on the time axis.

For example, it is possible to acquire a data reading position of the clip AV stream file, that is, an address as the reproduction start point on the basis of the time stamp indicating a reproduction time elapse position from a start point of the contents, with reference to the clip information file.

The clip information file (Clip Information file) is used for finding address information of the stream in the clip AV stream file to start decoding from the time stamp.

As described above, the playlist (PlayList) file includes designation information of a reproduction section with respect to reproducible data included in the clip (=Clip Information File+Clip AV Stream File) layer.

One or more play items (PlayItem) are set in the playlist (PlayList) file, and each of the play items includes the designation information of the reproduction section with respect to the reproducible data included in the clip (=Clip Information File+Clip AV Stream File) layer.

Note that, as described above, the clip AV stream (Clip AV Stream) file in which the reproduction target data is stored includes the TS packet in the case of the MPEG-2TS format data of the related art.

In addition, in the case of high-definition image data such as a 4K image and an 8K image that are expected to be widely used in the future, the clip AV stream (Clip AV Stream) file includes the MMTP packet in the case of the MMT format data.

The MMT format and the MPEG-2TS format will be described with reference to FIGS. 6A, 6B, 6C and FIGS. 7A, 7B, 7C.

First, the MPEG-2TS format will be described with reference to FIGS. 6A, 6B, and 6C.

The MPEG-2TS format is a format in which a data storage form (a container format) of the encoded data at the time of storing the encoded data that is the contents configuration data, such as the image (Video), the sound (Audio), and the caption (Subtitle), or the management information (PSI/SI) in a recording medium (medium), or transmitting the encoded data through the broadcasting wave or the network is defined.

The MPEG-2TS format is a format that is standardized in ISO13818-1, and for example, is used for data record with respect to the Blu-ray (Registered Trademark) disc (BD), digital broadcasting, and the like.

Figure 6C:
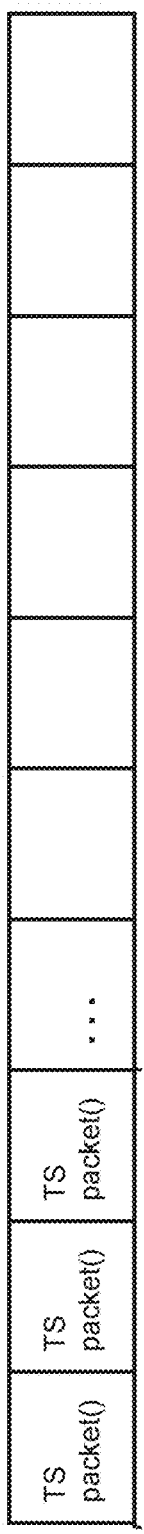
FIGS. 6A, 6B, and 6C are diagrams for describing an MPEG-2TS format.
Figure 6B:
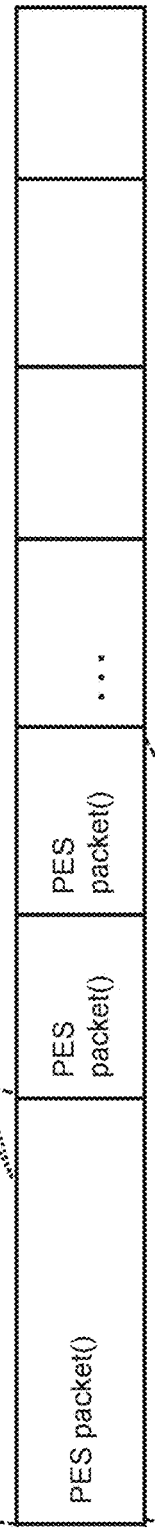
Figure 6A:
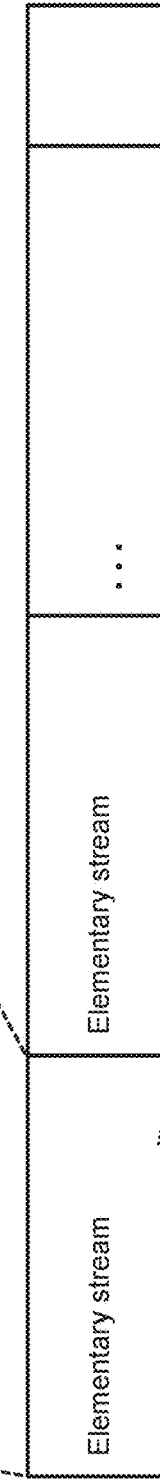

FIGS. 6A 6B, and 6C are diagrams showing the configuration of the MPEG-2TS format data.

FIG. 6A shown in the lowermost row is a diagram showing the overall configuration of the MPEG-2TS format data.

As shown in FIG. 6A, the MPEG-2TS format data includes a plurality of elementary streams (Elementary stream).

The elementary stream (Elementary stream), for example, is unit that is set as one unit of the image, the sound, the caption, and the like.

As shown in FIG. 2(b), one elementary stream (Elementary stream) includes one or a plurality of packetized elementary stream (PES) packets.

Specifically, one elementary stream (Elementary stream) includes one or a plurality of PES packets having Payload Type (Payload_type)=0x0 and the same packet identifier (Packet_id).

As shown in FIG. 6C, one PES packet includes one or a plurality of TS packets.

Specifically, one PES packet includes one or a plurality of TS packets having Payload Type (Payload_type)=0x0 and the same packet identifier (Packet_id).

The TS packet is different from the MMTP packet described above, and has a fixed length, and a packet size of one TS packet is fixed to 188 bytes.

Next, the MPEG media transport (MMT) format will be described with reference to FIGS. 7A, 7B, and 7C.

The MMT format is described above with reference to FIGS. 3A, 3B, 3C, and 3D, but an explanatory diagram of the MMT format shown in FIGS. 7A, 7B, and 7C is a diagram for easily understanding a correspondence relationship with respect to the MPEG-2TS format described with reference to FIGS. 6A, 6B, and 6C.

As described above, the MMT format defines the data transfer system (the transport format) at the time of transmitting the encoded data that is the contents configuration data such as the image (Video), the sound (Audio), and the caption (Subtitle) through the broadcasting wave or the network.

FIGS. 7A, 7B, and 7C diagrams showing the MMT format that is a file format defined in ISO/IEC 23008-1.

FIGS. 7A, 7B, and 7C show the configuration of the MMT format data.

FIG. 7A shown in the lowermost row is a diagram showing the overall configuration of the MMT format data.

As shown in FIG. 7A, the MMT format data includes a plurality of media presentation units (MPU).

The MPU, for example, is unit that is set as one unit of the image, the sound, the caption, and the like. For example, in the case of the image, the MPU corresponds to one group of picture (GOP) in which one MPU is one MPEG compression image unit.

As shown in FIG. 7B, one MPU includes one or a plurality of media fragment units (MFU).

Specifically, one MPU includes one or a plurality of MFUs having Payload Type (Payload_type)=0x0 (MPU) and the same packet identifier (Packet_id).

As shown in FIG. 7C, one MFU includes one or a plurality of MMTP packets.

Specifically, one MFU includes one or a plurality of MMTP packets having Payload Type (Payload_type)=0x0 (MPU) and the same packet identifier (Packet_id).

The MMTP packet has a variable length, and can be set to have various packet sizes.

Each of the MMTP packets includes a header (the MMTP header) in which the attribute information and the like are stored, and a payload (the MMTP payload) in which actual data of an encoded image, and the like are stored.

Note that, a format similar to the BDAV format includes the SPAV format. As described above, the BDMV or the BDAV is the application standard of the data record and reproduction mainly using the BD. In contrast, the SPAV format is an application standard of data record and reproduction mainly with respect to the hard disk.

However, both of the BDAV format and the SPAV format are a format that can be used in record and reproduction using various media such as the BD, the flash memory, and the HD.

SPAV format data can execute the data record and reproduction in the same processing as the data record and reproduction processing in the BDAV format. However, in the SPAV format, a part of file name setting is different from that of the BDAV format.

Figure 8:
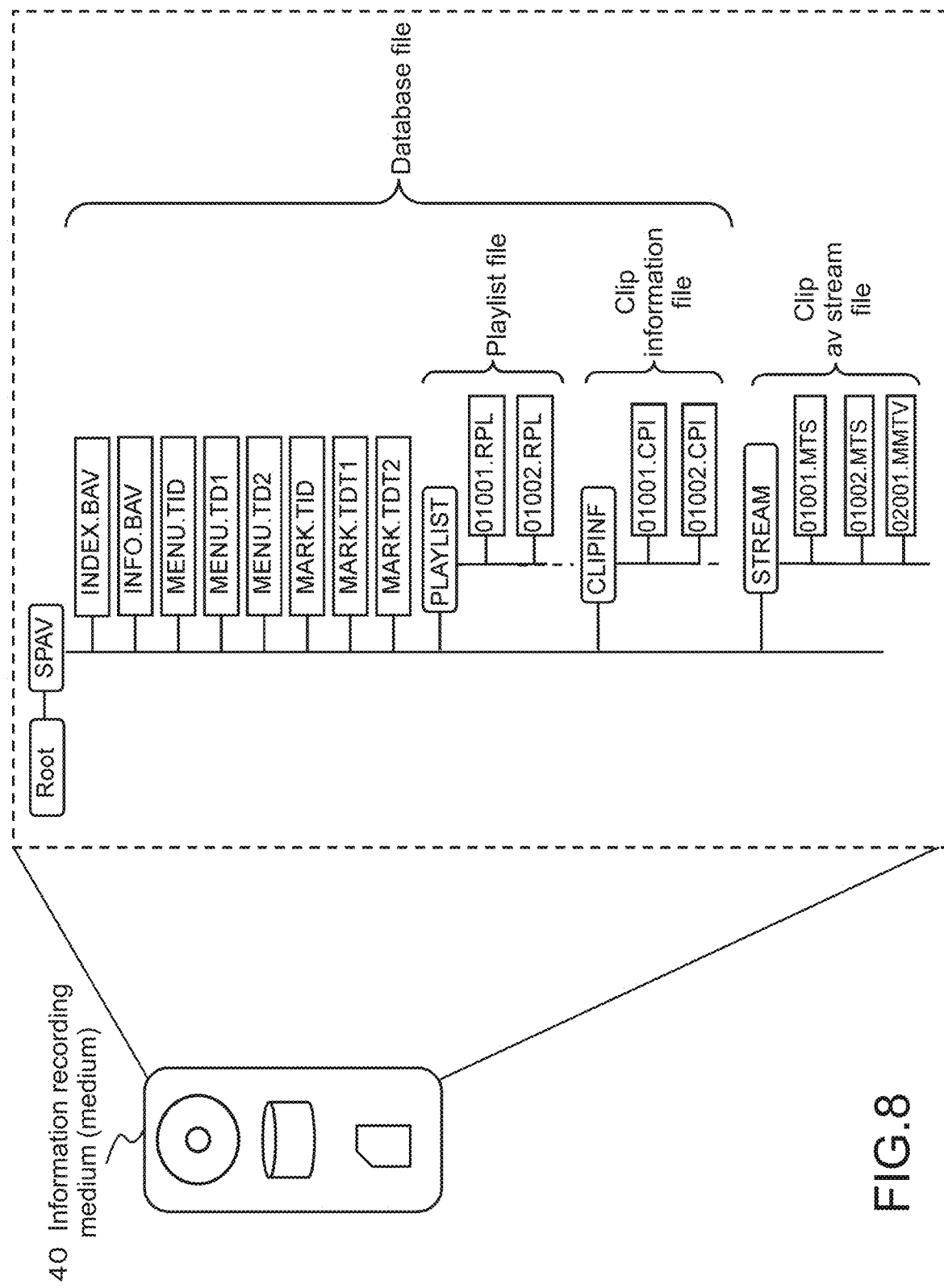
FIG. 8 is a diagram for describing an SPAV format.

FIG. 8 shows a directory configuration example of the SPAV format.

As with the BDAV format described above with reference to FIG. 4, various management information items, the reproduction control information, and the storage file of the reproduction target data are set in the directory of the SPAV format shown in FIG. 8.

The management information file, for example, includes an info file (INFO), a menu file (MENU), a mark file (MARK), and the like shown in FIG. 8. The management information of the title shown to the user, and the like are mainly stored in such files.

In addition, for example:

a playlist file (PLAYLIST); and a clip information file (CLIPINF) are recorded as the reproduction control information file.

Further, a clip AV stream file (STREAM) is recorded as the reproduction data storage file.

As shown in FIG. 8, setting of a directory name of the SPAV format or an extension of each of the files is different from that of the BDAV format described with reference to FIG. 4.

However, data stored in each of the files, or a function of each of the files is identical to that of the BDAV format.

In the description of the following examples, a processing example is described in which the MMT format data is reproduced by being recorded as the BDAV format data, but the examples described below can also be applied to processing of reproducing the MMT format data by recording the MMT format data as the SPAV format data.

[4. Processing in Case Where MMT Format Data is Recorded in Accordance with BDAV Format]

Next, processing in a case where the MMT format data is recorded in accordance with the BDAV format will be described.

As described above, the MMT format is a data distribution format that is used in an 4K image and the like to be distributed in the future by the broadcasting station and the like, and is a format according to a protocol stack described with reference to FIGS. 3A, 3B, 3C, and 3D.

On the other hand, the BDAV format is the data record format with respect to the medium, and as described with reference to FIG. 4, the database file including the reproduction control information file such as the playlist file or the clip information file is defined in the BDAV format.

Note that, the BDAV format corresponds to not only the data record format but also the data record and reproduction application standard, and in data reproduction recorded on the medium in accordance with the BDAV format, the reproduction processing is executed by using the reproduction application corresponding to the BDAV format.

Accordingly, in order to record the distribution contents according to the MMT format in the medium, and to perform the contents reproduction processing from the medium on which the distribution contents are recorded by using the reproduction application corresponding to the BDAV format, it is necessary to perform the data record according to the BDAV format.

As described above, currently, definition for extending the BDAV format and for enabling the MMT format data to be recorded and reproduced has been discussed.

For example, it has been discussed that in the case of performing processing in which the distribution data according to the MMT format, transmitted by the broadcasting station and the like, is received by the information processing apparatus such as a television, and the received data is recorded on the medium such as the BD, the flash memory, or the hard disk (HD), the image data, the sound data, the caption data, or data such as the management information (SI) is recorded as the packet string of the packet in which the data according to the MMT format is stored, as it is.

In other words, the packet string of the packet in which the data according to the MMT format is stored is recorded in a clip AV stream file [02001.mmtv and the like] that is set in the BDAV format shown in FIG. 4 or the SPAV format shown in FIG. 8.

Note that, a recording apparatus generates a playlist file or a clip information file in which control information corresponding to MMT format data is set to be recorded on the medium, as the playlist file or the clip information file that is the reproduction control information file corresponding to the clip AV stream file [02001.mmtv and the like] in which the MMT format data is stored. Such processing will be described below.

It has been discussed that the clip AV stream file in which the MMT format data is stored is recorded as a packet string of the MMT protocol (MMTP) packet, or the type length value (TLV) packet that is the upper packet of the MMTP packet.

A specific recording configuration example of the clip AV stream file in which the MMT format data is stored will be described with reference to FIGS. 9A, 9B, 9C and FIGS. 10A, 10B, 10C.

Figure 9:
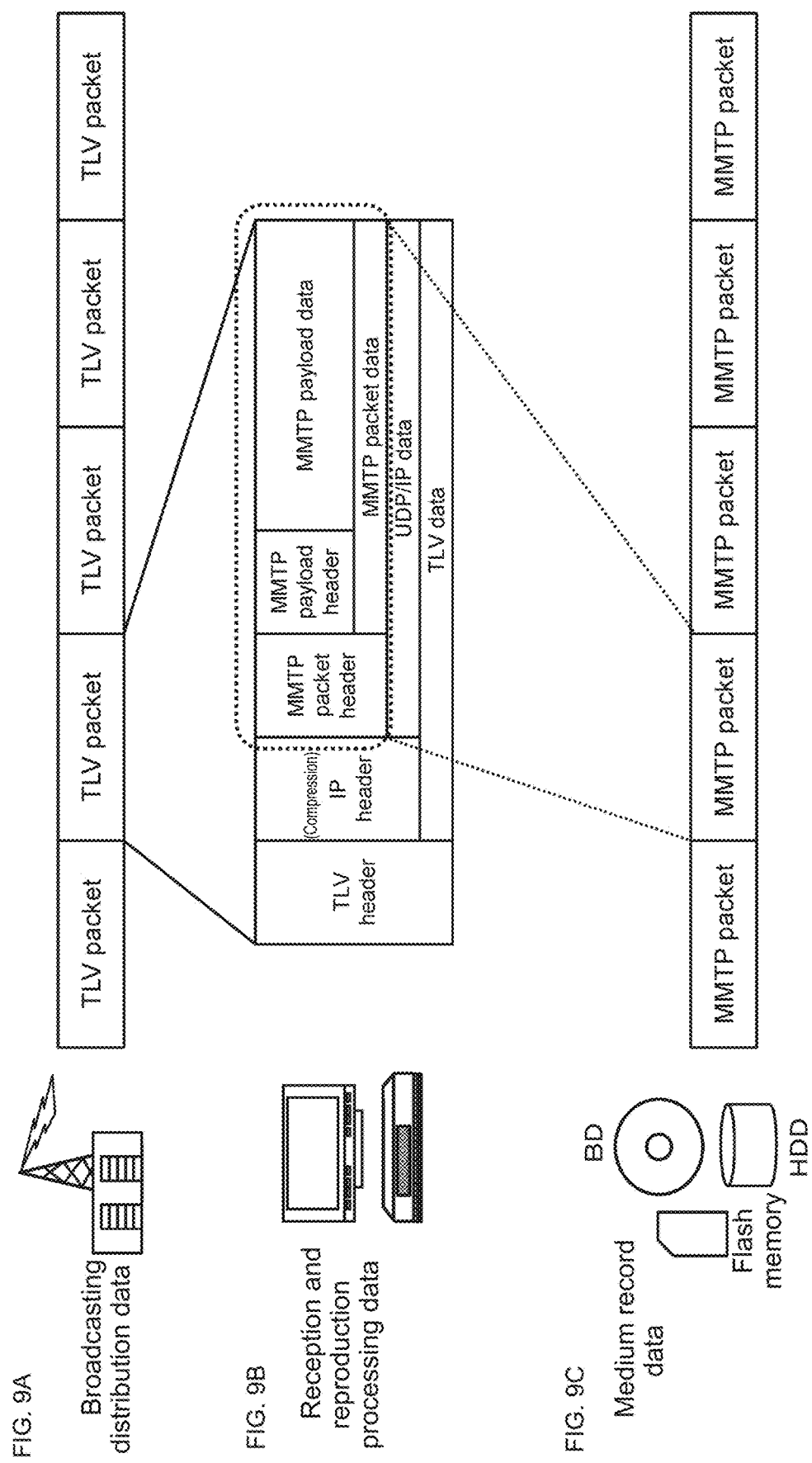
FIGS. 9A, 9B, and 9C are diagrams for describing a processing example of recording data received from a broadcasting station and the like in an information recording medium (medium), as an MMTP packet string that is MMT format data.

FIGS. 9A, 9B, and 9C are diagrams showing a processing example of recording an MMT protocol (MMTP) packet string according to the MMT format in the recording medium such as the BD, the flash memory, or the hard disk (HD).

FIGS. 9A, 9B, and 9C show three data items described below.

FIG. 9A TLV Packet String that is Broadcasting Distribution Data

FIG. 9B One TLV Packet that is Processed as Reception and Reproduction Data

FIG. 9C MMTP Packet String that is Proposed as Configuration of Medium Record Data.

(A) The TLV packet string that is the broadcasting distribution data is a string (a sequence) of the TLV packets having the MPEG media transport (MMT) format described above with reference to FIG. 2.

The TLV packet string is transmitted from the transmission apparatus 20 such as the broadcasting station.

(B) One TLV packet that is processed as the reception and reproduction data is one TLV packet that is received by the information processing apparatus 30 such as a television or a recorder, and is subjected to the reproduction processing. The detailed configuration of one TLV packet configuring the TLV packet string shown in (A) is shown.

The TLV packet is a TLV packet having the MPEG media transport (MMT) format described above with reference to FIG. 2.

(C) The MMTP packet string shown as the configuration of the medium record data is an MMTP packet string that has been currently proposed as the record data with respect to the medium.

As understood from a dotted line showing a correspondence relationship with respect to the FIG. 9B, the MMTP packet recorded on the medium is an MMTP packet that is configuration data of a part of the TLV packet, and includes the following elements.

(a) MMTP Packet Header (MMTP_packet_header)

(b) MMTP Packet Data (MMTP_packet_data)(=Payload)

Note that, the MMTP packet data (MMTP_packet_data) (=Payload) includes the following elements.

(b1) MMTP Payload Header (MMTP_payload_header)

(b2) MMTP Payload Data (MMTP_payload_data)

One configuration that has been currently proposed as the record data with respect to the information recording medium (medium) is a configuration as shown in FIG. 9C in which only the MMTP packet that is the constituent of the TLV packet is taken out, and is recorded by being aligned in a line.

Figure 10:
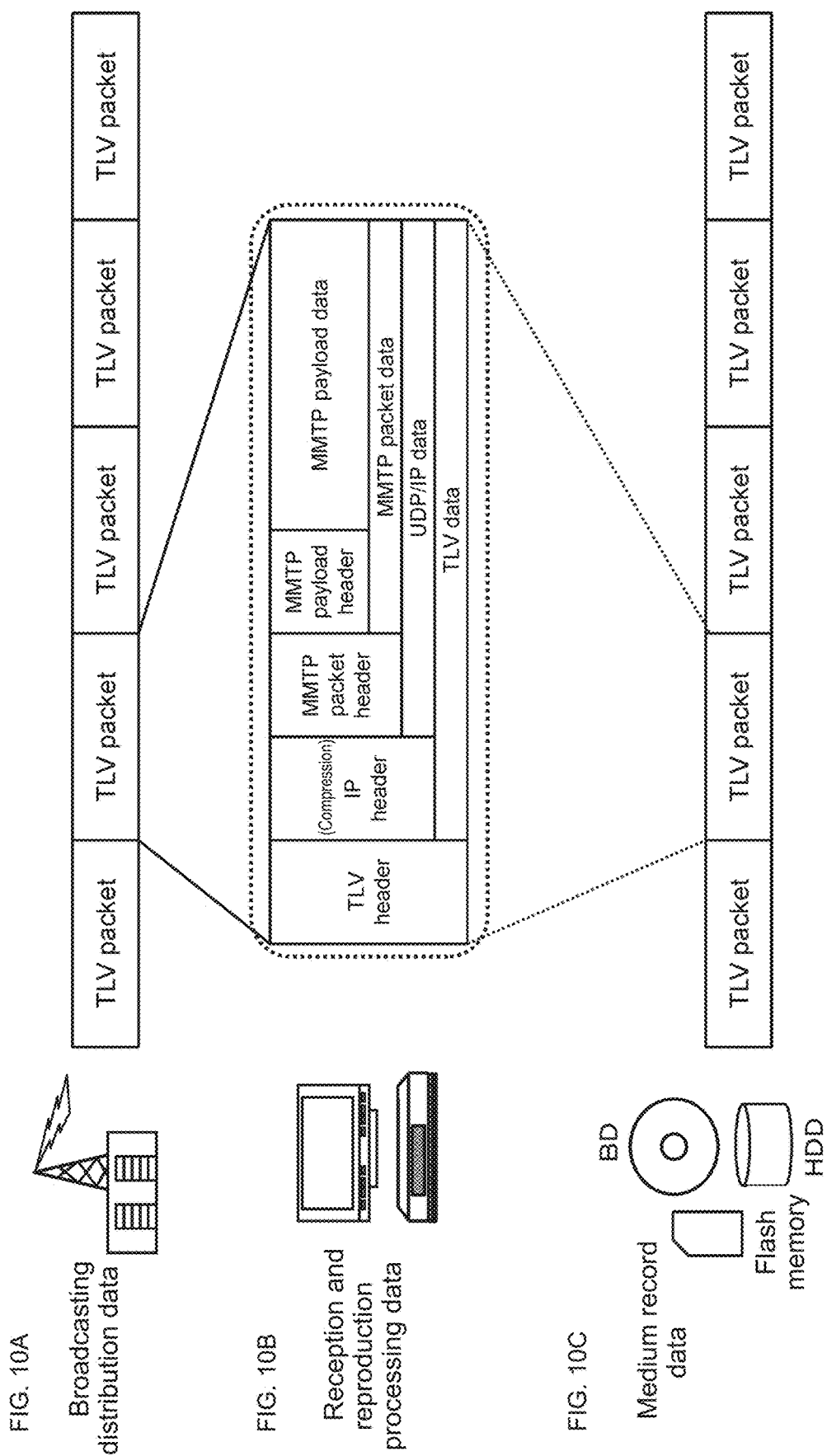
FIGS. 10A, 10B, and 10C are diagrams for describing a processing example of recording the data received from the broadcasting station and the like in the information recording medium (medium), as a TLV packet string in which the MMTP packet that is the MMT format data is stored.

FIGS. 10A, 10B, and 10C are diagrams showing a processing example of recording a packet string of an upper TLV packet in which the MMTP packet is stored, but not the MMT protocol (MMTP) packet, in the recording medium such as the BD, the flash memory, or the hard disk (HD).

FIGS. 10A, 10B, and 10C show three data items described below, as with FIGS. 9A, 9B, and 9C.

FIG. 10A TLV Packet String that is Broadcasting Distribution Data

FIG. 10B One TLV Packet that is Processed as Reception and Reproduction Data

FIG. 10C TLV Packet String that is Proposed as Configuration of Medium Record Data.

FIGS. 10A and 10B are the same data as that described with reference to FIGS. 9A, 9B, and 9C.

FIG. 10C The TLV packet string shown as the configuration of the medium record data is a TLV packet string that is another example that has been currently proposed as the record data with respect to the medium.

As understood from a dotted line showing a correspondence relationship with respect to FIG. 10B, the TLV packet recorded on the medium is a TLV packet including the MMTP packet, and includes the following elements.

(a) TLV Packet Header (TLV_header)
(b) TLV Packet Data (TLV_data) (=Payload)

As described above, as a recording mode of the MMT format data with respect to the medium such as the BD, currently, it has been discussed that the MMT format data is recorded as any one packet string of:

the packet string of the MMT protocol (MMTP) packet described with reference to FIGS. 9A, 9B, and 9C; or the packet string of the type length value (TLV) packet described with reference to FIGS. 10A, 10B, and 10C.

In a case where the MMT format data is recorded on the medium in accordance with the setting as shown in FIGS. 9A, 9B, and 9C or FIGS. 10A, 10B, and 10C, and the reproduction processing of the MMT format data is performed by using a reproduction application corresponding to the BDAV format, the reproduction is performed by using a reproduction control information file corresponding to the BDAV format, that is, the playlist file or the clip information file.

Note that, the BDAV format is the data record format, and also corresponds to the data record and reproduction application standard, and the reproduction of the data recorded on the medium in accordance with the BDAV format is executed by using the reproduction application corresponding to the BDAV format.

The BDAV format defines a database file intrinsic to the BDAV format such as the playlist file or the clip information file that is the reproduction control information file, and the reproduction application corresponding to BDAV executes the data reproduction processing by using the reproduction control information file (the database file).

As described above, the database file such as the playlist file or the clip information file of the BDAV format definition is originally defined as a file that can be generated on the basis of the distribution data of the MPEG-2TS format.

Accordingly, even in a case where the distribution data according to the MMT format different from the MPEG-2TS format is recorded in the playlist file or the clip information file of the existing BDAV format definition, as it is, there is a case where the distribution data is data in which the existing reproduction application corresponding to BDAV is not capable of being used.

In order to record the MMT format data in the medium, and to enable the contents reproduction to be performed by using the application corresponding to the BDAV format, it is necessary that a playlist file or a clip information file corresponding to MMT format data is generated and is recorded on the medium at the time of performing the record processing of the MMT format data with respect to the medium.

In addition, it is necessary to perform the reproduction by using the playlist file or the clip information file corresponding to MMT format data at the time of reproducing the MMT format data recorded on the medium.

Figure 11:
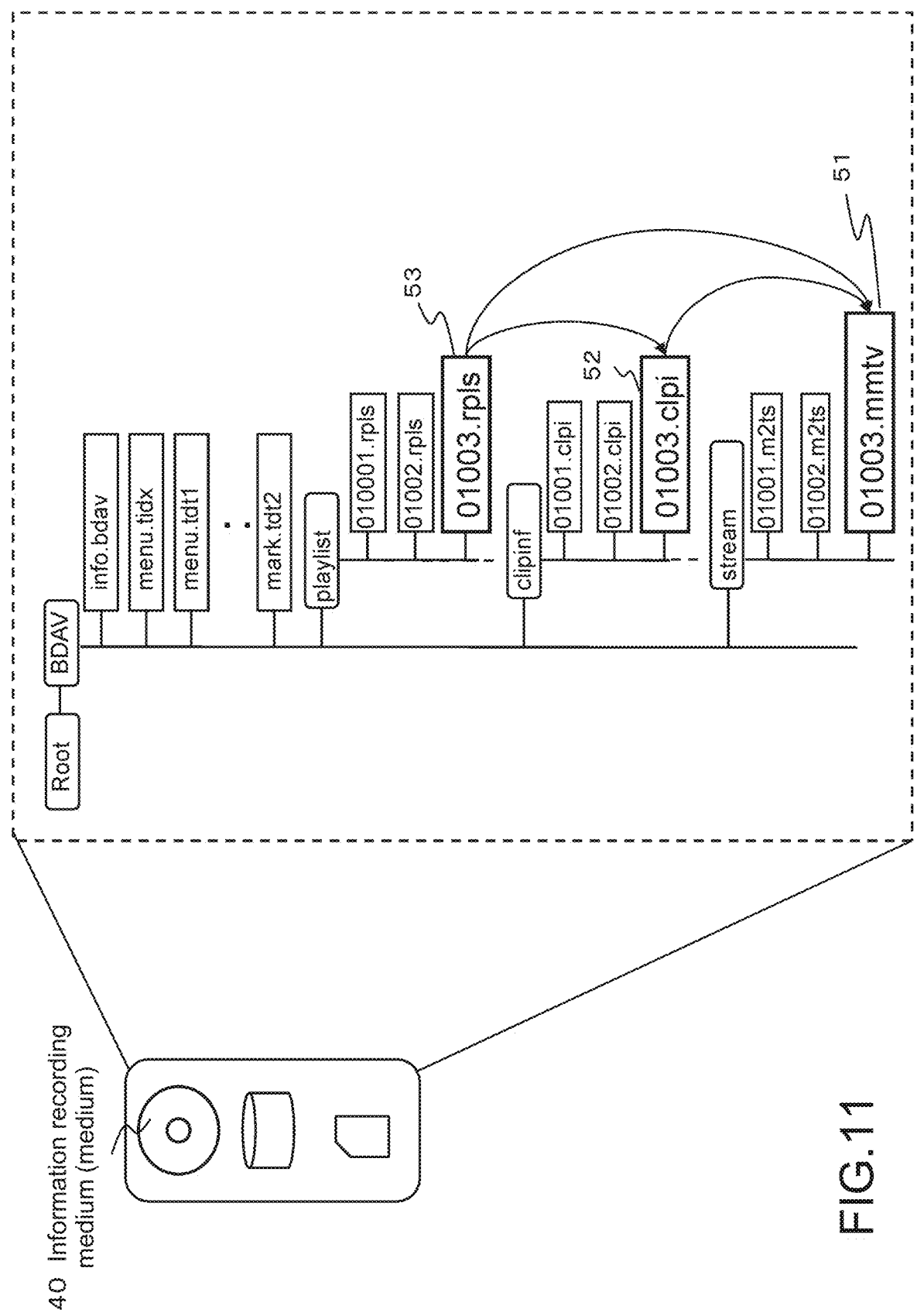
FIG. 11 is a diagram for describing a processing example in a case where the MMT format data is recorded as BDAV format data.

Specifically, as shown in FIG. 11, processing of generating a clip information file (nnnnn.clpi) 72 and a playlist file (nnnnn.rpls) 73 corresponding to an MMT format data storage clip AV stream file 71 are generated, of recording the clip information file (nnnnn.clpi) 72 and the playlist file (nnnnn.rpls) 73 in the medium (the BD, the flash memory, the HDD, and the like) to be used in the reproduction is necessary.

In a case where the MMT format data storage clip AV stream file 71 recorded on the medium is reproduced, the reproduction processing can be performed by using the clip information file (nnnnn.clpi) 72 and the playlist file (nnnnn.rpls) 73 corresponding to the MMT format data storage clip AV stream file 71.

However, as described above, data distributed in accordance with the MMT format that is the distribution data of the broadcasting station is not configured to include all of the record data items of the playlist file or the clip information file defined in the BDAV format.

In addition, the MMT format data storage clip AV stream file 71 is a data form different from that of the MPEG-2TS format data, and thus, even in the case of using a playlist file or a clip information file including data having the same form as that of the playlist file or the clip information file corresponding to MPEG-2TS format data, correct reproduction processing is not capable of being executed.

Accordingly, in order to record the MMT format data in the medium, and to perform the contents reproduction by using the application corresponding to the BDAV format, it is necessary to generate a playlist file or a clip information file having a data form intrinsic to the MMT format data that can perform the reproduction control of the MMT format data storage clip AV stream file 71, and to record the playlist file or the clip information file in the medium.

Hereinafter, specific processing thereof will be described.

[5. Regarding Mode of Copy Processing and Copy Control Information in MMT Format Data]

Next, a mode of copy processing for data recorded on a medium and copy control information in the MMT format data will be described.

For example, in a case where an MMTP packet or TLV packet in which content such as an image, a sound, or a caption is stored is recorded on a recording medium such as a BD (Blu-ray (registered trademark) Disc), a flash memory, or an HD (hard disk), a user may further copy that medium record data to another second medium.

However, as described above, much of the broadcasting content is content protected by copyright, and various types of copy control information are set in a unit of content such as programs.

For example, various types of copy control information are set in a unit of content (program) such as copy-allowed content, copy-prohibited content, and content for which an allowed number of times of copying or the number of copies is set.

Those copy control information items regarding the broadcasting content are stored in packets (TLV packet/

MMTP packet) transmitted together with program content via the broadcast wave and are transmitted to an information processing apparatus on the user side.

After those data items are recorded on a medium such as a BD, copy processing is performed by using, for example, an application corresponding to a BDAV format.

However, the existing application corresponding to a BDAV format does not include an algorithm to perform processing of referring to copy control information stored in the MMTP packet and determining whether copy processing is allowed or not.

So, if some countermeasures are not taken, unregulated copy processing in which the copy control information transmitted by the broadcast wave is ignored may be performed.

In order to solve this problem, a configuration of the present disclosure that enables reliable copy control conforming to the copy control information set in the MMT format data will be described later.

Prior to describing a configuration of the present disclosure, a mode of copy processing for data recorded on a medium and copy control information recorded in the MMT format data will be described.

Figure 12:
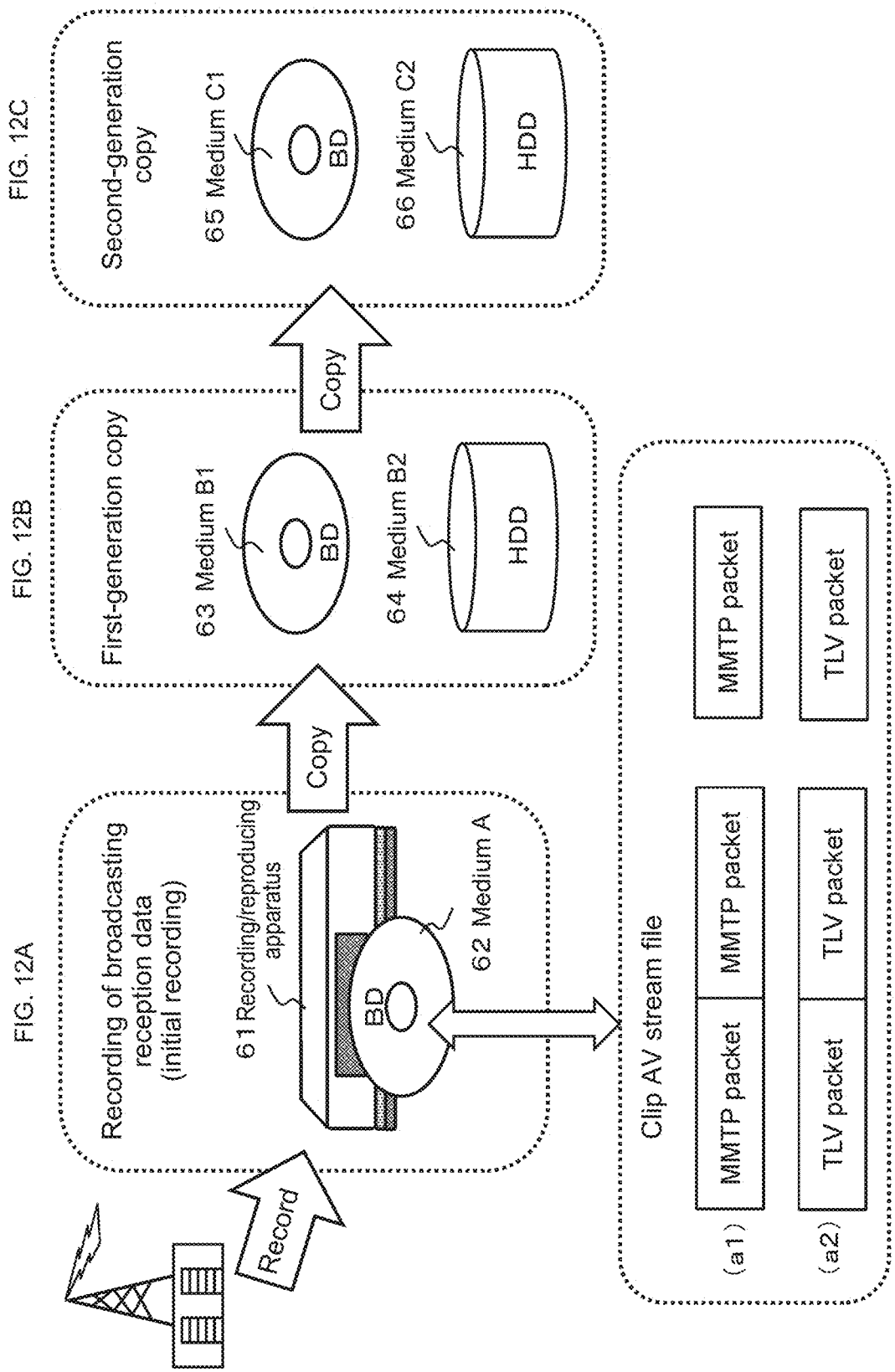
FIGS. 12A, 12B, and 12C are diagrams for describing a specific example of processing of recording the MMT format data on a recording medium and copying that record data to another medium.

First, with reference to FIGS. 12A, 12B, and 12C, a specific example of processing of recording the MMT format data in a recording medium such as a BD and copying that record data on another medium.

FIGS. 12A, 12B, and 12C show the following three types of processing.

FIG. 12A Initial recording of broadcasting reception data

FIG. 12B First-generation copy

FIG. 12C Second-generation copy (A) Initial recording of broadcasting reception data is processing of inputting data, which is received from a transmission apparatus such a broadcast station, to a recording/reproducing apparatus 61 and then recording the data on a medium A 62.

The medium A 62 is, for example, a BD, and as described above with reference to FIG. 11 or the like, the data is recorded as BDAV format data.

A clip AV stream file constituting the BDAV format data recorded on the medium A 62 is, as described above with reference to FIGS. 9A, 9B, 9C, 10A, 10B, and 10C, constituted by a MMTP packet string or a TLV packet string.

As shown in the lower part of FIGS. 12A, 12B, and 12C, the clip AV stream file constituted by a packet string, which is any of (a1) MMTP packet string and (a2) TLV packet string, is recorded on the medium A 62.

The recording/reproducing apparatus 61 or another recording/reproducing apparatus can copy the record data on the medium A 62 to another medium.

By this copy processing, as shown in FIG. 12B, a medium B1, 63, a medium B2, 64, and the like, which are media on which the first-generation copy data is recorded, can be generated.

Furthermore, the recording/reproducing apparatus 61 or another recording/reproducing apparatus can further copy the first-generation copy data recorded on the medium B1, 63, the medium B2, 64, and the like to a still another medium.

By this copy processing, as shown in FIG. 12C, a medium C1, 65, a medium C2, 66, and the like, which are media on which the second-generation copy data is recorded, can be generated.

The figure shows only the first generation and the second generation, but third-generation, fourth-generation, . . . , larger-number-generation copy data can further be created.

However, as described above, much of the broadcasting content is content protected by copyright, and various types of copy control information are set in a unit of content such as programs.

For example, various types of copy control information are set in a unit of content (program) such as copy-allowed content, copy-prohibited content, and content for which an allowed number of times of copying or the number of copies is set.

Those copy control information items regarding the broadcasting content are stored in packets (TLV packet/MMTP packet) transmitted together with program content via the broadcast wave and are transmitted to a reception apparatus on the user side.

Figure 13:
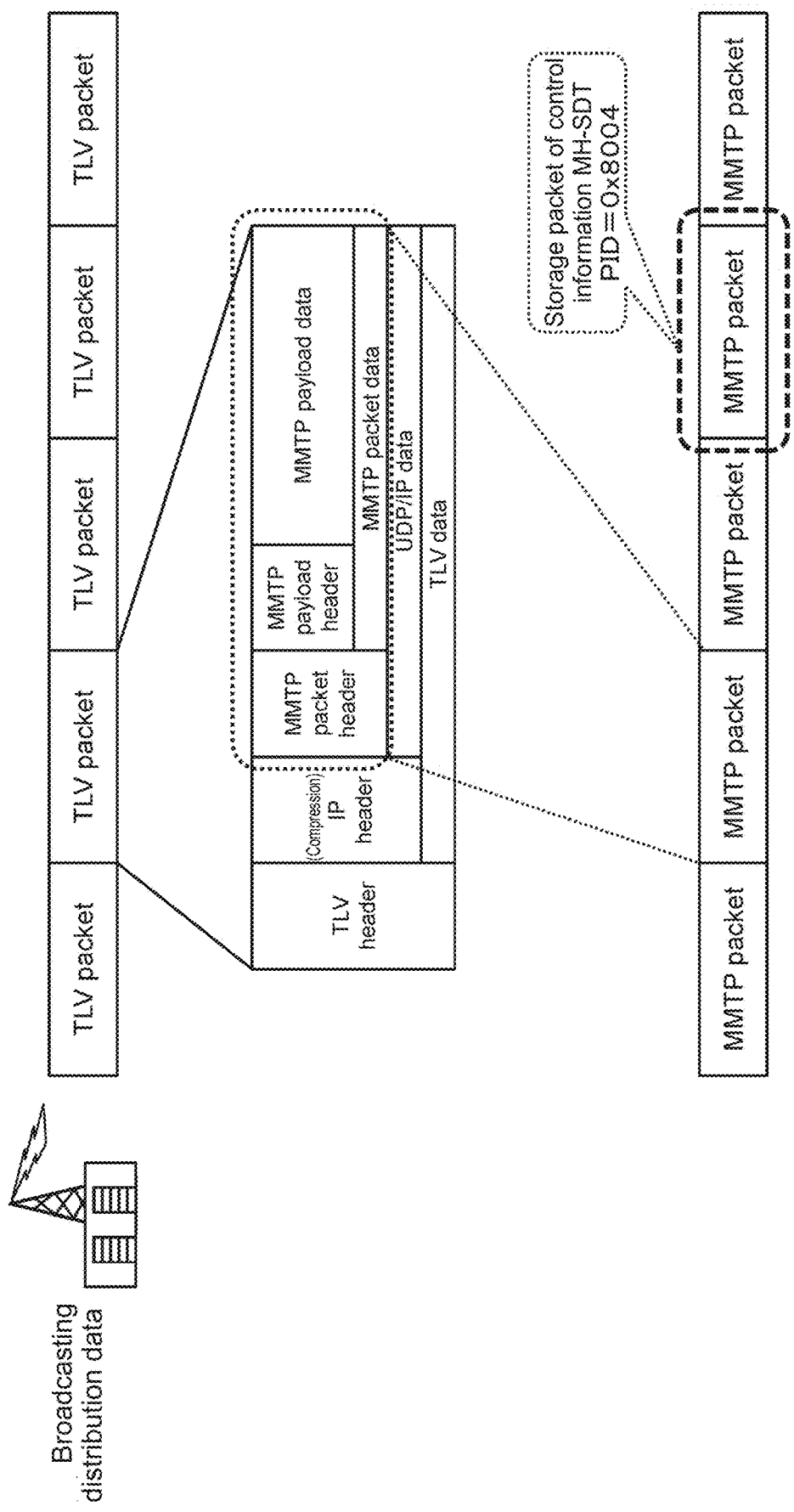

With reference to FIG. 13, the copy control information transmitted together with program content from a broadcast station or the like will be described.

FIG. 13 shows a TLV packet string transmitted by a transmission apparatus such as a broadcast station, a configuration of a TLV packet, and an MMTP packet string in which MMTP packets included in each TLV packet are extracted and arranged.

Each MMTP packet included in the MMTP packet string is configured as a packet in which reproduction target data such as an image, a sound, or a caption, control information (SI: Signaling Information), or the like is stored in a unit of data type.

Which type of data is stored in each MMTP packet is identifiable from a packet ID (PID) recorded in the header of the MMTP packet.

For example, the copy control information is recorded in a service description table (MH-SDT) that is a control information record table defined in the MMT format.

Note that the MMT format includes various control information record tables corresponding to the types of recorded control data. Specifically, for example, the following tables are provided.

(a) TLV-NIT (network information table)
(b) MH-BIT (broadcaster information table)
(c) MH-SDT (service description table)
(d) MH-EIT (event information table)
(e) MH-TOT (time offset table)
(f) MPT (MMT package table)

The service description table (MH-SDT) is one of those tables and is, for example, a table in which channel-relevant information such as a channel name or a broadcaster name is recorded.

The copy control information is included in the service description table (MH-SDT).

As shown in FIG. 13, in the MMTP packet in which the service description table (MH-SDT) is stored, PID=0x8004 is recorded as a packet ID (PID).

The apparatus on the user side takes out the service description table (MH-SDT) from the packet set with the PID=0x8004, and acquires copy control information from described data thereof.

Figure 14:
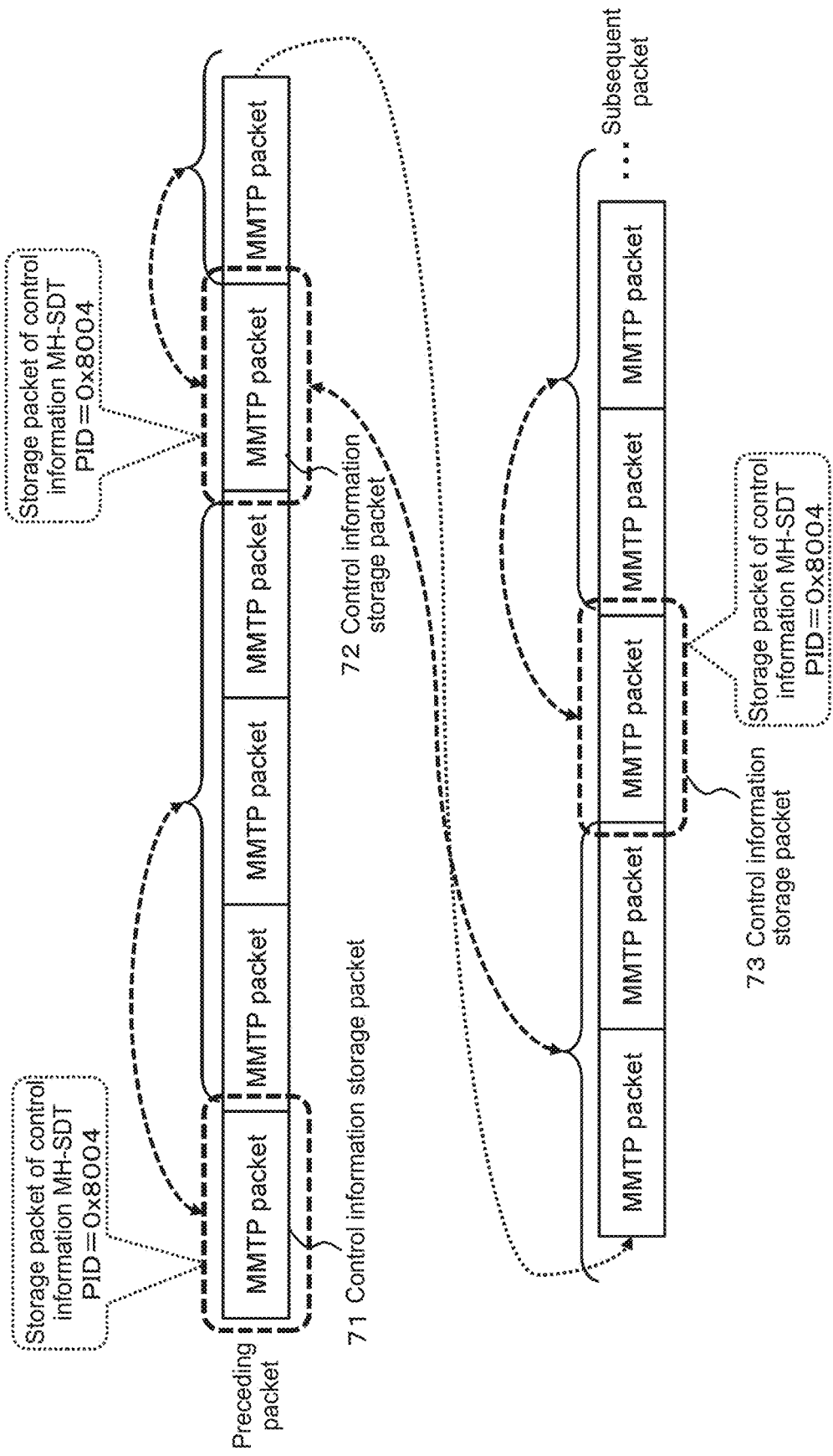

Note that, as shown in FIG. 14, the MMTP packet in which the service description table (MH-SDT) is stored is transmitted at intervals of several seconds, the copy control information stored in one MH-SDT storage packet is applied to content stored in subsequent reproduction target data storage packets.

For example, a control information storage packet 71 in which the service description table (MH-SDT) shown in FIG. 14 is stored is utilized as copy control information related to content such as an image, a sound, or a caption stored in the subsequent MMTPs in a period of time to the next control information storage packet 72.

The control information storage packet 72 is utilized as copy control information related to content stored in the subsequent MMTPs in a period of time to the next control information storage packet 73.

In such a manner, the copy control information related to the content stored in the MMTPs can be confirmed with reference to the service description table (MH-SDT) stored in the control information storage packet.

Next, with reference to FIG. 15 and the following figures, a specific data configuration of the service description table (MH-SDT) will be described.

FIG. 15 is a diagram showing a data configuration (syntax) of the service description table (MH-SDT) stored in the MMTP packet.

Note that the number of bits (No. of bits) and data notation (Mnemonic) are shown together with the data configuration (Syntax).

Note that "uimsbf" in the data notation means a notation of "unsigned integer most significant bit first".

"bslbf" means "bit string, left bit first".

Note that the control information related to the MMT format data is recorded in a plurality of tables in accordance with the types of that control information (categories).

As described above, for example, the following tables are provided.

(a) TLV-NIT (network information table)
(b) MH-BIT (broadcaster information table)
(c) MH-SDT (service description table)
(d) MH-EIT (event information table)
(e) MH-TOT (time offset table)
(f) MPT (MMT package table)

Furthermore, in those tables, low-order, subdivided control information items included in particular categories are recorded in a unit of descriptor.

In a descriptor record region of the service description table (MH-SDT) shown in FIG. 15, descriptors of (1) content copy control descriptor, and
(2) content usage control descriptor are recorded.

The specific data configuration of those two descriptors will be described with reference to FIGS. 16 and 17.

First, the data configuration (Syntax) of "(1) content copy control descriptor" will be described with reference to FIG. 16.

In the content copy control descriptor shown in FIG. 16, as shown in the figure, for example, the following data items are recorded.

Descriptor tag (descriptor_tag)

Digital recording control data (digital_recording_control_data)

Component control flag (component_control_flag)

In the descriptor tag (descriptor_tag), an identification tag (0x8038) indicating that this descriptor is a content copy control descriptor is recorded.

In the digital recording control data (digital_recording_control_data), a value indicating whether to execute copy processing as digital recording is recorded.

A specific example will be described later with reference to FIG. 18 and the like.

In the component control flag (component control flag), a value indicating whether this descriptor (content copy control descriptor) is valid or not is recorded. For example, the following 1 bit is recorded.

Valid=0
Invalid=1

Next, the data configuration (Syntax) of "content usage control descriptor", which is the other one of the descriptors recorded as descriptors of the service description table (MH-SDT) shown in FIG. 15, will be described with reference to FIG. 17.

As shown in FIG. 17, in the "content usage control descriptor", for example, the following data items are recorded.

Copy number restriction mode (copy_restriction_mode)
Encryption mode (encryption_mode)

In the copy number restriction mode (copy_restriction_mode), data on whether a copy number, which is an allowed number of times of copying, is restricted or not is recorded.

For example, the following data items are recorded.
With copy number restriction=1
Without copy number restriction=0

In the encryption mode (encryption_mode), data on whether or not output data in copy processing needs to be output as encryption data is recorded.

For example, the following data items are recorded.
Encryption necessary for output data=0
Encryption unnecessary for output data=1

In the service description table (MH-SDT) shown in FIG. 15, as described above with reference to FIGS. 16 and 17, the following three types of copy control-relevant information are recorded.

(A) Digital recording control information (digital_recording_control_data)
(B) Encryption information (encryption_mode)
(C) Copy number restriction information (copy_restriction_mode)

FIG. 18 shows a table showing, as a list, the types of digital copy control mode (five types) and the settings for three types of control information defined in the MMT format.

FIG. 18 shows the following five types as the types of digital copy control mode.

(1) Copy allowed without constraint condition but encryption necessary for output copy data
(2) Copy allowed without constraint condition and encryption unnecessary for output copy data
(3) Copy prohibited
(4) Copy allowed for only first generation with copy number restriction
(5) Copy allowed for only first generation without copy number restriction Regarding the five types of digital copy control mode, the settings for the three types of control information defined in the MMT format are as follows as shown in the figure.

(1) Copy allowed without constraint condition but encryption necessary for output copy data
(A) Digital recording control information=00 (digital recording allowed)
(B) Encryption information=0 (encryption necessary for output copy data)
(C) Copy number restriction mode=Don't Care (Not defined)

(2) Copy allowed without constraint condition and encryption unnecessary for output copy data
(A) Digital recording control information=00 (digital recording allowed)
(B) Encryption information=1 (encryption unnecessary for output copy data)
(C) Copy number restriction mode=Don't Care (Not defined)

(3) Copy prohibited
(A) Digital recording control information=11 (digital recording not allowed)
(B) Encryption information=Don't Care (Not defined)
(C) Copy number restriction mode=Don't Care (Not defined)
(4) Copy allowed for only first generation with copy number restriction
(A) Digital recording control information=10 (digital recording allowed for only first generation)
(B) Encryption information=0 (encryption necessary for output copy data)
(C) Copy number restriction mode=1 (with copy number restriction)
(5) Copy allowed for only first generation without copy number restriction
(A) Digital recording control information=10 (digital recording allowed for only first generation)
(B) Encryption information=0 (encryption necessary for output copy data)
(C) Copy number restriction mode=1 (without copy number restriction)

Regarding the five types of digital copy control mode (1) to (5) shown in FIG. 18, the three types of control information items defined in the MMT format, i.e.,
(A) Digital recording control information (digital_recording_control_data)
(B) Encryption information (encryption_mode)
(C) Copy number restriction information (copy_restriction_mode)
have record data items set as described above as shown in FIG. 18.

[6. Configuration Enabling Information Processing Apparatus that Executes Copy Processing to Acquire Copy Control Information of MMT Format Data Recorded on Medium]

Next, description will be given on a configuration enabling an information processing apparatus that executes copy processing to perform reliable copy control conforming to the copy control information of the MMT format data recorded on a medium.

As described above, after the broadcasting content data is recorded on a medium such as a BD, copy processing is performed by using, for example, an application corresponding to a BDAV format.

However, the existing application corresponding to a BDAV format does not include an algorithm to perform processing of referring to copy control information stored in the MMTP packet and determining whether copy processing is allowed or not.

So, if some countermeasures are not taken, unregulated copy processing in which the copy control information transmitted by the broadcast wave is ignored may be performed.

Hereinafter, a configuration to solve this problem will be described.

In other words, description will be given on a configuration enabling, in a case where distribution data according to the MMT format is input and recorded on a recording medium such as a BD, and that record data is copied on another medium, reliable copy control conforming to the copy control information set in the original MMT format data.

[6-1. Additional Header in which Copy Control Information is Recorded]

First, the general outline of the configuration of the present disclosure, i.e., an additional header in which the copy control information is recorded will be described with reference to FIGS. 19 and 20.

In the configuration of the present disclosure, an information processing apparatus, which inputs transmission data from a transmission apparatus such as a broadcast station and executes data recording (initial recording) on a medium, acquires a service description table (MH-SDT) included in the input MMT format data and reads copy control information recorded in the service description table (MH-SDT).

Furthermore, the information processing apparatus generates a header (additional header) in which the copy control information acquired from the service description table (MH-SDT) is recorded, inserts the header at the top of each MMTP packet or at the top of each TLV packet, and records the data on a medium.

Figure 19:
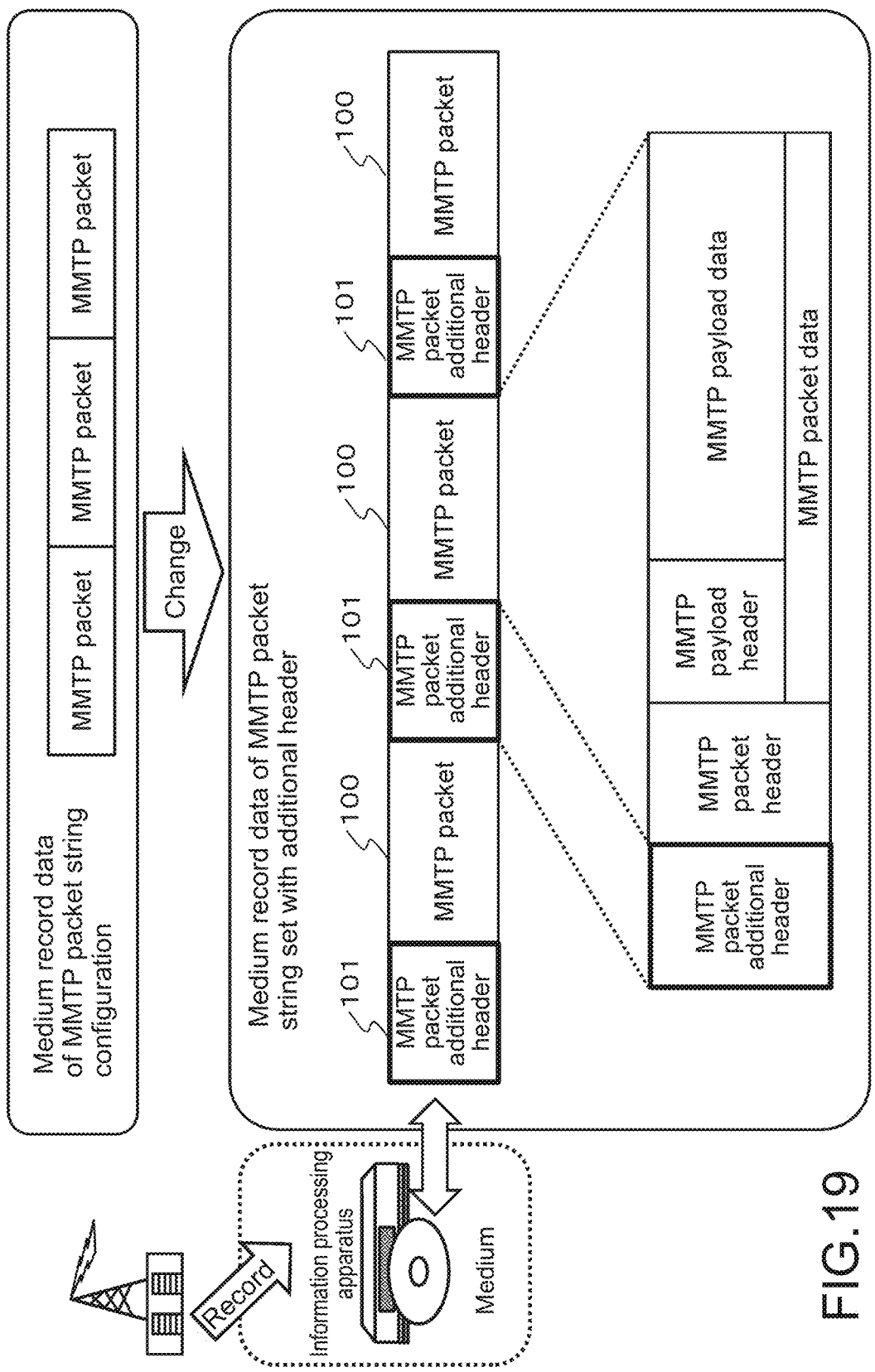
FIG. 19 is a diagram showing a processing example in a case where a packet string recorded on a medium is an MMTP packet string.

FIG. 19 is a diagram showing a processing example in a case where a packet string recorded on a medium is the MMTP packet string.

As shown in FIG. 19, an information processing apparatus, which inputs transmission data from a transmission apparatus such as a broadcast station and executes data recording (initial recording) on a medium, sets an additional header (MMTP packet additional header 101) at the top of each MMTP packet 100 to be recorded on a medium and records the data on the medium.

In the MMTP packet additional header 101, copy control information corresponding to data stored in a subsequent MMTP packet 100 is recorded.

Specifically, for example, an additional header in which values of three types of control information defined in the MMT format described with reference to FIG. 18, i.e.,
(A) Digital recording control information (digital_recording_control_data),
(B) Encryption information (encryption_mode), and
(C) Copy number restriction information (copy_restriction_mode)
are recorded is recorded.

By recording the additional header on a medium, a copy apparatus (information processing apparatus) that executes the copy processing can acquire the set values of the copy control information corresponding to the MMT format regarding the data stored in a subsequent MMTP packet, i.e.,
(A) Digital recording control information (digital_recording_control_data),
(B) Encryption information (encryption_mode), and
(C) Copy number restriction information (copy_restriction_mode)
on the basis of the recorded content of the additional header.

As a result, it is possible to determine whether the data stored in the MMTP packet subsequent to that additional header is copy control target content corresponding to any one of those five types of digital copy control modes (1) to (5) shown in FIG. 18, i.e.,
(1) Copy allowed without constraint condition but encryption necessary for output copy data,
(2) Copy allowed without constraint condition and encryption unnecessary for output copy data,
(3) Copy prohibited,
(4) Copy allowed for only first generation with copy number restriction, and
(5) Copy allowed for only first generation without copy number restriction.

On the basis of the determination, the copy apparatus (information processing apparatus) that executes the copy processing can perform data copy processing between media while conforming to the copy control information corresponding to the original MMT format in a unit of the MMTP packet.

The example of FIG. 19 is a processing example in a case where the record data on a medium is the MMTP packet string.

As described above with reference to FIGS. 9A, 9B, 9C, 10A, 10B, and 10C, it is assumed that the record data on a medium is set to the MMTP packet string or the TLV packet string.

An example of setting the additional header in a case where the record data on a medium is the TLV packet string will be described with reference to FIG. 20.

Figure 20:
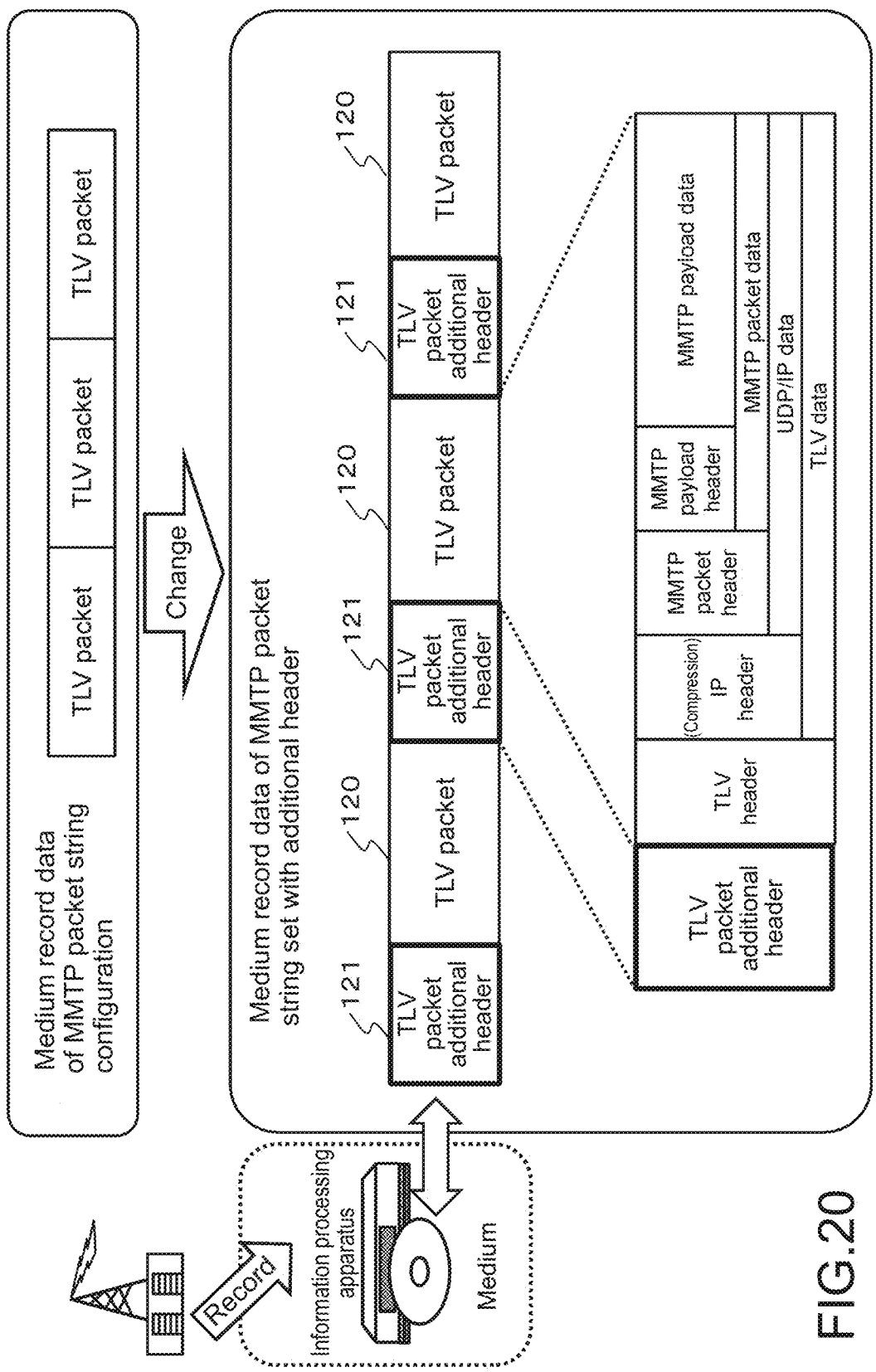
FIG. 20 is a diagram showing a processing example in a case where a packet string recorded on a medium is a TLV packet string.

In this case, as shown in FIG. 20, an information processing apparatus, which inputs transmission data from a transmission apparatus such as a broadcast station and executes data recording (initial recording) on a medium, sets an additional header (TLV packet additional header 121) at the top of each TLV packet 120 to be recorded on a medium and records the data on the medium.

In the TLV packet additional header 121, copy control information corresponding to data stored in a subsequent TLV packet 120 is recorded.

In other words, values of
(A) Digital recording control information (digital_recording_control_data)
(B) Encryption information (encryption_mode)
(C) Copy number restriction information (copy_restriction_mode)
are recorded is recorded.

When the additional header is recorded on a medium, a copy apparatus (information processing apparatus), which executes the copy processing, can acquire set values of the copy control information corresponding to the MMT format regarding the data stored in a subsequent TLV packet, i.e.,
(A) Digital recording control information (digital_recording_control_data)
(B) Encryption information (encryption_mode)
(C) Copy number restriction information (copy_restriction_mode),
on the basis of the recorded content of the additional header.

As a result, it is possible to determine that the data stored in the TLV packet subsequent to that additional header is copy control target content corresponding to any one of those five types of digital copy control mode (1) to (5) shown in FIG. 18, i.e.,
(1) Copy allowed without constraint condition but encryption necessary for output copy data
(2) Copy allowed without constraint condition and encryption unnecessary for output copy data
(3) Copy prohibited
(4) Copy allowed for only first generation with copy number restriction
(5) Copy allowed for only first generation without copy number restriction.

On the basis of the determination, the copy apparatus (information processing apparatus), which executes the copy processing, can perform data copy processing between media while conforming to the copy control information corresponding to the original MMT format in a unit of the MMTP packet.

Hereinafter, an example of the data configuration (Syntax) of the record data in the MMTP packet additional header 101 shown in FIG. 19 and the TLV packet additional header 121 shown in FIG. 20 will be described.

[6-2. Example of Additional Header in Which Copy Control Information is Recorded (Example 1)]

First, with reference to FIG. 21 and the following figures, an example of a data configuration (Syntax) example of the record data in the MMTP packet additional header 101 shown in FIG. 19 and the TLV packet additional header 121 shown in FIG. 20 (Example 1) will be described.

FIG. 21 is a diagram showing an example of the data configuration (Syntax) of the MMTP packet additional header 101 shown in FIG. 19.

As shown in FIG. 21, the following data items are recorded in the MMTP packet additional header.
(A) Digital recording control information (digital_recording_control_data) 201
(B) Encryption information (encryption_mode) 202
(C) Copy number restriction information (copy_restriction_mode) 203

Those data items correspond to the data items recorded in the service description table (MH-SDT), which is the control information record table defined in the MMT format described above with reference to FIGS. 15 to 18.

As shown in FIG. 18, (A) Digital recording control information (digital_recording_control_data) has any of the following settings.
Digital recording allowed (set bit value=00)
Digital recording not allowed (11)
Digital recording allowed for only first generation (10)

As shown in FIG. 18, (B) Encryption information (encryption_mode) has any of the following settings.
Encryption necessary for output copy data (0)
Encryption unnecessary for output copy data (1)

As shown in FIG. 18, (C) Copy number restriction information (copy_restriction_mode) has any of the following settings.
With copy number restriction (1)
Without copy number restriction (0)

An information processing apparatus, which inputs transmission data from a transmission apparatus such as a broadcast station and executes data recording (initial recording) on a medium, acquires the service description table (MH-SDT) included in the input MMT format data and reads the above-mentioned copy control information items (A) to (C) recorded in the service description table (MH-SDT).

Furthermore, the information processing apparatus generates an MMTP packet additional header, in which the copy control information items (A) to (C) acquired from the service description table (MH-SDT) are recorded, sets the additional header at the top of each MMTP packet, and records the data on a medium.

Note that a setting of recording only at least one of the data items selected from the above-mentioned (A) to (C) in the additional header is also possible.

The set values of
(A) Digital recording control information (digital_recording_control_data) 201
(B) Encryption information (encryption_mode) 202
(C) Copy number restriction information (copy_restriction_mode) 203
in the MMTP packet additional header shown in FIG. 21 are copy control information of the data stored in a subsequent MMTP packet.

In such a manner, in this example, the copy control information in a unit of the MMTP packet is recorded in the MMTP packet additional header.

For example, an information processing apparatus, which tries to copy the data including the MMTP packet string recorded on a medium to another medium, reads the data in the additional header set in each MMTP packet. Thus, the information processing apparatus can acquire the copy control information in the subsequent MMTP packet and perform the copy processing conforming to the copy control information corresponding to the original MMT format data.

Note that as shown in FIG. 21, length data indicating the length of the MMTP packet (packet length) is also recorded at the top of the MMTP packet additional header.

This is because the length data indicating the length of the MMTP packet (packet length) is not recorded in the original MMTP packet header intrinsically set in the MMTP packet.

When the length data is recorded in the additional header, for example, an apparatus that executes the copy processing can grasp a delimiting position of each MMTP packet from the MMTP packet string recorded on a medium, and sequentially acquire and read the MMTP packet additional header at the top of the MMTP packet.

Next, with reference to FIG. 22, a data configuration (Syntax) of the TLV packet additional header 121 described above with reference to FIG. 20 will be described.

As shown in FIG. 22, the following data items are recorded in the TLV packet additional header.

(A) Digital recording control information (digital_recording_control_data) 211

(B) Encryption information (encryption_mode) 212

(C) Copy number restriction information (copy_restriction_mode) 213

Those data items are data items similar to the record data in the MMTP packet additional header described with reference to FIG. 21.

In other words, those data items correspond to the data items recorded in the service description table (MH-SDT), which is the control information record table defined in the MMT format described above with reference to FIGS. 15 to 18.

An information processing apparatus, which inputs transmission data from a transmission apparatus such as a broadcast station and executes data recording (initial recording) on a medium, acquires the service description table (MH-SDT) included in the input MMT format data and reads the above-mentioned copy control information items (A) to (C) recorded in the service description table (MH-SDT).

Furthermore, the information processing apparatus generates an additional header of the TLV packet, in which the copy control information items (A) to (C) acquired from the service description table (MH-SDT) are recorded, sets the additional header at the top of each TLV packet, and records the data on a medium.

Note that a setting of recording only at least one of the data items selected from the above-mentioned (A) to (C) in the additional header is also possible.

The set values of (A) Digital recording control information (digital_recording_control_data) 211

(B) Encryption information (encryption_mode) 212

(C) Copy number restriction information (copy_restriction_mode) 213 in the additional header of the TLV packet shown in FIG. 22 are copy control information of the data stored in a subsequent MMTP packet.

In such a manner, in this example, the copy control information in a unit of the TLV packet is recorded in the additional header of the TLV packet.

For example, an information processing apparatus, which tries to copy the data including the TLV packet string recorded on a medium to another medium, reads the data in the additional header set in each TLV packet. Thus, the information processing apparatus can acquire the copy control information in the subsequent TLV packet and perform the copy processing conforming to the copy control information corresponding to the original MMT format data.

Note that the length data indicating the length of the packet (packet length) described above with reference to FIG. 21 is not recorded in the additional header of the TLV packet shown in FIG. 22.

This is because the length data indicating the length of the TLV packet (packet length) is recorded in the original TLV packet header intrinsically set in the TLV packet.

For example, an apparatus that executes the copy processing can grasp a delimiting position of each TLV packet from the TLV packet string recorded on a medium, and sequentially acquire and read the additional header of the TLV packet at the top of the TLV packet on the basis of the record data of the original TLV packet header.

[6-3. Example of Additional Header in Which Copy Control Information is Recorded (Example 2)]

Next, with reference to FIG. 23 and the following figures, a second example of a data configuration (Syntax) example of the record data in the MMTP packet additional header 101 shown in FIG. 19 and the TLV packet additional header 121 shown in FIG. 20 (Example 2) will be described.

FIG. 23 is a diagram showing a second example of the data configuration (Syntax) of the MMTP packet additional header 101 shown in FIG. 19.

As shown in FIG. 23, the following data items are recorded in the MMTP packet additional header.

(A) Digital recording control information (digital_recording_control_data) 201

(B) Encryption information (encryption_mode) 202

(C) Copy number restriction information (copy_restriction_mode) 203

(D) Encryption flag (encryption_flag) 204

The information items (A) to (C) are the same information items as those described above with reference to FIG. 21.

In other words, those data items (A) to (C) correspond to the data items recorded in the service description table (MH-SDT), which is the control information record table defined in the MMT format described above with reference to FIGS. 15 to 18.

The set values of (A) Digital recording control information (digital_recording_control_data) 201

(B) Encryption information (encryption_mode) 202

(C) Copy number restriction information (copy_restriction_mode) 203 in the MMTP packet additional header shown in FIG. 23 are copy control information of the data stored in a subsequent MMTP packet.

In this example, in addition to the information items (A) to (C), the following data item, i.e., (D) Encryption flag (encryption_flag) 204 is recorded in the additional header.

The encryption flag 204 is a flag indicating whether the data stored in the MMTP packet set in the MMTP packet additional header is encryption data or not.

For example, the encryption flag=00 means that the data stored in the MMTP packet is unencrypted data (=plain text data).

The encryption flag=11 means that the data stored in the MMTP packet is encryption data.

Note that the encryption data also includes, for example, scrambled data.

In such a manner, in this example, in addition to the information items of (A) Digital recording control information (digital_recording_control_data) 201, (B) Encryption information (encryption_mode) 202, and (C) Copy number restriction information (copy_restriction_mode) 203, (D) Encryption flag (encryption_flag) 204 is recorded in the additional header as the copy control information in a unit of the MMTP packet.

For example, an information processing apparatus that intends to copy the data including the MMTP packet string recorded on a medium to another medium reads the data in the additional header set in each MMTP packet. Thus, the information processing apparatus can acquire the copy control information in the subsequent MMTP packet and perform the copy processing conforming to the copy control information corresponding to the original MMT format data.

Furthermore, in this example, whether the data stored in the MMTP packet is encryption data or plain text data can be instantly determined on the basis of the encryption flag 204 recorded in the MMTP packet additional header. Thus, for example, in a case where the reproduction processing is performed, whether it is necessary to perform decoding processing or not can be instantly determined in a unit of the MMTP packet.

Further, also in copy processing, whether or not it is necessary to perform decoding processing or re-encryption processing for copy target data can be instantly determined in a unit of the MMTP packet on the basis of the encryption flag 204.

Next, with reference to FIG. 24, a second data configuration (Syntax) example of the TLV packet additional header 121 described above with reference to FIG. 20 will be described.

As shown in FIG. 24, the following data items are recorded in the TLV packet additional header.

(A) Digital recording control information (digital_recording_control_data) 211

(B) Encryption information (encryption_mode) 212

(C) Copy number restriction information (copy_restriction_mode) 213

(D) Encryption flag (encryption_flag) 214

Those data items are data items similar to the record data in the MMTP packet additional header described with reference to FIG. 23.

In other words, the copy control information items (A) to (C) described above correspond to the data items recorded in the service description table (MH-SDT), which is the control information record table defined in the MMT format described above with reference to FIGS. 15 to 18.

(D) Encryption flag (encryption_flag) 214 is a flag indicating whether the data stored in the TLV packet set in the TLV packet additional header is encryption data or not.

For example, the encryption flag=00 means that the data stored in the TLV packet is unencrypted data (=plain text data).

The encryption flag=11 means that the data stored in the TLV packet is encryption data.

In such a manner, in this example, in addition to the information items of (A) Digital recording control information (digital_recording_control_data) 211, (B) Encryption information (encryption_mode) 212, and (C) Copy number restriction information (copy_restriction_mode) 213

(D) Encryption flag (encryption_flag) 214 is recorded in the additional header as the copy control information in a unit of the TLV packet.

For example, an information processing apparatus that intends to copy the data including the TLV packet string recorded on a medium to another medium reads the data in the additional header set in each TLV packet. Thus, the information processing apparatus can acquire the copy control information in the subsequent TLV packet and perform the copy processing conforming to the copy control information corresponding to the original MMT format data.

Furthermore, in this example, whether the data stored in the TLV packet is encryption data or plain text data can be instantly determined on the basis of the encryption flag 214 recorded in the TLV packet additional header. Thus, for example, in a case where the reproduction processing is performed, whether it is necessary to perform decoding processing or not can be instantly determined in a unit of the TLV packet.

Further, also in copy processing, whether or not it is necessary to perform decoding processing or re-encryption processing for copy target data can be instantly determined in a unit of the TLV packet on the basis of the encryption flag 214.

Note that an information processing apparatus that receives an input of the MMT format data from a transmission apparatus such as a broadcast station and records the MMTP packet string or TLV packet string data on a medium (initial recording) needs to determine a set value (00 or 11) of the encryption flag described with reference to FIGS. 23 and 24.

In other words, in order to record the encryption flag described with reference to FIGS. 23 and 24 in the MMTP packet additional header or TLV packet additional header, it is necessary to confirm whether the data stored in the MMTP packet or TLV packet set for the additional header is encryption data or not.

For the confirmation processing, the information processing apparatus refers to the information (hdr_ext_byte) recorded in the original MMTP packet header of the MMTP packet in each TLV packet.

This processing will be described with reference to FIG. 25 and the like.

Figure 25:
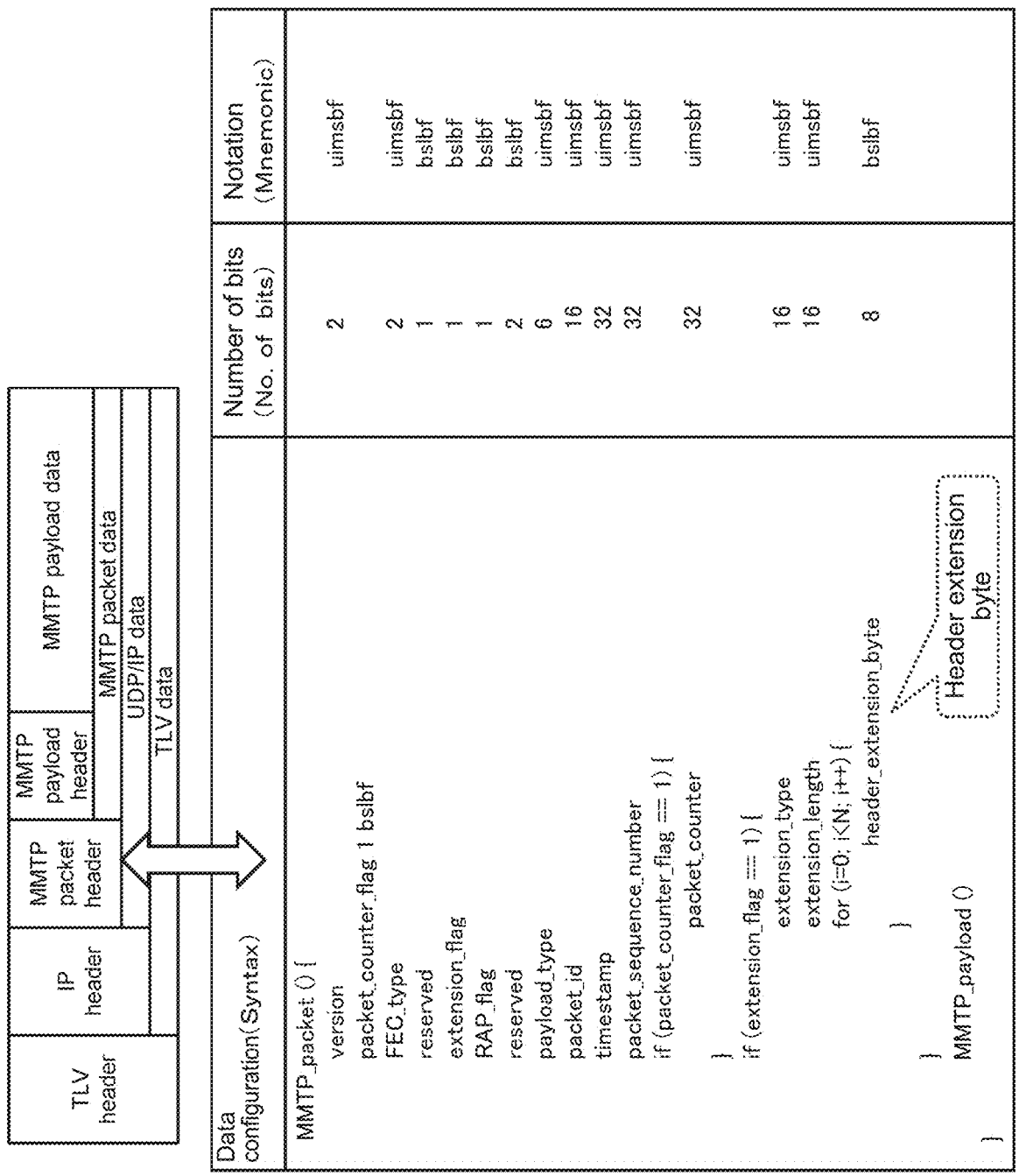
FIG. 25 is a diagram showing an example of a data configuration (Syntax) of an MMTP packet additional header.

FIG. 25 shows a data configuration (Syntax) of the MMTP packet header.

The header data shown in FIG. 25 is not the additional header but the original MMTP packet header included in the data transmitted from the transmission apparatus such as a broadcast station.

Information on whether the data stored in the MMTP packet is encryption data or not is recorded in the header extension byte (header_extention) region of the MMTP packet header.

FIG. 26 is a diagram showing an example of data recorded in the header extension byte (header_extention) region of the MMTP packet header.

Figure 27:
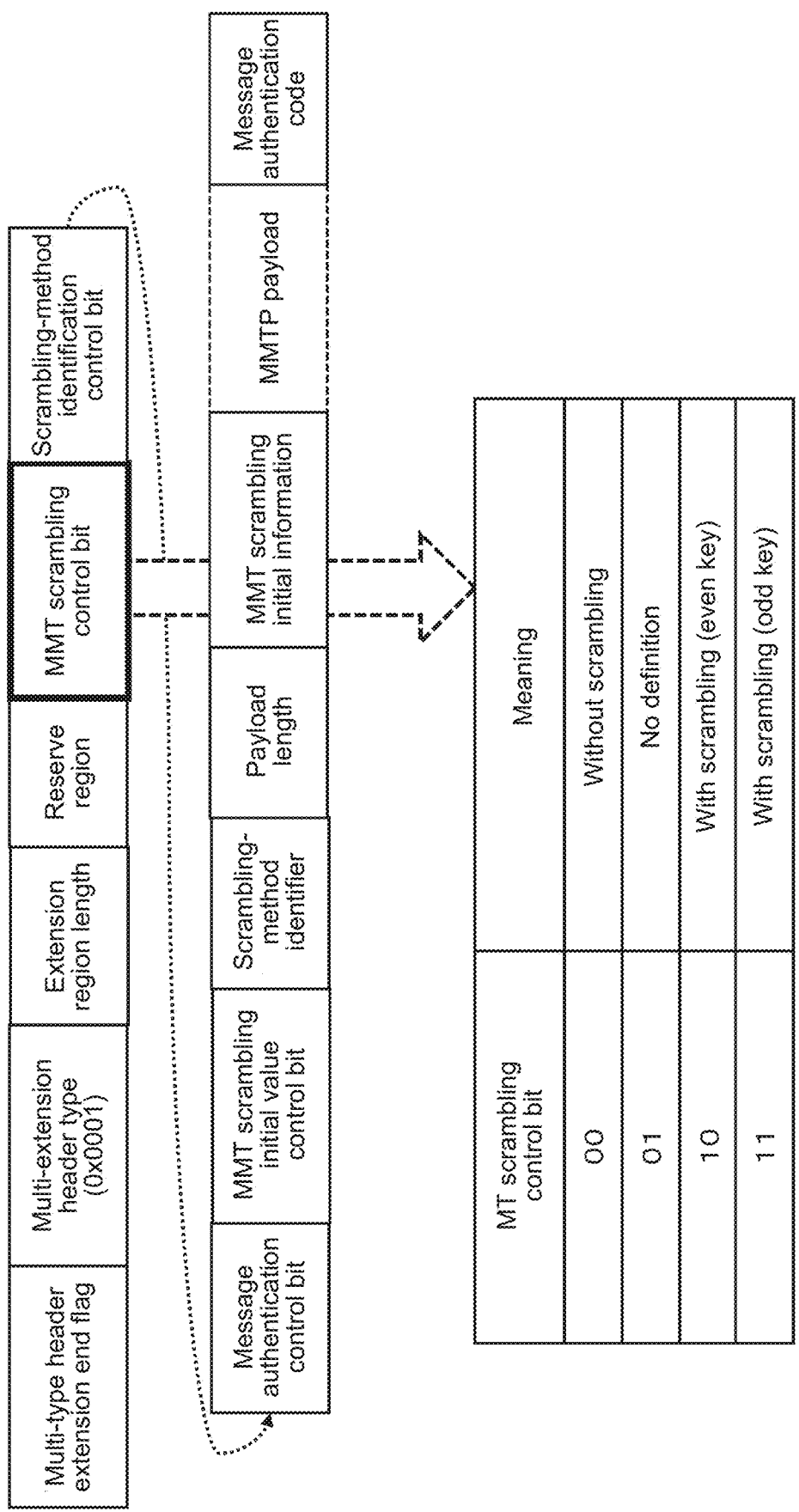
FIG. 27 is a diagram showing an example of data recorded in a header extension byte (header_extention) region of an MMTP packet header.

FIG. 27 shows a specific example of an extension information (hdr_ext_byte) record region in the data.

For example, the data shown in FIG. 27 is recorded in the extension information (hdr_ext_byte) record region of the header extension byte (header_extention) region of the MMTP packet header.

An "MMT scrambling control bit" is included in part of the record data.

The "MMT scrambling control bit" is 2-bit data and has the following meanings in accordance with the bit value.

00=Data stored in the MMTP packet is data without scrambling (unencrypted data)

01=No definition

10=Data stored in the MMTP packet is data with scrambling using an even key (encryption data)

11=Data stored in the MMTP packet is data with scrambling using an odd key (encryption data)

Note that the even key and the odd key are information regarding the type of key applied to scrambling processing (encryption).

The information processing apparatus, which receives an input of the MMT format data from a transmission apparatus such as a broadcast station and records the MMTP packet string or TLV packet string data on a medium (initial recording), refers to the set value of the "MMT scrambling control bit", determines a set value (00 or 11) of the encryption flag described with reference to FIGS. 23 and 24, and records the data in the additional header.

A specific flag setting is as follows.

In a case where the MMT scrambling control bit=00, the encryption flag=00 is set.

The encryption flag=00 means that the data stored in the MMTP packet is unencrypted data (=plain text data).

Meanwhile, in a case where the MMT scrambling control bit=10 or 11, the encryption flag=11 is set.

The encryption flag=11 means that the data stored in the MMTP packet is encryption data.

[7. Data Encryption Processing of Setting Additional Header and Performing Recording on Medium]

As described above, the information processing apparatus that receives the broadcast wave configured by the MMT format data and records the data on an information recording medium (medium) adds a new additional header (MMTP packet additional header or TLV packet additional header) to the MMTP packet or TLV packet in which the MMT format data is stored, records copy control information in each of those additional headers, and records the data on the information recording medium (medium).

When the data record processing is performed on the information recording medium (medium), it may be necessary to perform re-encryption processing on a packet (MMTP packet or TLV packet) storage data.

For example, the standard regarding copyright protection for record data of an information recording medium (medium) such as a Blu-Ray (BD (registered trademark) Disc), an HD, or a DVD is defined by the advanced access content system (AACS), and an encryption mode of medium record content of a BD or the like needs to be a method according to the AACS definition.

However, the broadcasting content is not restricted by the AACS definition, does not need to use the encryption mode by the AACS definition, and performs distribution in its own encryption mode.

So, the information processing apparatus that receives the broadcast wave configured by the MMT format data and records the data on an information recording medium (medium) needs to read encryption data received as broadcasting data or record data on a first medium such as a hard disk in which the encryption data is recorded as it is, temporarily decode the data, and then perform re-encryption by a method according to the AACS definition and record the data on an information recording medium (second medium) as a copy destination.

Hereinafter, the encryption processing example will be described.

First, an encryption processing example in a case where the TLV packet string described above with reference to FIGS. 10A, 10B, and 10C is recorded on an information recording medium (medium) will be described with reference to FIG. 28.

The information processing apparatus adds a TLV packet additional header, in which copy control information is recorded, to a TLV packet and records data on an information recording medium (medium).

Figure 28:
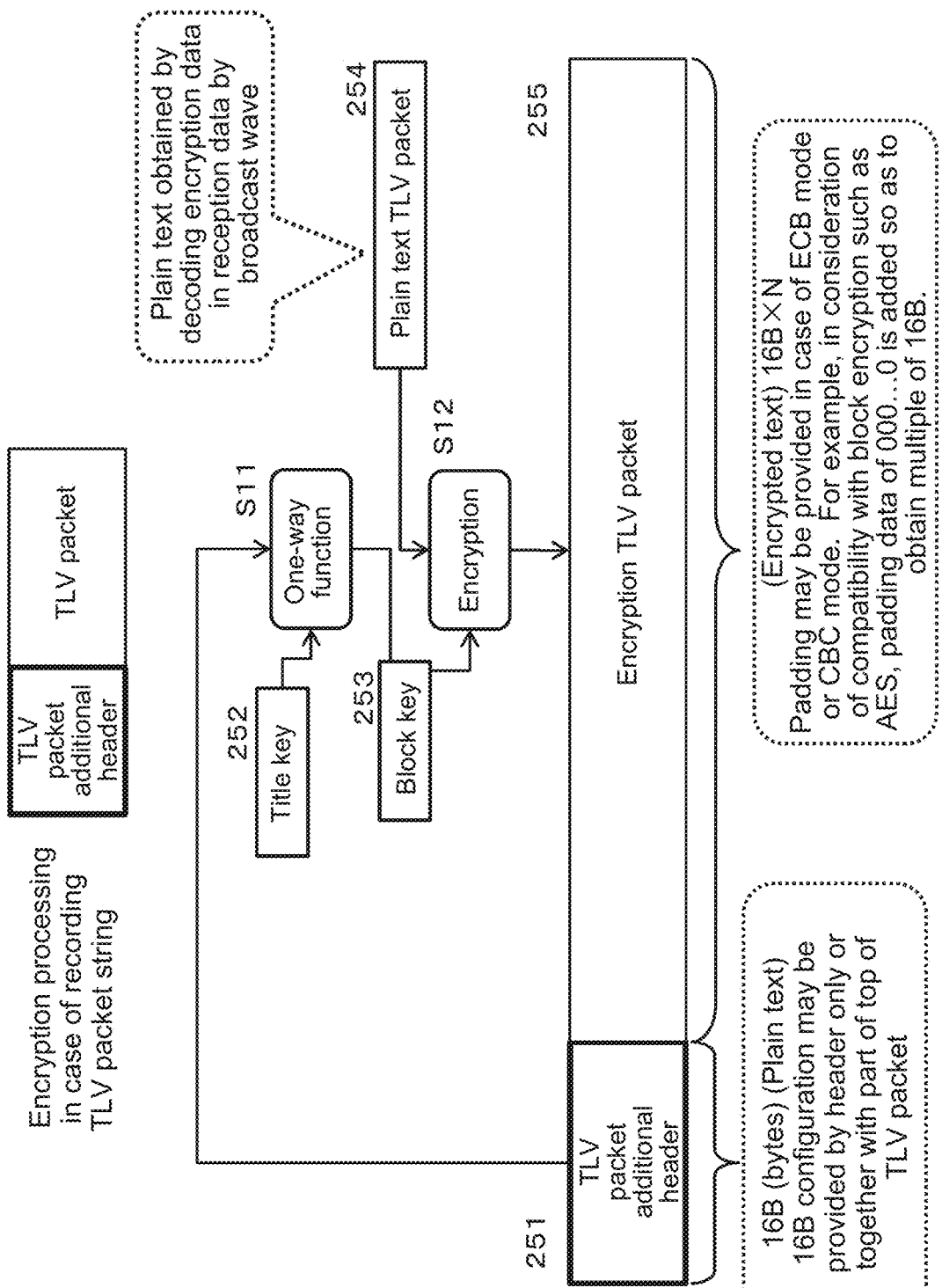
FIG. 28 is a diagram for describing encryption processing in a case where a TLV packet additional header in which copy control information is recorded is added to the TLV packet, and then recorded on an information recording medium (medium).

FIG. 28 shows a sequence of encryption processing in a case where this processing is executed.

First, the information processing apparatus acquires a TLV packet additional header 251 in which copy control information is recorded.

The TLV packet additional header 251 is constituted by 16-byte plain text data. Note that in a case where the TLV packet additional header has bytes less than 16 bytes, part of data at the top of the TLV packet may be set as plain text data, and the TLV packet additional header 251 of 16 bytes may be set together with the TLV packet additional header.

(Step S11)

The information processing apparatus acquires the TLV packet additional header 251 of 16 bytes, and in Step S11, executes an arithmetic operation using a one-way function to which a title key 252 generated in advance by random number generation processing or the like is applied, and generates a block key 253.

In other words, the information processing apparatus uses constituent data of the TLV packet additional header 251 of 16 bytes as seed information for generating an encryption key, and generates the block key 253 that is an encryption key in a unit of block (in a unit of encryption processing).

(Step S12)

Next, in Step S12, the information processing apparatus inputs a plain text TLV packet 254, executes encryption processing to which the block key generated in Step S11 is applied, and generates an encryption TLV packet 255.

Note that the plain text TLV packet 254 is a plain text TLV packet 254 obtained by decoding the encryption data transmitted from a broadcast station or the like. It is the same data as a decoded result in the reproduction processing.

The encryption processing to which the block key is applied is executed, and the encryption TLV packet 255 thus generated is set as subsequent data of the TLV packet additional header 251 and recorded on an information recording medium (medium).

Note that the encryption processing to which the block key is applied is executable as, for example, encryption processing to which an ECB mode or a CBC mode is applied. Further, in a case where those encryption processing are performed, a setting of adding padding data may be made. For example, in consideration of compatibility with block encryption such as AES, padding data including a data string such as 000 . . . 0 may be added such that the encryption TLV packet has a multiple of 16 bytes.

Similar encryption processing is executed for all of the TLV packets constituting the clip AV stream file, data sets each including a pair of the TLV packet additional header and the encryption TLV packet are arranged, and recording on an information recording medium such as a BD is performed.

Next, an encryption processing example in a case where the MMTP packet string described above with reference to FIGS. 9A, 9B, and 9C is recorded on an information recording medium (medium) will be described with reference to FIG. 29.

The information processing apparatus adds an MMTP packet additional header, in which copy control information is recorded, to an MMTP packet and records data on an information recording medium (medium).

Figure 29:
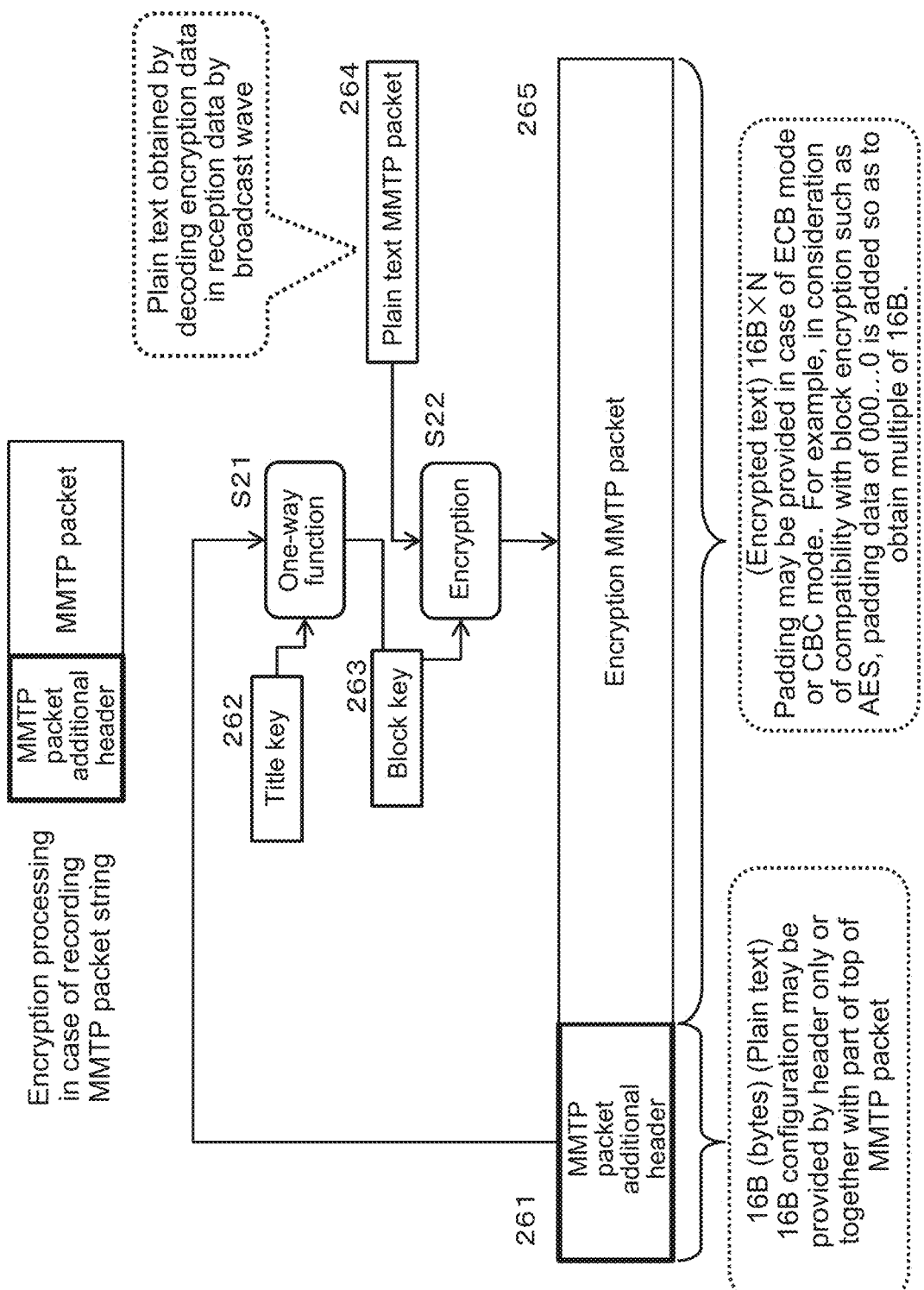
FIG. 29 is a diagram for describing encryption processing in a case where an MMTP packet additional header in which copy control information is recorded is added to the MMTP packet, and then recorded on an information recording medium (medium).

FIG. 29 shows a sequence of encryption processing in a case where this processing is executed.

First, the information processing apparatus acquires an MMTP packet additional header 261 in which copy control information is recorded.

The MMTP packet additional header 261 is constituted by 16-byte plain text data. Note that in a case where the MMTP packet additional header has bytes less than 16 bytes, part of data at the top of the MMTP packet may be set as plain text data, and the plain-text MMTP packet additional header 261 of 16 bytes may be set together with the MMTP packet additional header.

(Step S21)

The information processing apparatus acquires the MMTP packet additional header 261 of 16 bytes, and in Step S21, executes an arithmetic operation using a one-way function to which a title key 262 generated in advance by random number generation processing or the like is applied, and generates a block key 263.

In other words, the information processing apparatus uses constituent data of the MMTP packet additional header 261 of 16 bytes as seed information for generating an encryption key, and generates the block key 263 that is an encryption key in a unit of block (in a unit of encryption processing).

(Step S22)

Next, in Step S22, the information processing apparatus inputs a plain text MMTP packet 264, executes encryption processing to which the block key generated in Step S21 is applied, and generates an encryption MMTP packet 265.

Note that the plain text MMTP packet 264 is a plain text MMTP packet 264 obtained by decoding the encryption data transmitted from a broadcast station or the like. It is the same data as a decoded result in the reproduction processing.

The encryption processing to which the block key is applied is executed, and the encryption MMTP packet 265 thus generated is set as subsequent data of the MMTP packet additional header 261 and recorded on an information recording medium (medium).

Note that the encryption processing to which the block key is applied is executable as, for example, encryption processing to which an ECB mode or a CBC mode is applied. Further, in a case where those encryption processing are performed, a setting of adding padding data may be made. For example, in consideration of compatibility with block encryption such as AES, padding data including a data string such as 000 . . . 0 may be added such that the encryption MMTP packet has a multiple of 16 bytes.

Similar encryption processing is executed for all of the MMTP packets constituting the clip AV stream file, data sets each including a pair of the MMTP packet additional header and the encryption MMTP packet are arranged, and recording on an information recording medium such as a BD is performed.

[8. Example of Setting Additional Header in Which One Copy Control Information Item is Recorded for Plurality of Packets]

The above-mentioned example is described as a configuration example in which, for example, as described above with reference to FIGS. 19 and 20, the additional header in which the copy control information is recorded is individually set in one MMTP packet or one TLV packet unit.

However, the setting mode of the additional header in which the copy control information is recorded is not limited to the configuration set in one packet unit.

For example, a configuration in which one additional header is set for a plurality of packets may be provided.

Hereinafter, description will be given on an example of setting an additional header in which one copy control information item is recorded for data with predetermined length including a plurality of packets or a plurality of packet data items.

With reference to FIG. 30 and the like, the following three additional header setting examples will be described.

Example 1

Example of Setting an Additional Header in Which One Copy Control Information Item is Recorded for N Packets (MMTP Packets or TLV Packets)

Example 2

Example of Setting an Additional Header in Which One Copy Control Information Item is Recorded for Data Including Packets (MMTP Packets or TLV Packets) with Fixed Length Example 3

Example of Setting an Additional Header in Which One Copy Control Information Item is Recorded for Data Including Packets (MMTP Packets or TLV Packets) with Variable Length Hereinafter, those additional header setting examples will be described.

[8-1. (Example 1) Example of Setting Additional Header in which One Copy Control Information Item is Recorded for N Packets (MMTP Packets or TLV Packets)]

First, with reference to FIG. 30, an example of setting an additional header in which one copy control information item is recorded for N packets (MMTP packets or TLV packets) will be described.

FIG. 30 is a diagram showing a configuration example of data recorded on a medium, as described above with reference to FIGS. 19 and 20.

As shown in FIG. 30, the information processing apparatus that records reception data from the transmission apparatus such as a broadcast station on a medium sets an additional header in which one copy control information item is recorded for a plurality (N) packets (MMTP packets or TLV packets) and performs recording.

FIG. 30 shows packet strings of the following two data recording examples.

(A1) MMTP packet string in which one additional header is set for multiple (N) MMTP packets (A2) TLV packet string in which one additional header is set for multiple (N) TLV packets The example shown in (A1) is an example in which MMTP packets 100 to be recorded on a medium are divided in a unit of N packets, an additional header (MMTP packet additional header 101) is set at the top of the N MMTP packets, and recording on a medium is performed.

The example shown in (A2) is an example in which TLV packets 120 to be recorded on a medium are divided in a unit of N packets, an additional header (TLV packet additional header 121) is set at the top of the N TLV packets, and recording on a medium is performed.

In this example, N is two or more.

Note that the figure shows an example in which the additional headers 101 and 121 are each set for a plain text, and the MMTP packets 100 and the TLV packets 120 are each set for an encrypted text, but an example in which the MMTP packets 100 and the TLV packets 120 are each recorded for an plain text may be provided.

In the MMTP packet additional header 101, the copy control information corresponding to data stored in subsequent multiple (N) MMTP packets 100 is recorded.

In the TLV packet additional header 121, the copy control information corresponding to data stored in subsequent multiple (N) TLV packets 120 is recorded.

In the additional headers 101 and 121, for example, an additional header in which the values of the three types of control information defined in the MMT format described with reference to FIG. 18, i.e., (A) Digital recording control information (digital_recording_control_data), (B) Encryption information (encryption_mode), and (C) Copy number restriction information (copy_restriction_mode)

are recorded is recorded.

By recording the additional header on a medium, the copy apparatus (information processing apparatus) that executes the copy processing can acquire the set values of the copy control information corresponding to the MMT format regarding the data stored in subsequent multiple MMTP packets or TLV packets, i.e., (A) Digital recording control information (digital_recording_control_data), (B) Encryption information (encryption_mode), and (C) Copy number restriction information (copy_restriction_mode)

on the basis of the recorded content of the additional header.

As a result, it is possible to determine whether the data stored in multiple packets (MMTP packets or TLV packets) subsequent to that additional header is copy control target content corresponding to any one of the five types of digital copy control modes (1) to (5) shown in FIG. 18, i.e., (1) Copy allowed without constraint condition but encryption necessary for output copy data, (2) Copy allowed without constraint condition and encryption unnecessary for output copy data, (3) Copy prohibited, (4) Copy allowed for only first generation with copy number restriction, and (5) Copy allowed for only first generation without copy number restriction.

On the basis of the determination, the copy apparatus (information processing apparatus) that executes the copy processing can perform data copy processing between media while conforming to the copy control information corresponding to the original MMT format in a unit of the MMTP packet.

Note that, furthermore, as described above with reference to FIGS. 23 and 24, in addition to the information items of (A) Digital recording control information (digital_recording_control_data), (B) Encryption information (encryption_mode), and (C) Copy number restriction information (copy_restriction_mode), (D) Encryption flag (encryption_flag)

may be recorded in the additional header.

When the encryption flag information is recorded in the additional header, whether the data stored in a plurality of packets (MMTP packets or TLV packets) subsequent to the additional header is encryption data or plain text data can be instantly determined. Thus, for example, in a case where the reproduction processing is performed, whether it is necessary to perform decoding processing or not can be instantly determined in a unit of the plurality of MMTP packets.

Further, also in copy processing, whether or not it is necessary to perform decoding processing or re-encryption processing for copy target data can be instantly determined in a unit of multiple packets on the basis of the encryption flag.

Note that a packet number N subsequent to one additional header 101 or 121 may be constant or different in all of the additional headers.

Further, in each of the additional headers 101 and 121, a data length of the plurality of packets subsequent to that additional header is recorded.

FIGS. 31 and 32 are diagrams each showing an example of the data configuration (Syntax) of the record data in the additional header 101 and the additional header 121 shown in FIG. 30.

FIG. 31 shows that the copy control information items recorded in the MMTP packet additional header 101 described above with reference to FIG. 21, i.e., (A) Digital recording control information (digital_recording_control_data) 201, (B) Encryption information (encryption_mode) 202, and (C) Copy number restriction information (copy_restriction_mode) 203 are recorded.

Furthermore, the example shown in FIG. 31 has a configuration in which an encryption block length (encryption_block_length) 271 is recorded.

FIG. 32 is a diagram showing an example of the data configuration (Syntax) of the TLV packet additional header 121.

Furthermore, the example shown in FIG. 32 has a configuration in which an encryption block length (encryption_block_length) 271 is additionally recorded in the record data of the TLV packet additional header 121 described above with reference to FIG. 22.

The encryption block length (encryption_block_length) 271 shown in FIGS. 31 and 32 is data indicating the data length of the packets subsequent to the additional header.

Note that in a case where the packets subsequent to the additional header are of encryption data, a configuration in which a block length (block_length) is recorded may be provided.

Note that the length (data length) of data including a plurality of packets subsequent to the additional header may be defined in advance. For example, an allowable minimum length or maximum length may be defined in advance, and the data length in the defined range may be set.

Further, in addition to the data shown in FIGS. 31 and 32, (D) Encryption flag (encryption_flag)

may be recorded as described above with reference to FIGS. 23 and 24.

[8-2. (Example 2) Example of Setting Additional Header in which One Copy Control Information Item is Recorded for Data Including Packets (MMTP Packets or TLV Packets) with Fixed Length]

Next, with reference to FIG. 33, an example of setting an additional header in which one copy control information item is recorded for data including packets (MMTP packets or TLV packets) with fixed length will be described.

Figure 33:
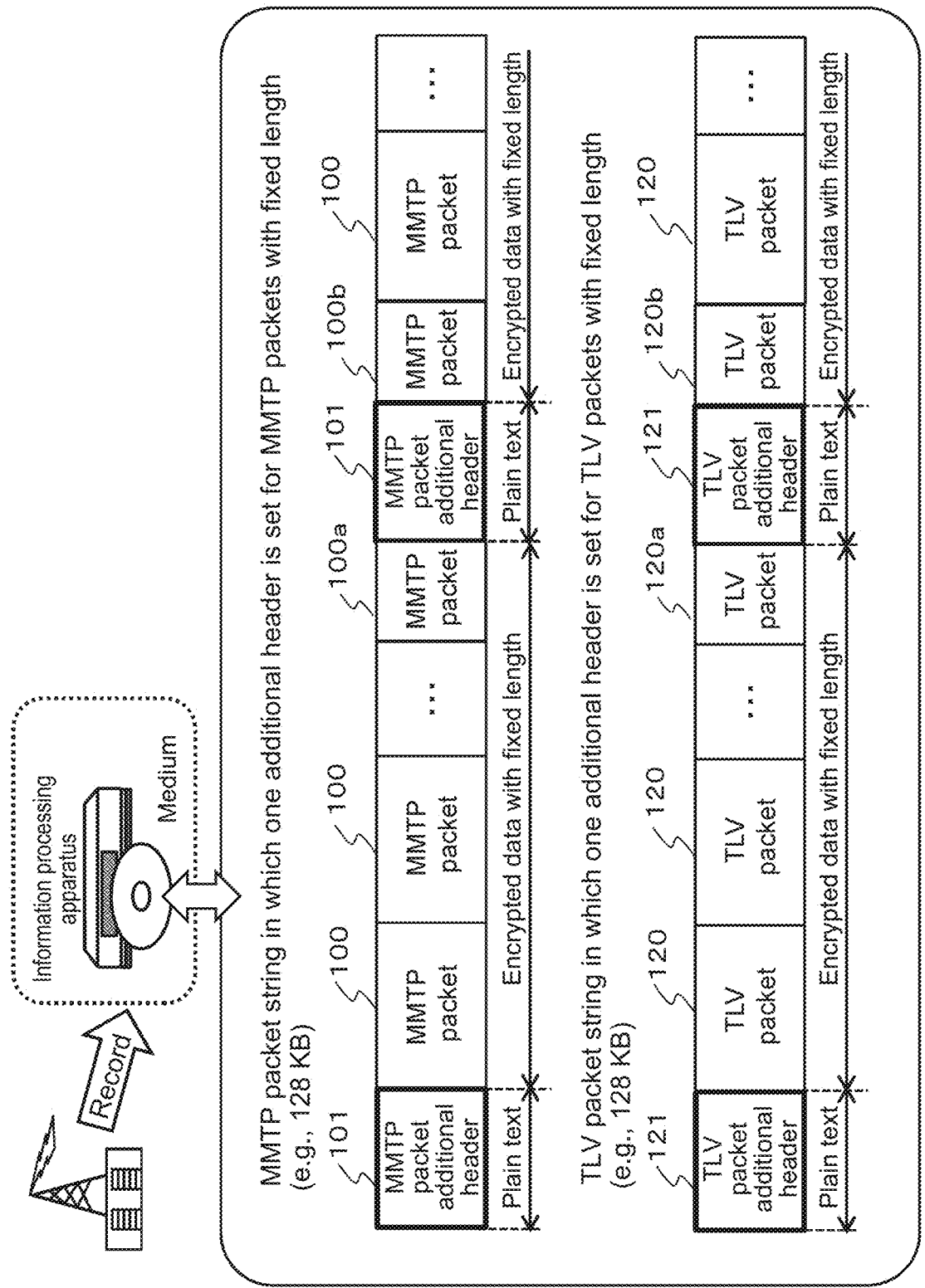
FIG. 33 is a diagram for describing a setting example of a packet string and an additional header recorded on a medium.

FIG. 33 is a diagram showing a configuration example of data recorded on a medium, as in FIG. 30.

As shown in FIG. 33, the information processing apparatus that records reception data from the transmission apparatus such as a broadcast station on a medium sets an additional header in which one copy control information item is recorded for data including a plurality of packets (MMTP packets or TLV packets).

In this example, the data length of data including packets subsequent to one additional header 101 or 121 is fixed.

Specifically, for example, fixed-length data of 128 KB is set to be subsequent to one additional header.

In this case, as indicated as MMTP packets 100a, b or TLV packets 120a, b shown in the figure, one MMTP packet or TLV packet may be divided by the additional header 101 or 121.

FIG. 33 shows packet strings of the following two data recording examples.

(B1) MMTP packet string in which one additional header is set for MMTP packets with fixed length (for example, 128 KB)

(B2) TLV packet string in which one additional header is set for TLV packets with fixed length (for example, 128 KB)

Note that the figure shows an example in which the additional headers 101 and 121 are each set for a plain text, and the MMTP packets 100 and the TLV packets 120 are each set for an encrypted text, but an example in which the MMTP packets 100 and the TLV packets 120 are each recorded for an plain text may be provided.

In the MMTP packet additional header 101, the copy control information corresponding to data stored in subsequent MMTP packets 100 with fixed length is recorded.

In the TLV packet additional header 121, the copy control information corresponding to data stored in subsequent TLV packets 120 with fixed length is recorded.

As in the example described above with reference to FIG. 30, the copy control information items recorded in the additional header are (A) Digital recording control information (digital_recording_control_data), (B) Encryption information (encryption_mode), and (C) Copy number restriction information (copy_restriction_mode).

Furthermore, a configuration in which (D) Encryption flag (encryption_flag)

is recorded may be provided.

Note that, in this example, since the data length of data including packets subsequent to one additional header 101 or 121 is the fixed length, it is not necessary to record the data length of the data subsequent to the additional header as described above with reference to FIGS. 31 and 32 in the additional headers 101 and 121.

[8-3. (Example 3) Example of Setting Additional Header in which One Copy Control Information Item is Recorded for Data Including Packets (MMTP Packets or TLV Packets) with Variable Length]

Next, with reference to FIG. 34, an example of setting an additional header in which one copy control information item is recorded for data including packets (MMTP packets or TLV packets) with variable length will be described.

Figure 34:
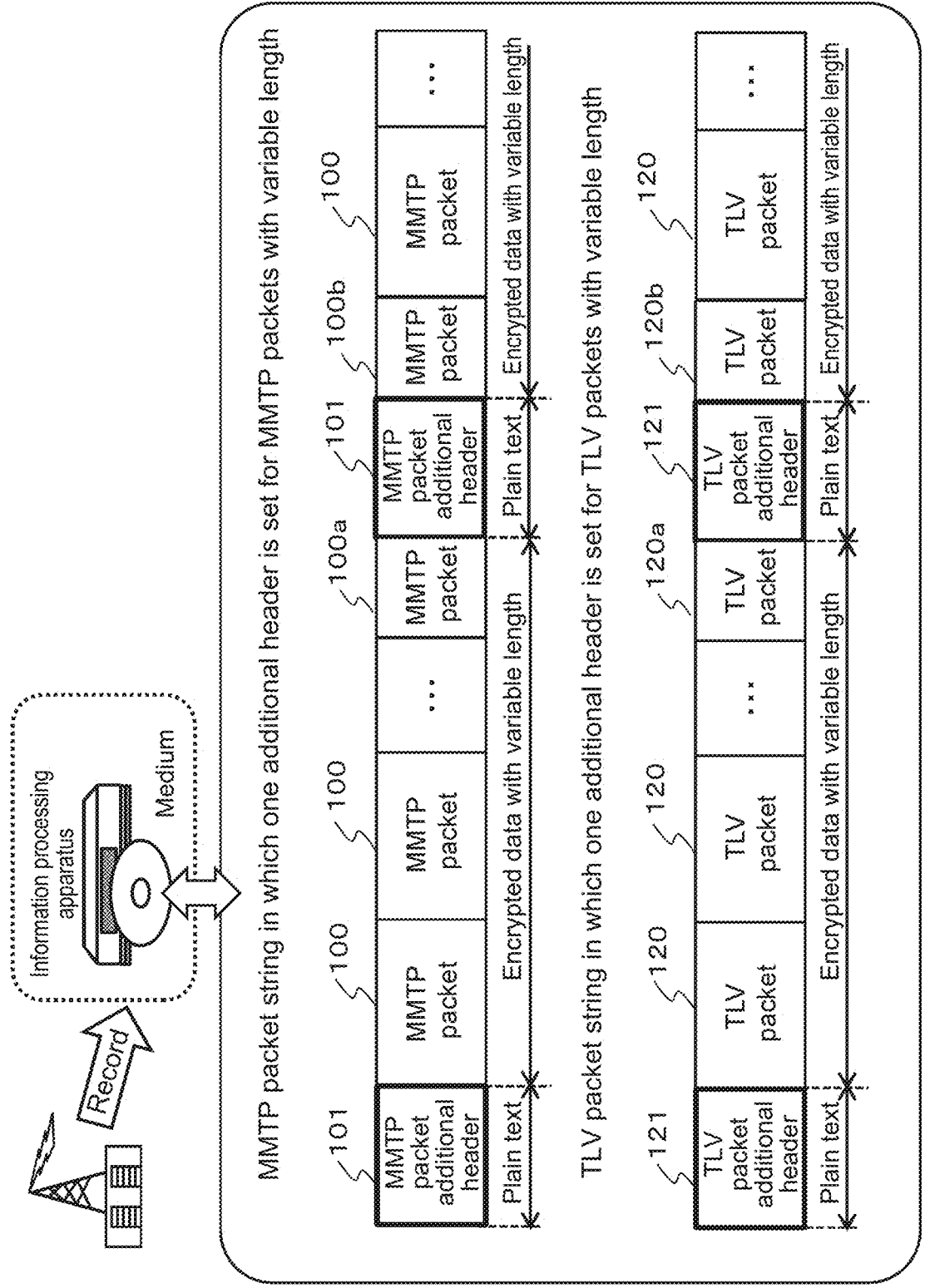
FIG. 34 is a diagram for describing a setting example of a packet string and an additional header recorded on a medium.

FIG. 34 is a diagram showing a configuration example of data recorded on a medium, as in FIG. 30.

As shown in FIG. 34, the information processing apparatus that records reception data from the transmission apparatus such as a broadcast station on a medium sets an additional header in which one copy control information item is recorded for data including a plurality of packets (MMTP packets or TLV packets).

In this example, the data length of data including packets subsequent to one additional header 101 or 121 is variable.

Also in this example, as in the example described above with reference to FIG. 33, as indicated as MMTP packets 100a, b or TLV packets 120a, b shown in FIG. 34, one MMTP packet or TLV packet may be divided by the additional header 101 or 121.

FIG. 34 shows packet strings of the following two data recording examples.

(C1) MMTP packet string in which one additional header is set for MMTP packets with variable length (C2) TLV packet string in which one additional header is set for TLV packets with variable length Note that the figure shows an example in which the additional headers 101 and 121 are each set for a plain text, and the MMTP packets 100 and the TLV packets 120 are each set for an encrypted text, but an example in which the MMTP packets 100 and the TLV packets 120 are each recorded for an plain text may be provided.

In the MMTP packet additional header 101, the copy control information corresponding to data stored in subsequent MMTP packets 100 with variable length is recorded.

In the TLV packet additional header 121, the copy control information corresponding to data stored in subsequent TLV packets 120 with variable length is recorded.

As described above with reference to FIG. 30, the copy control information items recorded in the additional header are (A) Digital recording control information (digital_recording_control_data), (B) Encryption information (encryption_mode), and (C) Copy number restriction information (copy_restriction_mode).

Furthermore, a configuration in which (D) Encryption flag (encryption_flag)

is recorded may be provided.

Note that, in this example, since the data length of data including packets subsequent to one additional header 101 or 121 is the variable length, the data length of the data subsequent to the additional header as described above with reference to FIGS. 31 and 32 is recorded in the additional header.

Further, regarding the length (data length) of data subsequent to the additional header as well, as in the example described above with reference to FIG. 30, for example, an allowable minimum length or maximum length may be defined in advance, and the data length in the defined range is favorably set.

Note that in the example described above with reference to FIGS. 28 and 29, the information processing apparatus that receives the broadcast wave configured by the MMT format data and records the data on an information recording medium (medium) needs to read the encryption data received as broadcasting data or the record data on the first medium such as a hard disk in which the encryption data is recorded as it is, temporarily decode the data, and then perform re-encryption by a method according to the AACS definition and record the data on an information recording medium (second medium) as a copy destination.

In the example described above with reference to FIGS. 28 and 29, when executing copy processing, the information processing apparatus that executes the copy processing has used, as seed information, for example, the encryption data received as broadcasting data or constituent data of the additional header set in a unit of packet (TLV packet or MMTP packet) that is the record data of the first medium such as a hard disk in which the encryption data is recorded as it is, and has generated a block key that is an encryption key in a unit of block (in a unit of encryption processing).

In contrast to this, in a case of the configuration in which not the additional header in a unit of packet but the additional header in a multiple-packets unit or the additional header in a fixed data length unit or variable data length unit is set as described above, the constituent data of the additional header in the multiple-packets unit or the additional header in the fixed data length unit or variable data length unit is used as seed information, and a block key that is an encryption key in a unit of block (in a unit of encryption processing) is generated.

With this block key, the processing of encrypting the data subsequent to the additional header and performing recording on a copy destination medium is executed.

[9. Example of Recording Copy Control Information in Usage Control Information File]

The above-mentioned example is an example in which a new MMTP packet additional header is added to the MMTP packets or a new TLV packet additional header is added to the TLV packets, and the copy control information is recorded in those additional headers.

Next, description will be given on an example in which a usage control information file (Usage File), which is independent of the MMTP packet string or TLV packet string, is generated without using those additional headers, copy control information is recorded in the usage control information file and then recorded on a medium.

Figure 35:
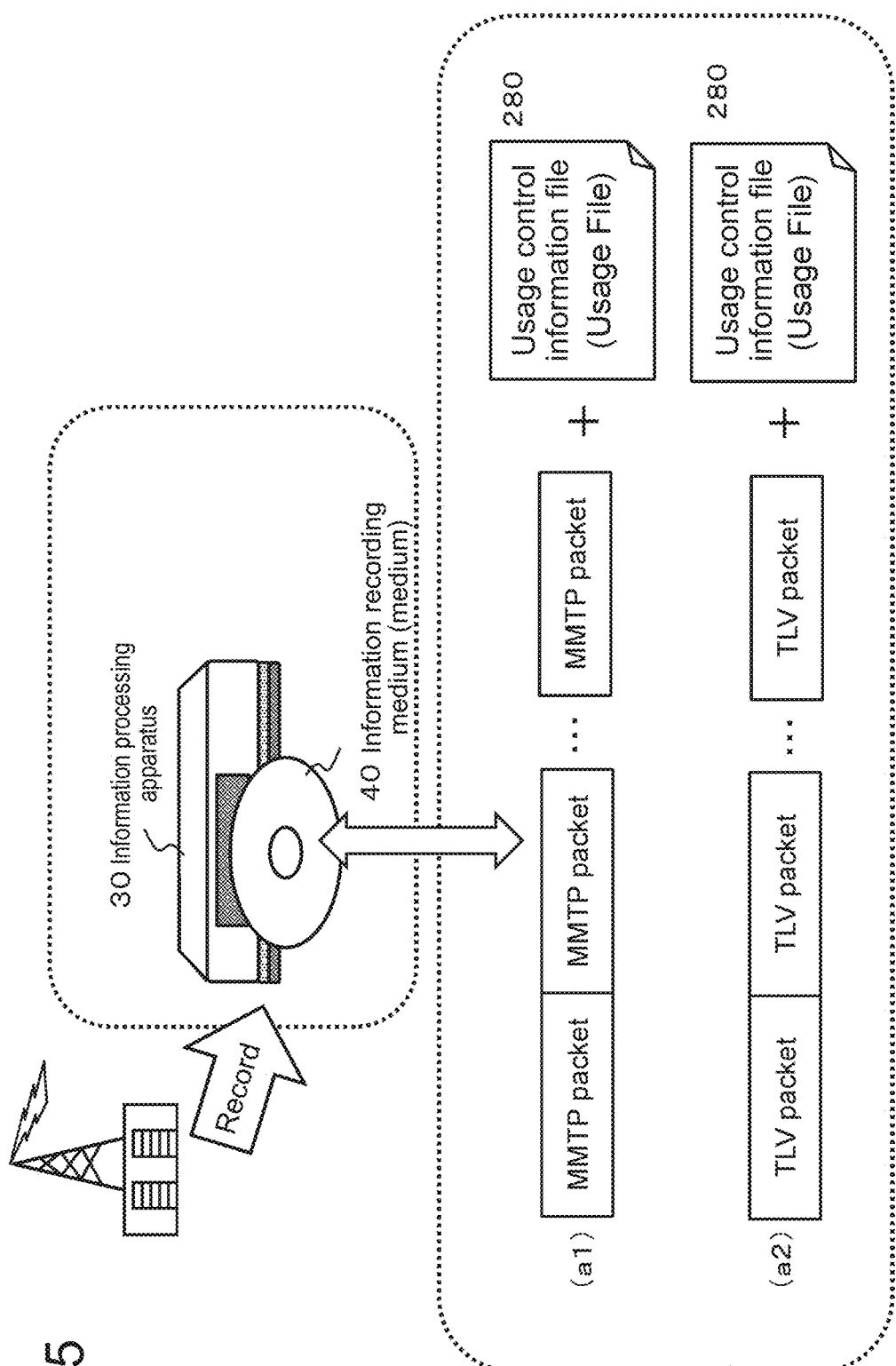
FIG. 35 is a diagram for describing processing of generating a usage control information file (Usage File) and recording copy control information in the usage control information file and then on a medium.

FIG. 35 is a diagram for describing the general outline of processing executed by the information processing apparatus 30 according to this example.

The information processing apparatus 30 receives the MMT format data from the transmission apparatus 20 such as a broadcast station. Reception data is constituted by a TLV packet string in which the MMTP packets are stored.

The information processing apparatus 30 records the reception data on an information recording medium (medium) 40.

Recording processing is performed by, for example, generating BDAV format data. A clip AV stream file constituting the BDAV format data is constituted by an MMTP packet string or TLV packet string as described above with reference to FIGS. 9A, 9B, 9C, 10A 10B and 10C.

In the example described above, recording has been performed by setting the additional headers for the constituent packets of those packet strings.

In this example, such additional headers are not used. As shown in the lower part of FIG. 35, a usage control information file (Usage File) 280, which is independent of the packet string, is generated, and copy control information is recorded in the usage control information file 280 and then recorded on a medium.

An example of record data in the usage control information file 280 will be described with reference to FIG. 36.

Figure 36:
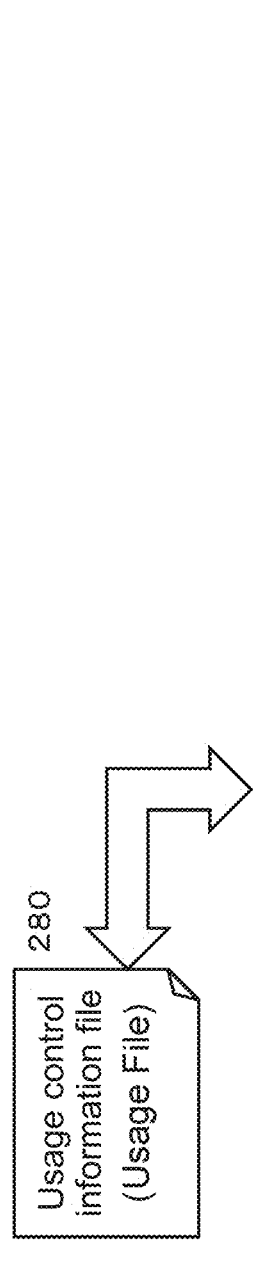
FIG. 36 is a diagram for describing record data of the usage control information file (Usage File).

As shown in FIG. 36, the information processing apparatus 30 records the following data items in the usage control information file 280 and then records such data on the information recording medium (medium) 40.

(a) EPN (1 bit): Information of necessity/unnecessity of encryption of output data at copy processing (b) CCI (2 bits): Copy control information (c) Move_Not_Allowed (1 bit): Move processing allowance information (d) Trusted_Source_Mark_Screening_Required (1 bit): Information of necessity/unnecessity of source confirmation processing (watermark detection processing)

(e) Digital_Output_Flag (1 bit): Digital output allowance standard information

Note that those data times are recordable for each of predetermined content sections, for example, in a program unit. The data items such as the above-mentioned copy control information items (a) to (e) corresponding to each of a plurality of content items (programs) can be enumerated and recorded in one usage control information file 280.

A specific example of the data recorded in the usage control information file 280 will be described with reference to FIG. 37.

FIG. 37 shows the following information items corresponding to the five data items (a) to (d) shown in FIG. 36.

(1) Control information of MMT format (control information included in broadcast wave)

(2) Record information of usage control information file (control information recorded in medium)

The information processing apparatus 30 that records reception data from the transmission apparatus such as a broadcast station on the information recording medium (medium) 40 acquires information shown in FIG. 37(1) from the control information (SI) or the like in the reception data, sets any of information items shown in FIG. 37(2) to be recorded in the usage control information file 280 on the basis of the acquired information, and records the information on the information recording medium (medium) 40.

Regarding (a) EPN (1 bit): Information of necessity/unnecessity of encryption of output data at copy processing, (1) Control information of MMT format is set to any of the following values.

0=Encryption necessary
1=Encryption unnecessary

The information processing apparatus 30 acquires this set value and records the following data items shown in FIG. 37(2) in the usage control information file 280.

In a case of the control information of MMT format=0 (encryption necessary), the record information of the usage control information file=0 (EPN-asserted (encryption necessary)) is set.

Meanwhile, in a case of the control information of MMT format=1 (encryption unnecessary), the record information of the usage control information file=1 (EPN-unasserted (encryption unnecessary)) is set.

Regarding (b) CCI (2 bits): Copy control information, (1) Control information of MMT format is set to any of the following values.

00=Copy allowed without constraint condition
11=Copy prohibited
10=Copy allowed for only first generation The information processing apparatus 30 acquires this set value and records the following data items shown in FIG. 37(2) in the usage control information file 280.

In a case of the control information of MMT format=00 (copy allowed without constraint condition), the record information of the usage control information file=00 (COPY Control Not asserted (copy allowed)) is set.

Further, in a case of the control information of MMT format=11 (copy prohibited), the record information of the usage control information file=N/A (copy prohibited) is set.

Further, in a case of the control information of MMT format=10 (copy allowed for only first generation), the record information of the usage control information file=01 (No More Copy (copy allowed for only first generation)) is set. Note that in this setting, the information processing apparatus that executes copy processing changes this value to 11 (copy prohibited).

Regarding (c) Move_Not_Allowed (1 bit): Move processing allowance information, (1) Control information of MMT format is undetermined at the present moment and is to be defined as operation rules for broadcast recording.

The information processing apparatus 30 acquires a defined value to be determined, and records the following data items shown in FIG. 37(2) in the usage control information file 280.

Record information of usage control information file=0 (move is allowed)

Record information of usage control information file=1 (move is not allowed)

Also regarding (d) Trusted_Source_Mark_Screening_Required (1 bit): Information of necessity/unnecessity of source confirmation processing (watermark detection processing), (1) Control information of MMT format is undetermined at the present moment and is to be defined as operation rules for broadcast recording.

The information processing apparatus 30 acquires a defined value to be determined, and records the following data items shown in FIG. 37(2) in the usage control information file 280.

Record information of usage control information file=0 (Trusted Soutrce Mark Screening is required (watermark detection necessary))

Record information of usage control information file=1 (Trusted Soutrce Mark Screening is not required (watermark detection unnecessary))

Also regarding (e) Digital_Output_Flag (1 bit): Digital output allowance standard information, (1) Control information of MMT format is undetermined at the present moment and is to be defined as operation rules for broadcast recording.

The information processing apparatus 30 acquires a defined value to be determined, and records the following data items shown in FIG. 37(2) in the usage control information file 280.

Record information of usage control information file=0 (Allowed to be output to only new protection technologies)

Record information of usage control information file=1 (Allowed to be output to old and new protection technologies)

Note that, specifically, the above-mentioned new protection technologies and old protection technologies corresponds to, for example, HDCP that is the copyright protection standard regarding digital data output by an HDMI (registered trademark) for digital data output, or the like. The new protection technologies correspond to, for example, HDCP 2.2, and the old protection technologies correspond to, for example, HDCP 1.4.

In a case where the record information of usage control information file=0 is set, only the output of the HDMI (registered trademark) corresponding to HDCP 2.2 is allowed.

Meanwhile, in a case where the record information of usage control information file=1 is set, in addition to the output of the HDMI (registered trademark) corresponding to HDCP 2.2, the output of the HDMI (registered trademark) corresponding to HDCP 1.4 is also allowed.

In such a manner, the information processing apparatus 30 that receives an input of the data from the transmission apparatus such as a broadcast station and records the data on the information recording medium acquires information items shown in FIG. 37, i.e., (a) EPN (1 bit): Information of necessity/unnecessity of encryption of output data at copy processing, (b) CCI (2 bits): Copy control information, (c) Move_Not_Allowed (1 bit): Move processing allowance information, (d) Trusted_Source_Mark_Screening_Required (1 bit): Information of necessity/unnecessity of source confirmation processing (watermark detection processing), and (e) Digital_Output_Flag (1 bit): Digital output allowance standard information from the information included in the broadcast wave, records them in the usage control information file (Usage File), and records then on the information recording medium (medium).

Note that as described above with reference to FIG. 35, the information processing apparatus 30 generates a clip AV stream file including an MMTP packet string or a TLV packet string together with the usage control information file (Usage File) and records the clip AV stream file on the information recording medium (medium) 40.

The information processing apparatus that intends to read the data recorded on the information recording medium (medium 40) and copy the data to another medium refers to the usage control information file (Usage File) and executes copy processing according to the record information of the usage control information file (Usage File).

By this processing, data copy processing between media is executed while conforming to the copy control information corresponding to the original MMT format data transmitted by the transmission apparatus such as a broadcast station.

[10. Example of Recording Encryption-Relevant Information Together with Copy Control Information in Usage Control Information File]

With reference to FIGS. 36 and 37, an example of the record data of the usage control information file 280 has been described. Furthermore, in addition to the copy control information described with reference to FIGS. 36 and 37, it is possible to record encryption-relevant information in the usage control information file 280.

An example of recording encryption-relevant information in the usage control information file 280 will be described with reference to FIG. 38 and the like.

Figure 38:
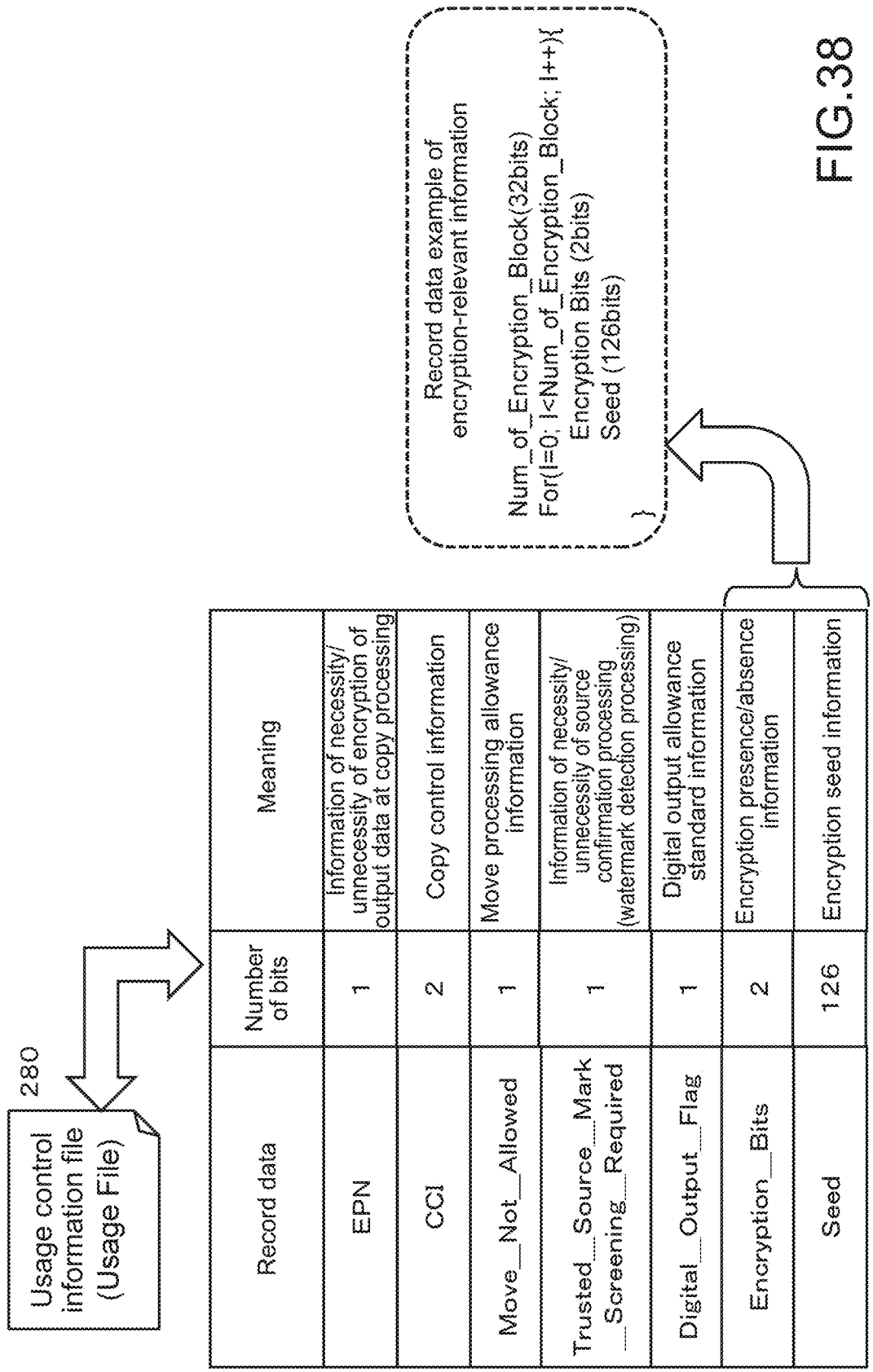
FIG. 38 is a diagram for describing record data of the usage control information file (Usage File).

FIG. 38 shows a data example in which the information processing apparatus 30 records data in the usage control information file 280. FIG. 38 shows the following data items.

(a) EPN (1 bit): Information of necessity/unnecessity of encryption of output data at copy processing (b) CCI (2 bits): Copy control information (c) Move_Not_Allowed (1 bit): Move processing allowance information (d) Trusted_Source_Mark_Screening_Required (1 bit): Information of necessity/unnecessity of source confirmation processing (watermark detection processing)

(e) Digital_Output_Flag (1 bit): Digital output allowance standard information (f) Encryption_Bits (2 bits): Encryption presence/absence information (g) Seed (126 bits): Seed information for generating encryption key The data items (a) to (e) are described above with reference to FIGS. 36 and 37.

The information of (f) and (g) is encryption-relevant information.

Note that the encryption-relevant information shown in (f) and (g) is recorded as, for example, information in a unit of encryption block, which includes packets to be recorded on a medium.

As described above, the above-mentioned copy control information items (a) to (e) corresponding to each of a plurality of content items (programs) can be recorded in one usage control information file 280. However, the data items of (f) Encryption_Bits (2 bits): Encryption presence/absence information, and (g) Seed (126 bits): Seed information for generating encryption key are recorded as information items in a finer unit of encryption block.

As indicated as an "record data example of encryption-relevant information" in FIG. 38, for the data items of (f) Encryption_Bits (2 bits): Encryption presence/absence information, and (g) Seed (126 bits): Seed information for generating encryption key, a loop corresponding to the number of blocks is set to be subsequent to 32-bit data in which the number of blocks (Num_of_Encryption_Block) is recorded, and the above-mentioned data items ((f) Encryption presence/absence information and (g) Seed information for generating encryption key) corresponding to each block are recorded in each loop.

A specific example of the encryption-relevant information corresponding to the block, i.e., the information items of (f) Encryption_Bits (2 bits): Encryption presence/absence information, and (g) Seed (126 bits): Seed information for generating encryption key, will be described with reference to FIG. 39.

Figure 39:
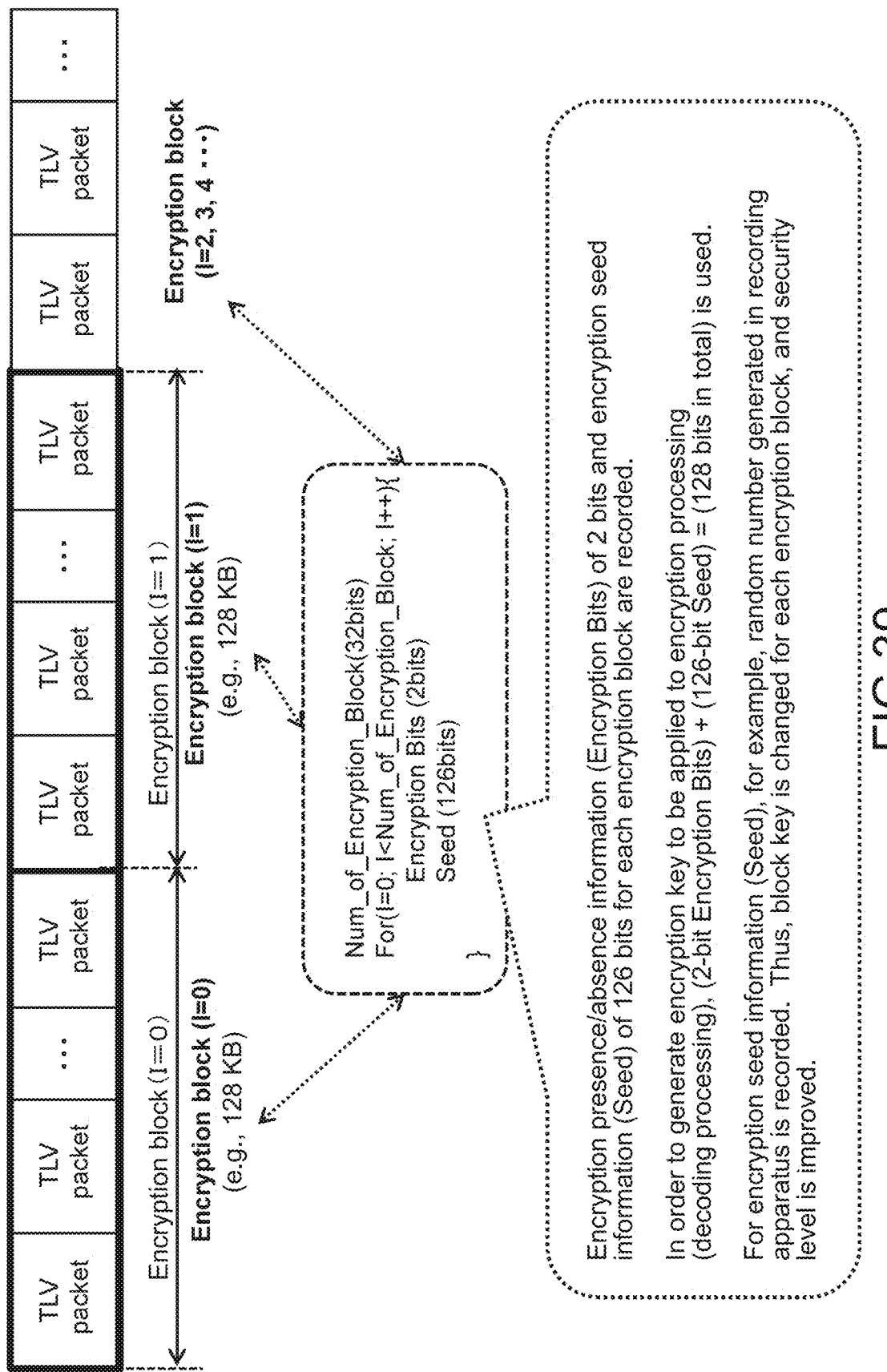
FIG. 39 is a diagram for describing record data of the usage control information file (Usage File).

FIG. 39 shows the TLV packet string as an example of data to be recorded on a medium.

Note that as described above with reference to FIG. 35 and the like, the TLV packet string or MMTP packet string is recorded on a medium.

FIG. 39 shows an example of recording the TLV packet string, but this example is also usable in a case where the MMTP packet string is recorded.

The TLV packet string shown in FIG. 39 includes a plurality of encryption blocks.

One encryption block is a unit of encryption processing and is a block generated by one encryption processing.

While the block encryption processing in which the additional header is applied has been described above with reference to FIGS. 28 and 29, each encryption block set for the TLV packet string shown in FIG. 39 is also a unit of the block encryption processing.

In a case where the medium record data is the MMTP packet string, an encryption block including the MMTP packets as components is set.

In the usage control information file 280, the information items regarding each encryption block, (f) Encryption_Bits (2 bits): Encryption presence/absence information, and (g) Seed (126 bits): Seed information for generating encryption key, are recorded.

(f) Encryption presence/absence information is information that indicates whether the block is encrypted or not.

(g) Seed information for generating encryption key (Seed) is seed information as data to be applied to the encryption and decoding processing of the block encryption.

Note that the seed information in the block encryption processing described above with reference to FIGS. 28 and 29, in which the additional header is applied, corresponds to constituent data of the TLV packet additional header 251 and the MMTP packet additional header 261.

In a case where the copy control information is recorded in the usage control information file 280 without using the additional header, it is impossible to generate an encryption key in which the additional header as shown in FIG. 28 or 29 is used as seed information.

For that reason, the seed information for generating an encryption key corresponding to each block is recorded in the usage control information file.

Note that, in order to generate an encryption key to be applied to the encryption processing (decoding processing), for example, data of 128 bits in total including the following two information items (f) Encryption_Bits (2 bits): Encryption presence/absence information, and (g) Seed (126 bits): Seed information for generating encryption key is used.

For the seed information for generating encryption key (Seed) to be recorded in the usage control information file 280, for example, a recording apparatus that executes data recording with respect to a medium executes random number generation processing in a unit of block and records the generated random number.

Thus, the block key to be applied to the encryption or decoding processing in a unit of block is changed for each encryption block, and the security level is improved.

In other words, as described above with reference to FIGS. 28 and 29, the information processing apparatus that receives the broadcast wave configured by the MMT format data and records the data on an information recording medium (medium) needs to read the encryption data received as broadcasting data or the record data on the first medium such as a hard disk in which the encryption data is recorded as it is, temporarily decode the data, and then perform re-encryption by a method according to the AACS definition and record the data on an information recording medium (second medium) as a copy destination.

In the example described above with reference to FIGS. 28 and 29, when executing copy processing, the information processing apparatus that executes the copy processing has used, as seed information, for example, the encryption data received as broadcasting data or constituent data of the additional header set in a unit of packet (TLV packet or MMTP packet) that is the record data of the first medium such as a hard disk in which the encryption data is recorded as it is, and has generated a block key that is an encryption key in a unit of block (in a unit of encryption processing).

In contrast to this, in a case of the configuration in which the additional header in a unit of packet is not set, the seed information in a unit of encryption processing, which is recorded in the above-mentioned usage control information file, is acquired, an encryption key in a unit of encryption processing is generated, encryption processing to which the generated encryption key is applied is executed in a unit of encryption processing, and processing of recording on a copy destination medium is performed.

[11. Configuration and Processing of Information Processing Apparatus that Executes Data Record Processing with Respect to Information Recording Medium]

Next, the configuration and the processing of the information processing apparatus that receives an input of MMT format data received from the transmission apparatus such as a broadcast station and executes the data record processing with respect to the information recording medium will be described with reference to FIG. 40 and the like.

As described above, the information processing apparatus of the present disclosure records the input data according to the MMT format on the information recording medium such as the BD, the HD, or the flash memory, as the BDAV format data.

Further, at the time of performing the data record processing, the information processing apparatus acquires the copy control information included in the input data according to the MMT format and performs processing of recording the copy control information in the additional header or the usage control information file. Furthermore, the information processing apparatus also performs processing of recording the reproduction control information corresponding to the MMT format data, the attribute information, and the like in the database file such as the playlist or the clip information file.

The information such as the copy control information, the reproduction control information, or the attribute information can be acquired from, for example, various information recording tables including TLV-SI or MMT-SI that is the control information included in the input data according to the MMT format.

Hereinafter, the configuration of the information processing apparatus that executes the data record processing with respect to the information recording medium such as the BD, and a processing sequence will be described.

Figure 40:
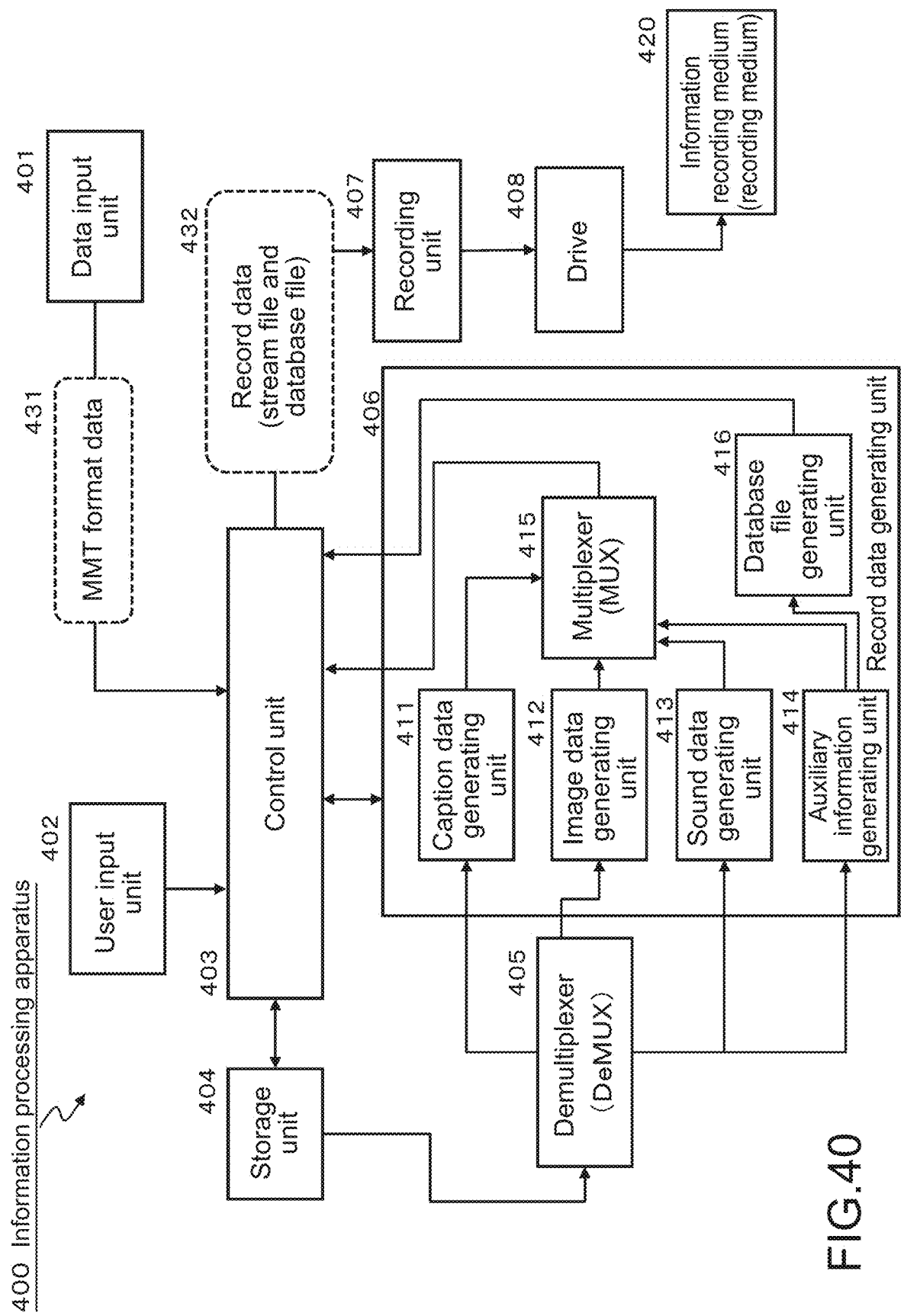
FIG. 40 is a diagram for describing a configuration example of an information processing apparatus that executes data record processing with respect to an information recording medium (medium).

FIG. 40 is a diagram showing the configuration of an information processing apparatus 400 executing the data record processing with respect to the information recording medium such as the BD.

The information processing apparatus 400 records the clip AV stream file, and the database file such as the playlist or the clip information file, on an information recording medium (a recording medium) 420.

A data input unit 401 inputs MMT format data 431 with respect to an information recording medium 420, that is, the MMT format data 431 including the image data, the sound data, the caption data, and the like.

The data input unit 401 includes a reception unit receiving the transmission data, for example, from the broadcasting station, the contents server, and the like from which the MMT format data 431 is transmitted, a medium reading unit executing data reading from the medium on which the MMT format data 431 is recorded, or the like.

The MMT format data 431 input from the data input unit 401 is the data according to the data format described above with reference to FIG. 2, and for example, includes high-definition image data such as an HEVC image.

The MMT format data 431 is stored in a storage unit 404, in accordance with the control of a control unit 403.

A user input unit 402, for example, inputs a start request of the data record with respect to the information recording medium 420, and the like.

In a case where the start request of the data record is input from the user input unit 402, the MMT format data 431 stored in the storage unit 404 is input into a demultiplexer (DeMUX) 405, with the input as a trigger.

The demultiplexer (DeMUX) 405 acquires the packet in which each of the image data, the sound data, the caption data, and the like is stored, or auxiliary information such as the control information (TLV-SI and MMT-SI) in which the notification information, the reproduction control information, the copy control information, and the like are included, from the MMT format data 431, sorts the packet into data type packets, and inputs each of the packets into a caption data generating unit 411, an image data generating unit 412, a sound data generating unit 413, and an auxiliary information generating unit 414 of a record data generating unit 406, in accordance with the data type.

The caption data generating unit 411 acquires the caption data from the MMT format data 331 that is input by the data input unit 401 and is stored in the storage unit 404, and generates stream file storage data defined in the BDAV format.

The image data generating unit 412 acquires the image data from the MMT format data 331 that is input from the data input unit 401 and is stored in the storage unit 404, and generates stream file storage data defined in the BDAV format.

The sound data generating unit 413 acquires the sound data from the MMT format data 431 that is input from the data input unit 401 and is stored in the storage unit 404, and generates stream file storage data defined in the BDAV format.

The auxiliary information generating unit 414 acquires the auxiliary information such as the control information (TLV-SI and MMT-SI) in which the notification information, the reproduction control information, the copy control information, and the like are included, from the MMT format data 431 that is input from the data input unit 401 and is stored in the storage unit 404, and generates data to be stored in the playlist file, the clip information file, or the clip AV stream file as the database file defined in the BDAV format.

Furthermore, the auxiliary information generating unit 414 generates any of the additional header in which the copy control information is recorded, or the usage control information file.

A specific example of the configuration to generate the additional header in which the copy control information is recorded, or the usage control information file will be described later with reference to FIGS. 41 and 42.

A multiplexer (MUX) 415 inputs each of the caption data, the image data, and the sound data converted by the caption data generating unit 411, the image data generating unit 412, and the sound data generating unit 413, and various information items acquired from the control information (TLV-SI and MMT-SI) of the MMT format data 331, and the like by the auxiliary information generating unit 414, and generates a stream file in which such data items are stored.

A database file generating unit 416 generates a database file such as the playlist file or the clip information file in which various information items acquired from the control information (TLV-SI and MMT-SI) of the MMT format data 431 by the auxiliary information generating unit 414 are recorded.

Record data 432 including the stream file data generated by the record data generating unit 406, and the database file such as the playlist file and the clip information file is output to and recorded on the information recording medium 420 through a drive 407 by a recording unit 406, under the control of the control unit 403.

Next, a specific example of the configuration to generate the additional header in which the copy control information to be executed by the information processing apparatus 400 shown in FIG. 40 is recorded, or the usage control information file will be described with reference to FIGS. 41 and 42.

First, a configuration of the record data generating unit 406 that executes the processing of generating the additional header in which the copy control information is recorded will be described with reference to FIG. 41.

Figure 41:
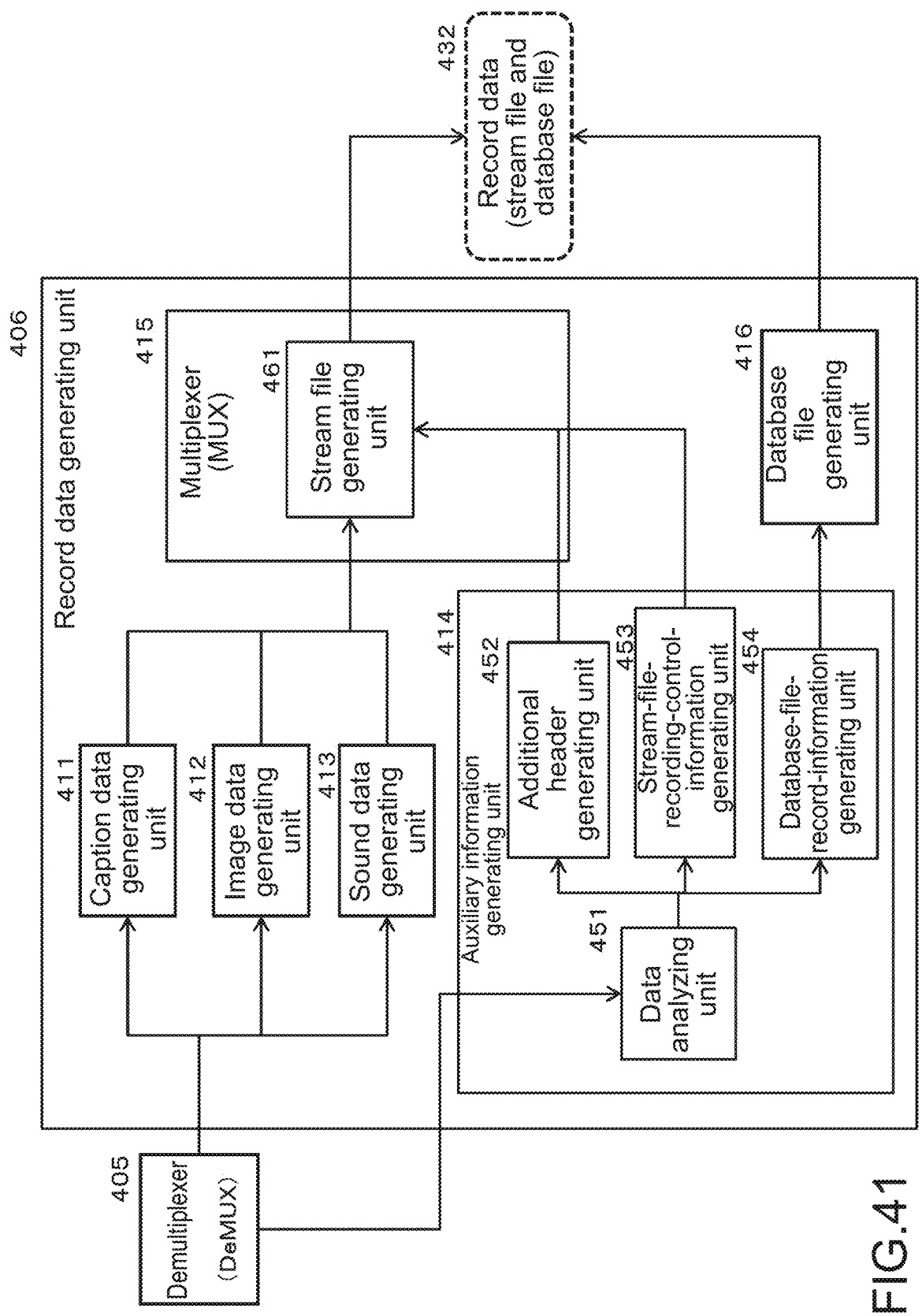
FIG. 41 is a diagram for describing a configuration example of an information processing apparatus that executes data record processing with respect to an information recording medium (medium).

As shown in FIG. 41, the record data generating unit 406 includes the caption data generating unit 411, the image data generating unit 412, the sound data generating unit 413, the auxiliary information generating unit 414, the multiplexer (MUX) 415, and the database file generating unit 416.

The auxiliary information generating unit 414 includes a data analyzing unit 451, an additional header generating unit 452, a stream-file-recording-control-information generating unit 453, and a database-file-record-information generating unit 454.

The data analyzing unit 451 analyzes the data separated by the demultiplexer (DeMUX) 405 and acquires data to be applied to generate copy control information to be recorded on the information recording medium (recording medium) 420, control information to be recorded in the stream file, and data to be recorded in the playlist file, the clip information file, or the like.

The data to be applied to generate copy control information is output to the additional header generating unit 452. The control information to be recorded in the stream file is output to the stream-file-recording-control-information generating unit 453. Further, the data to be applied to generate the playlist file or the clip information file is output to the database-file-record-information generating unit 454.

The additional header generating unit 452 generates an additional header in which the copy control information is recorded.

In a case where the stream file recorded on the information recording medium (recording medium) 420 is the MMTP packet string, the additional header in which the data described above with reference to FIG. 21 or 23 is recorded is generated.

Meanwhile, in a case where the stream file recorded on the information recording medium (recording medium) 420 is the TLV packet string, the additional header in which the data described above with reference to FIG. 22 or 24 is recorded is generated.

The stream-file-recording-control-information generating unit 453 generates control information that is recorded as the stream file recorded on the information recording medium (recording medium) 420.

The database-file-record-information generating unit 454 generates data to be recorded in the playlist file, the clip information file, or the like and outputs the data to the database file generating unit 416.

The database file generating unit 416 applies the data generated by the database-file-record-information generating unit 453 to generate the playlist file or the clip information file.

The additional header generated by the additional header generating unit 452 of the auxiliary information generating unit 414, that is, the MMTP packet additional header or TLV packet additional header is input to the stream file generating unit 461 of the multiplexer (MUX) 415.

The control information generated by the stream-file-recording-control-information generating unit 453 is also input to the stream file generating unit 461 of the multiplexer (MUX) 415.

The record data generated by the caption data generating unit 411, the image data generating unit 412, and the sound data generating unit 413 and the control information generated by the stream-file-recording-control-information generating unit 453 are each a data item in a unit of packet, which is defined by the MMT format data 431 received through the data input unit 401. Specifically, such a data item is any of the MMTP packet or the TLV packet.

The stream file generating unit 461 of the multiplexer (MUX) 415 generates a stream file for which the additional header in which the copy control information is recorded is additionally set in each of those packets.

In other words, the stream file generating unit 461 of the multiplexer (MUX) 415 generates any of the MMTP packet string for which the MMTP packet additional header described above with reference to FIG. 19 is set, or the TLV packet string for which TLV packet additional header described above with reference to FIG. 20 is set.

Note that, when generating the stream file including this packet string, the stream file generating unit 461 executes encryption processing in a unit of packet, which is described above with reference to FIGS. 28 and 29.

The stream file and database file thus generated are output to the recording unit 407 as the record data 432 with respect to the information recording medium (recording medium) 420.

Next, with reference to FIG. 42, a configuration of the record data generating unit 406 that executes the processing of generating the usage control information file (Usage File) in which the copy control information is recorded will be described.

Figure 42:
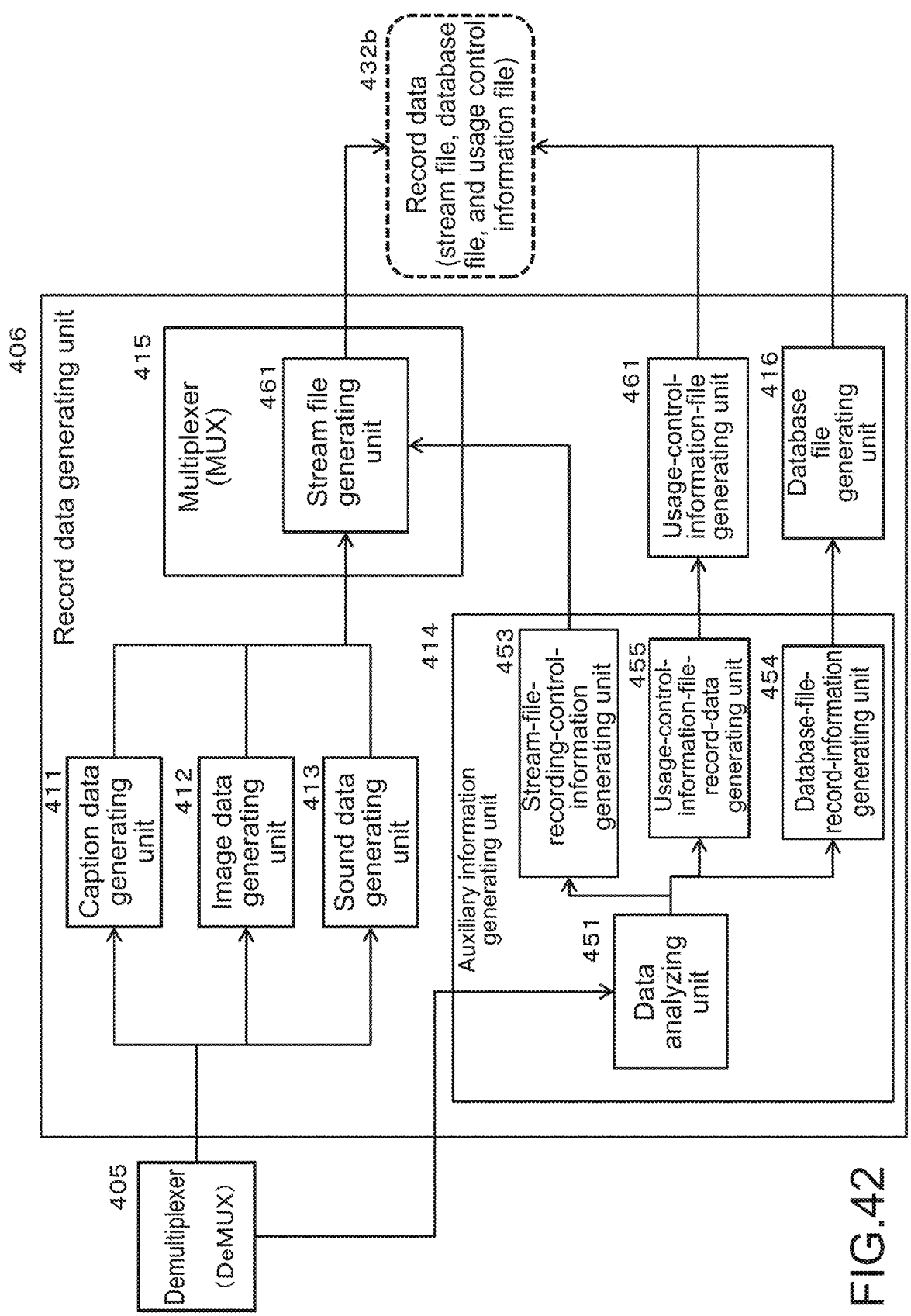
FIG. 42 is a diagram for describing a configuration example of an information processing apparatus that executes data record processing with respect to an information recording medium (medium).

As shown in FIG. 42, the record data generating unit 406 includes the caption data generating unit 411, the image data generating unit 412, the sound data generating unit 413, the auxiliary information generating unit 414, the multiplexer (MUX) 415, the database file generating unit 416, and a usage-control-information-file generating unit 461.

The auxiliary information generating unit 414 includes the data analyzing unit 451, the stream-file-recording-control-information generating unit 453, the database-file-record-information generating unit 454, and a usage-control-information-file-record-data generating unit 455.

The data analyzing unit 451 analyzes the data separated by the demultiplexer (DeMUX) 405 and acquires data to be applied to generate copy control information to be recorded on the information recording medium (recording medium) 420, control information to be recorded in the stream file, and data to be recorded in the playlist file, the clip information file, or the like.

The data to be applied to generate copy control information is output to the usage-control-information-file-record-data generating unit 455. The control information to be recorded in the stream file is output to the stream-file-recording-control-information generating unit 453. Further, the data to be applied to generate the playlist file or the clip information file is output to the database-file-record-information generating unit 454.

The usage-control-information-file-record-data generating unit 455 generates data to be recorded in the usage control information file in which the copy control information is recorded.

Specifically, the usage-control-information-file-record-data generating unit 455 generates data to be recorded in the usage control information file in which the copy control information described above with reference to FIGS. 36 and 37 is recorded.

The stream-file-recording-control-information generating unit 453 generates control information that is recorded as the stream file recorded on the information recording medium (recording medium) 420.

The database-file-record-information generating unit 454 generates data to be recorded in the playlist file, the clip information file, or the like and outputs the data to the database file generating unit 416.

The database file generating unit 416 applies the data generated by the database-file-record-information generating unit 453 to generate the playlist file or the clip information file.

The usage-control-information-file-record-data generated by the usage-control-information-file-record-data generating unit 455 of the auxiliary information generating unit 414 is input to the usage-control-information-file generating unit 461.

The usage-control-information-file generating unit 461 generates a usage control information file in which the usage-control-information-file-record-data generated by the usage-control-information-file-record-data generating unit 455 is stored.

The record data generated by the caption data generating unit 411, the image data generating unit 412, and the sound data generating unit 413 and the control information generated by the stream-file-recording-control-information generating unit 453 are each a data item in a unit of packet, which is defined by the MMT format data received through the data input unit 401. Specifically, such a data item is constituted by any of the MMTP packet or the TLV packet.

The stream file generating unit 461 of the multiplexer (MUX) 415 generates the MMTP packet string described with reference to FIGS. 9A, 9B, and 9C or the TLV packet string described with reference to FIGS. 10A, 10B, and 10C.

The stream file, database file, and the usage control information file thus generated are output to the recording unit 407 as record data 432b with respect to the information recording medium (recording medium) 420.

Next, the sequence of the data record processing with respect to the information recording medium 420 that is executed by information processing apparatus 400 shown in FIG. 40 will be described with reference to flowcharts shown in FIGS. 43 and 44.

Figure 43:
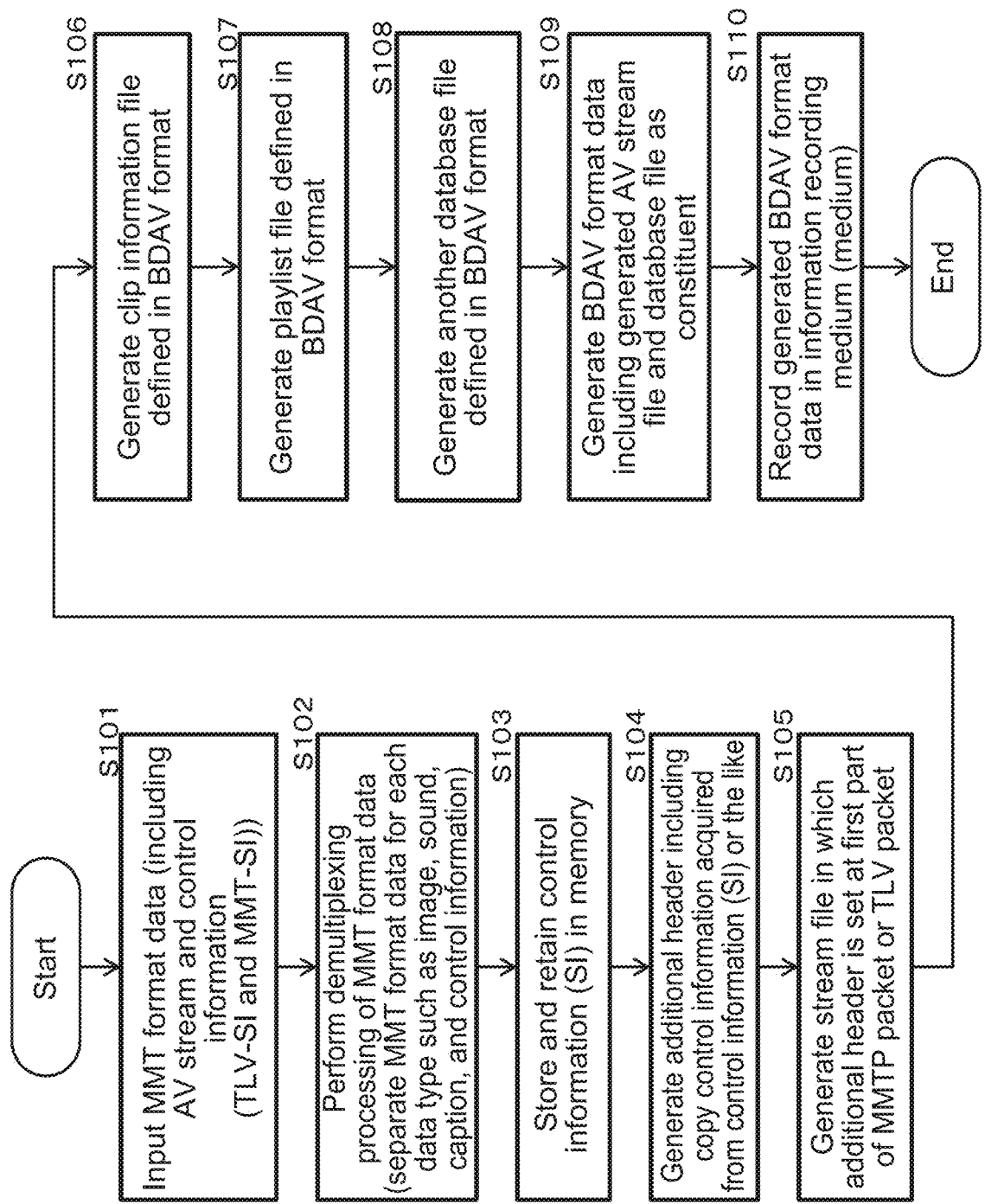
FIG. 43 is a diagram showing a flowchart for describing a processing sequence of the data record processing with respect to the information recording medium (medium).

FIG. 43 is a flowchart for describing a processing sequence of processing of recording the copy control information in the additional header and then on the information recording medium 420.

Figure 44:
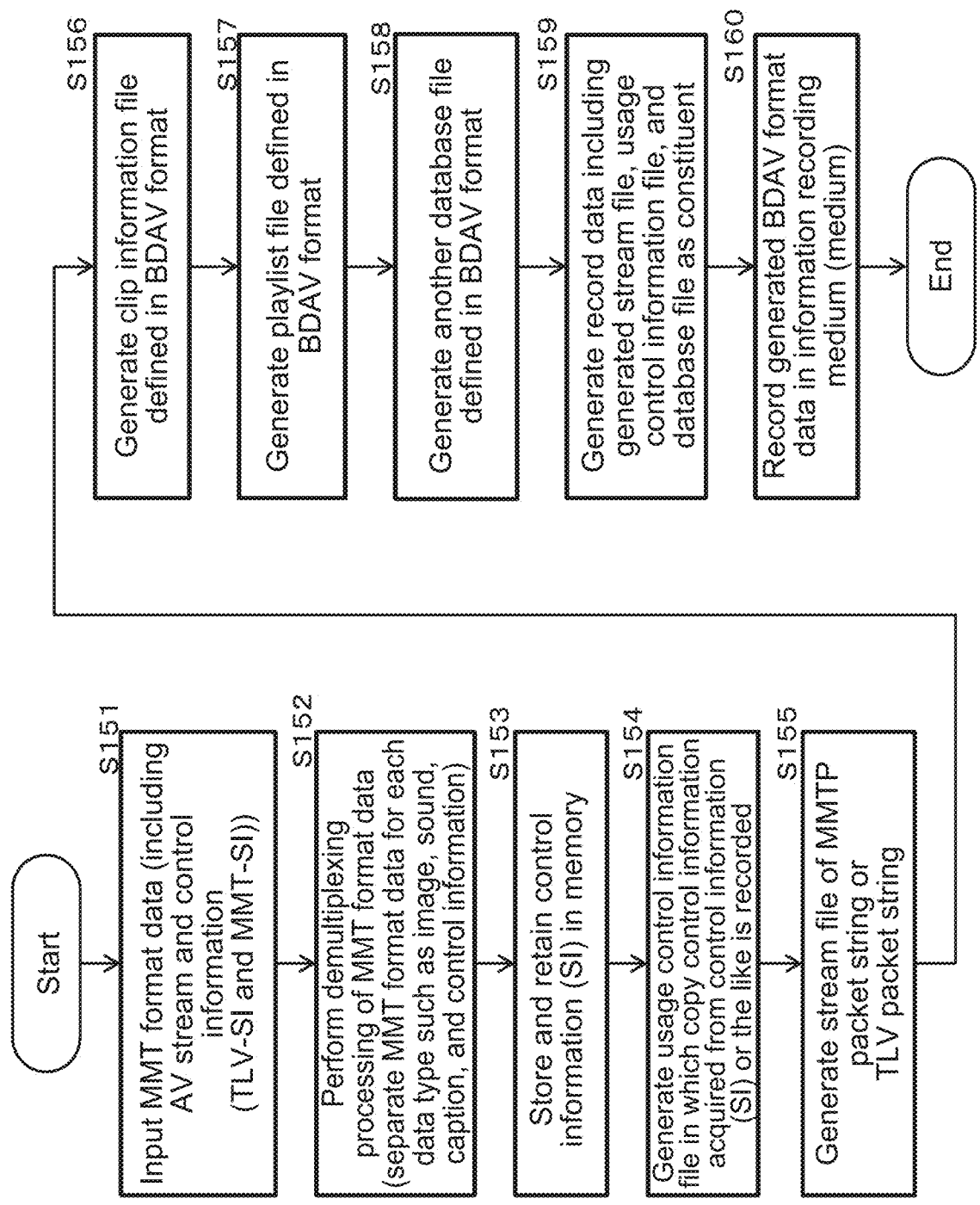
FIG. 44 is a diagram showing a flowchart for describing the processing sequence of the data record processing with respect to the information recording medium (medium).

FIG. 44 is a flowchart for describing a processing sequence of processing of recording the copy control information in the usage control information file (Usage File) and then on the information recording medium 420.

First, with reference to FIG. 43, the processing sequence of the processing of recording the copy control information in the additional header and then on the information recording medium 420 will be described.

Processing according to the procedure shown in FIG. 43 can be executed, for example, under the control of the data processing unit (the control unit) that includes a CPU having a function of executing a program, in accordance with a program stored in the storage unit of the information processing apparatus.

Hereinafter, the processing of each step shown in the procedure of FIG. 43 will be sequentially described.

(Step S101)

First, in Step S101, the information processing apparatus 400 inputs the MMT format data that is the record data through the data input unit 401.

Note that, the record data includes the image data, the sound data, the caption data, control information (TLV-SI and MMT-SI) in which the notification information, the control information, and the like are stored, and the like.

(Step S102)

Next, in Step S102, the information processing apparatus 400 performs demultiplexing processing of the input MMT format data, that is, data separation processing of data type unit. The information processing apparatus 400 executes separation processing of the image, the sound, the caption, the control information, and the like.

(Step S103)

Next, in Step S103, the information processing apparatus 400 stores the control information separated in Step S102, for example, the control information (TLV-SI and MMT-SI) in the memory.

(Step S104)

Next, in Step S104, the information processing apparatus 400 generates an additional header in which the copy control information is recorded, the copy control information being acquired from the control information or the like stored in the memory in Step S103.

In a case where the stream file recorded on the information recording medium (recording medium) 420 is the MMTP packet string, the additional header in which the data described above with reference to FIG. 21 or 23 is recorded is generated.

Meanwhile, in a case where the stream file recorded on the information recording medium (recording medium) 420 is the TLV packet string, the additional header in which the data described above with reference to FIG. 22 or 24 is recorded is generated.

As described above with reference to FIGS. 21 and 24, the following copy control information items are recorded in the additional header.

(A) Digital recording control information (digital_recording_control_data)
(B) Encryption information (encryption_mode)
(C) Copy number restriction information (copy_restriction_mode)
(D) Encryption flag (encryption_flag)

As shown in FIG. 18, (A) Digital recording control information (digital_recording_control_data) has any of the following settings.

Digital recording allowed (set bit value=00)
Digital recording not allowed (11)
Digital recording allowed for only first generation (10)

As shown in FIG. 18, (B) Encryption information (encryption_mode) has any of the following settings.

Encryption necessary for output copy data (0)
Encryption unnecessary for output copy data (1)

As shown in FIG. 18, (C) Copy number restriction information (copy_restriction_mode) has any of the following settings.

With copy number restriction (1)
Without copy number restriction (0)

As described above with reference to FIGS. 23 and 24, regarding (D) Encryption flag (encryption_flag), the encryption flag=00 means that the data stored in the packet is unencrypted data (=plain text data).

The encryption flag=11 means that the data stored in the packet is encryption data.

On the basis of the encryption flag, whether or not it is necessary to perform decoding processing or re-encryption processing for copy target data can be instantly determined in a unit of packet.

(Step S105)

Next, in Step S105, the information processing apparatus 400 generates a stream file including a packet string in which the additional header generated in Step S104 is set for each MMTP packet or TLV packet.

In other words, the information processing apparatus 400 generates a stream file for which the additional header in which the copy control information is recorded is additionally set in each packet.

Specifically, the information processing apparatus 400 generates any of the MMTP packet string for which the MMTP packet additional header described above with reference to FIG. 19 is set, or the TLV packet string for which TLV packet additional header described above with reference to FIG. 20 is set.

(Step S106)

Next, in Step S106, the information processing apparatus 400 generates a clip information file by using constituent data of the input MMT format data.

In other words, the information processing apparatus 400 generates a clip information file corresponding to the clip AV stream file in which the MMT format data is stored.

(Step S107)

Next, in Step S107, the information processing apparatus 400 generates a playlist file by using the constituent data of the input MMT format data.

In other words, the information processing apparatus 400 generates a playlist file corresponding to the clip AV stream file in which the MMT format data is stored.

(Step S108)

Next, in Step S108, information processing apparatus 400 generates another database file by using the input MMT format data.

(Step S109)

Next, in Step S109, the information processing apparatus 400 generates BDAV format data by using the generated AV stream file and database file.

(Step S110)

Next, in Step S110, the information processing apparatus 400 records the BDAV format data generated in Step S109 on the information recording medium (medium).

Next, with reference to FIG. 44, the processing sequence of the processing of recording the copy control information in the usage control information file (Usage File) and then on the information recording medium 420 will be described.

Processing according to the procedure shown in FIG. 44 can be executed, for example, under the control of the data processing unit (the control unit) that includes a CPU having a function of executing a program, in accordance with a program stored in the storage unit of the information processing apparatus.

Hereinafter, the processing of each step shown in the procedure of FIG. 44 will be sequentially described.

(Steps S151 to S153)

Processing of Steps S151 to S153 is the same processing as the processing of Steps S101 to S103 described with reference to FIG. 43.

First, in Step S151, the information processing apparatus 400 inputs the MMT format data that is the record data through the data input unit 401.

Next, in Step S152, the information processing apparatus 400 performs demultiplexing processing of the input MMT format data, that is, data separation processing of data type unit. The information processing apparatus 400 executes separation processing of the image, the sound, the caption, the control information, and the like.

Next, in Step S153, the information processing apparatus 400 stores the control information separated in Step S102, for example, the control information (TLV-SI and MMT-SI) in the memory.

(Step S154)

Next, in Step S154, the information processing apparatus 400 generates a usage control information file (Usage File) in which the copy control information is recorded, the copy control information being acquired from the control information or the like stored in the memory in Step S153.

The information processing apparatus 400 generates the usage control information file (Usage File) including the record data described above with reference to FIGS. 36 and 37.

(Step S155)

Next, in Step S155, the information processing apparatus 400 generates a stream file.

Specifically, the information processing apparatus 400 generates a stream file including the MMTP packet string described with reference to FIGS. 9A, 9B, and 9C or the TLV packet string described with reference to FIGS. 10A, 10B, and 10C.

(Step S156 to S158)

Processing of Steps S156 to S158 is the same processing as the processing of Steps S106 to S108 in the procedure described above with reference to FIG. 43.

First, in Step S156, the information processing apparatus 400 generates a clip information file by using constituent data of the input MMT format data.

Next, in Step S157, the information processing apparatus 400 generates a playlist file by using the constituent data of the input MMT format data.

Next, in Step S158, the information processing apparatus 400 generates another database file by using the input MMT format data.

(Step S159)

Next, in Step S159, the information processing apparatus 400 generates record data including as components the generated AV stream file, database file, and usage control information file.

(Step S160)

Next, in Step S160, the information processing apparatus 400 records the record data generated in Step S159 on the information recording medium (medium).

[12. Configuration and Processing of Information Processing Apparatus that Executes Data Copy Processing Between Information Recording Media]

Next, the configuration and the processing of the information processing apparatus that executes the data copy processing between information recording media will be described with reference to FIG. 45 and the like.

Figure 45:
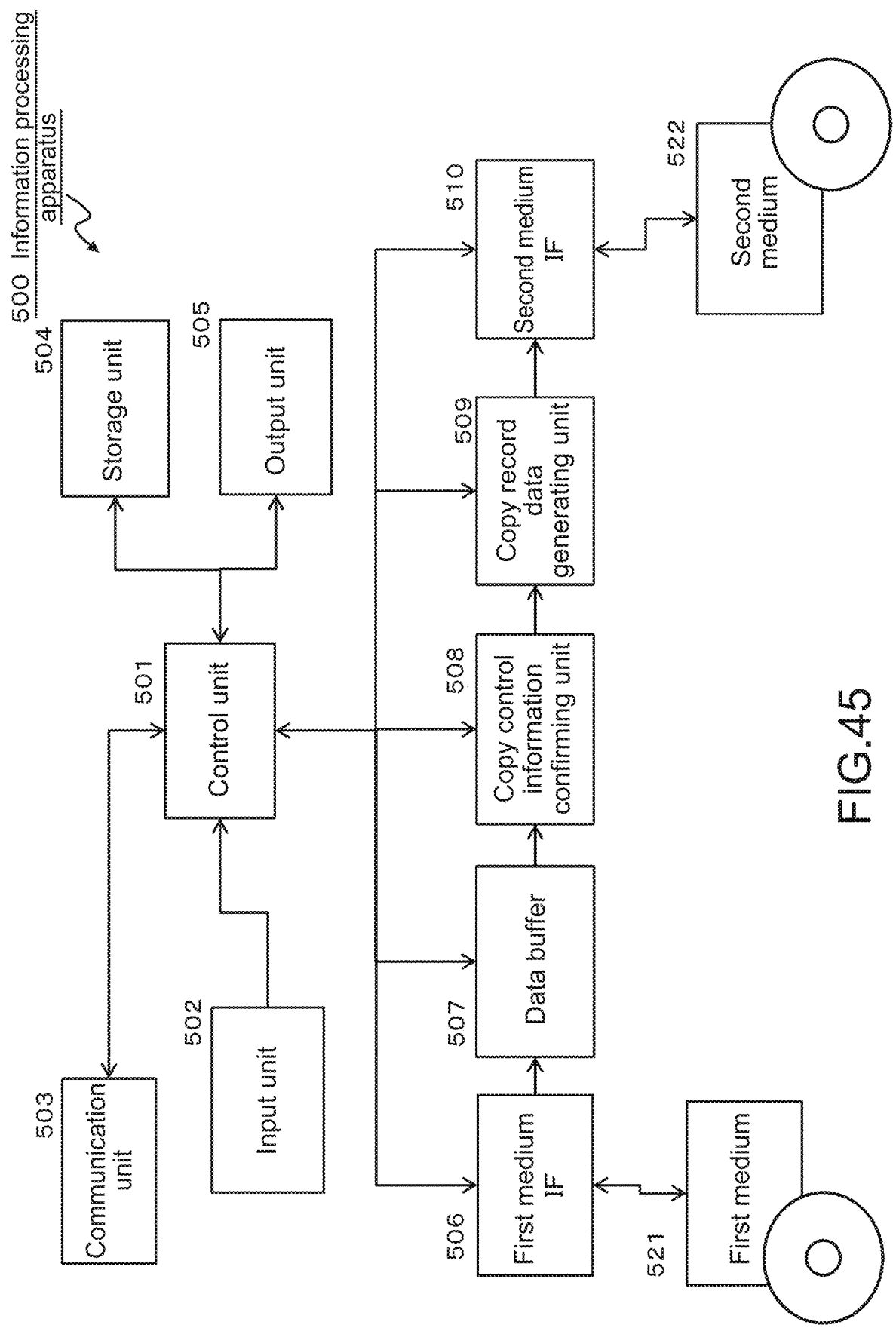
FIG. 45 is a diagram for describing a configuration example of an information processing apparatus that executes data copy processing between information recording media (media).

An information processing apparatus 500 shown in FIG. 45 is an information processing apparatus that copies data recorded on a first medium 521 to a second medium 522 and record the data on the second medium 522.

The information processing apparatus 500 performs so-called copy processing of reading the data recorded on the first medium 521, which is, for example, an information recording medium such as BD (Blu-ray (registered trademark) Disc), and copying the data to the second medium 522.

Alternatively, the information processing apparatus 500 performs copy processing of recording medium record data, which is input through a communication unit 503, on the second medium 522.

As shown in FIG. 45, the information processing apparatus 500 includes a control unit 501, an input unit 502, the communication unit 503, a storage unit 504, an output unit 505, a first medium interface (IF) 506, a data buffer 507, a copy control information confirming unit 508, a copy record data generating unit 509, and a second medium IF 510.

The control unit 501 controls data processing to be executed by the information processing apparatus 500, such as data recording/reproduction using media and data copy processing between media. Those control operations are performed in accordance with a program stored in the storage unit 504, for example.

The input unit 502 is an input unit including switches, buttons, a touch panel, and the like that can be operated by a user. The input unit 602 is an input unit through which instructions for various types of processing such as reproduction, copying, and recording are input.

Further, the input unit 502 may also be configured to include an imaging unit and a microphone through which images and sound to be recorded on a medium are input.

The communication unit 503 communicates with an external server or an external apparatus, for example, and is used in various types of communication processing for acquiring data to be recorded on a medium, control information related to the data to be recorded, permission information for copy processing, or the like.

The storage unit 504 is used as a storage area for the programs to be executed by the control unit 501 and parameters and the like to be used in executing the programs, and as a work area or the like during execution of a program.

Specifically, the storage unit 504 is also used as an area that temporarily stores data read from the first medium 521 before recording the data on the second medium 522, or data that is input via the communication unit 503.

The storage unit 504 is formed with a RAM, a ROM, and the like.

The output unit 505 is formed with an output unit with respect to the external apparatus or an output unit for reproduction data from a medium. For example, the output unit 505 is used in displaying the progress of data record processing on the second medium 522 or displaying a message to the user. The output unit 505 includes a display, a speaker, and the like.

The first medium interface (IF) 506 is an interface functioning as a data recording/reproducing unit that accesses the first medium 521 such as a Blu-ray (registered trademark) Disc (BD), and performs data recording or data reading on the first medium 521.

The data buffer 507 is a buffer that temporarily stores data read from the first medium 521, and data input from the communication unit 503. For example, the data buffer 507 temporarily stores data to be recorded on the second medium 522.

The copy control information confirming unit 508 executes confirmation processing for the copy control information to be referred to in the processing of copying the data recorded on the first medium 521.

The copy control information is read from the additional header set in each constituent packet of the stream file, or the usage control information file.

The stream file recorded on the first medium 521 is data including the MMTP packet string or TLV packet string.

The copy control information is recorded in the additional header (MMTP packet additional header or TLV packet additional header) set at the first part of each of those packets, or the usage control information file (Usage File).

The copy control information confirming unit 508 determines whether the copy processing is allowed or not with reference to the additional header or the usage control information file (Usage File).

In a case where the copy processing is not allowed, copying is not performed. In a case where copying is allowed, copying is executed.

Note that this copying allowance determination can be performed in a unit of packet, for example.

The copy record data generating unit 509 generates copy record data of the data, for which the copy control information confirming unit 508 determines that copying is allowed.

Note that this processing of generating copy record data includes, for example, converting processing into a format corresponding to that of the second medium 522, or encryption processing.

The second medium interface (IF) 510 is an interface functioning as a data recording/reproducing unit that accesses the second medium 522, and performs data recording or reading processing on the second medium 522.

In such a manner, the information processing apparatus 500 performs processing of recording data, which is input from the first medium 521 or via the communication unit 503, onto the second medium 522.

In this processing, the information processing apparatus 500 performs processing of determining whether the copy processing is allowed or not with reference to the additional header or the usage control information file (Usage File) and further executing copy processing according to the control information recorded in the copy control information.

Furthermore, in a case where the copy control information needs to be updated along with execution of the copy processing, update processing is executed to record updated copy control information on the second medium 522.

Note that the information processing apparatus 500 may be configured to acquire permission information for the copy processing from the first medium 521 to the second medium 522 from an external server through the communication unit 503, and to perform copy processing conditional on the acquisition of the permission information.

Next, the sequence of the data copy processing the first medium 521 to the second medium 522 that is executed by the information processing apparatus 500 shown in FIG. 45 will be described with reference to flowcharts shown in FIGS. 46 and 47.

Figure 46:
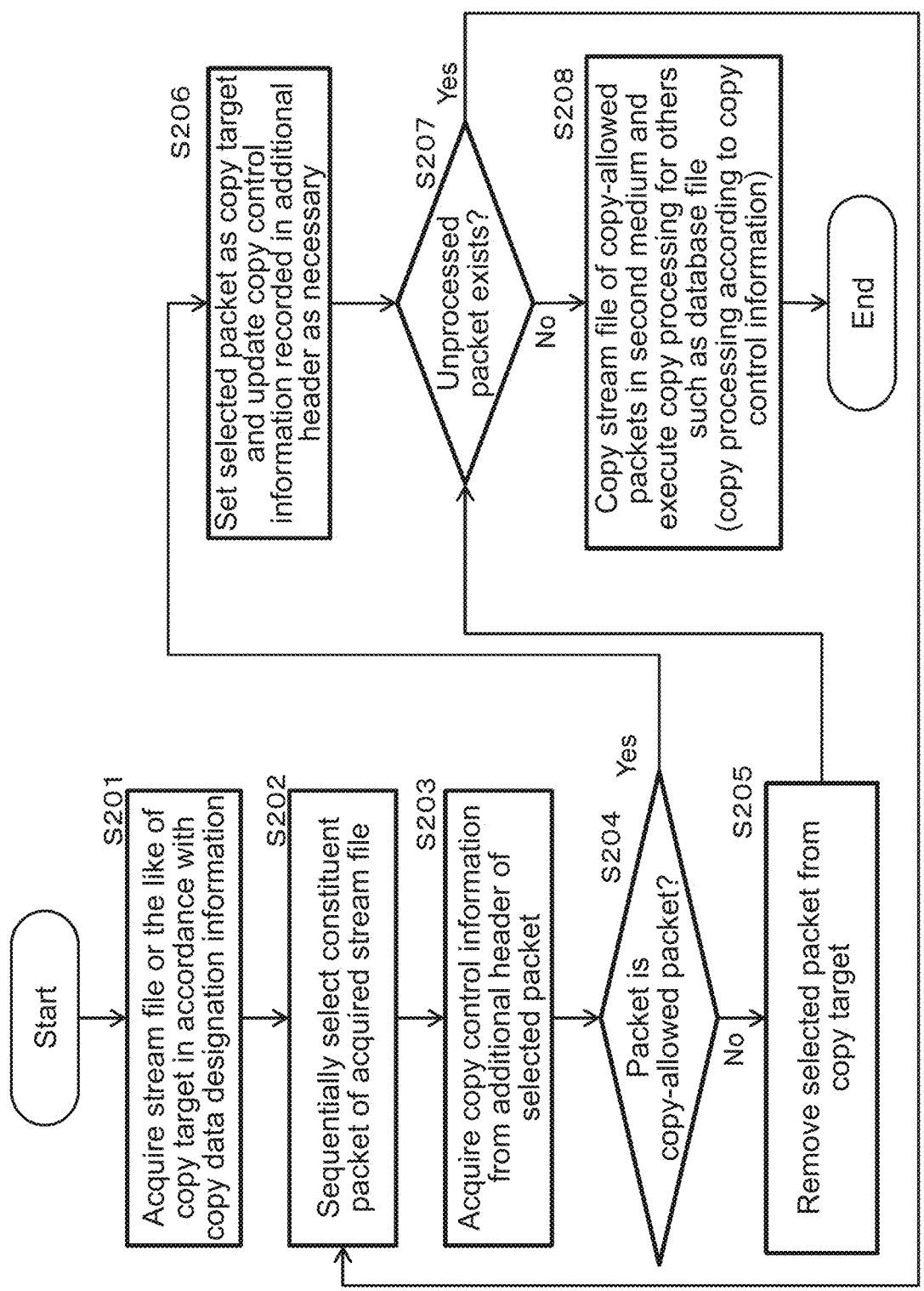
FIG. 46 is a diagram for describing a configuration example of an information processing apparatus that executes data copy processing between information recording media (media).

FIG. 46 is a flowchart for describing a sequence of copy processing in a case where the copy control information is recorded in the MMTP packet additional header or the TLV packet additional header.

Figure 47:
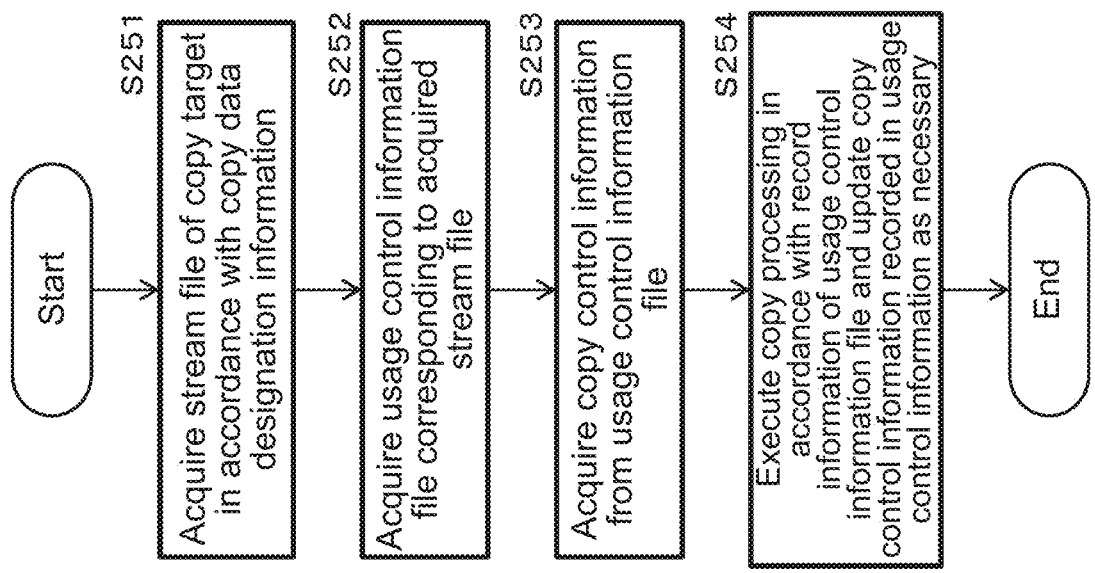
FIG. 47 is a diagram for describing a configuration example of an information processing apparatus that executes data copy processing between information recording media (media).

FIG. 47 is a flowchart for describing a sequence of copy processing in a case where the copy control information is recorded in the usage control information file (Usage File).

First, with reference to FIG. 46, the sequence of the copy processing in a case where the copy control information is recorded in the MMTP packet additional header or the TLV packet additional header will be described.

Processing according to the procedure shown in FIG. 46 can be executed, for example, under the control of the data processing unit (the control unit) that includes a CPU having a function of executing a program, in accordance with a program stored in the storage unit of the information processing apparatus 500.

Hereinafter, the processing of each step shown in the procedure of FIG. 46 will be sequentially described.

(Step S201)

First, in Step S201, for example, the information processing apparatus 500 reads, from the first medium 521, a stream file that is a specified copy target, and copy target data such as the playlist file or the clip information file associated with the stream file, in accordance with the copy data designation information input by a user, for example.

(Step S202)

Next, in Step S202, the information processing apparatus 500 sequentially selects a constituent packet (MMTP packet or TLV packet) of the acquired stream file.

(Step S203)

Next, in Step S203, the information processing apparatus 500 reads copy control information from the additional header set at the first part of the selected packet.

(Step S204)

Next, in Step S204, the information processing apparatus 500 determines whether the copy control information recorded in the additional header of the selected packet allows copying of the selected packet or not.

In a case where copying is not allowed, the processing proceeds to Step S205.

In a case where copying is allowed, the processing proceeds to Step S206.

(Step S205)

In Step S204, in a case where it is determined that copying of the selected packet is not allowed on the basis of the copy control information recorded in the additional header of the selected packet, the processing proceeds to Step S205. The information processing apparatus 500 removes the selected packet from the copy target and proceeds to Step S207.

(Step S206)

Meanwhile, in Step S204, in a case where it is determined that copying of the selected packet is allowed on the basis of the copy control information recorded in the additional header of the selected packet, the processing proceeds to Step S206. The information processing apparatus 500 sets the selected packet as copy target and further updates the copy control information of the additional header as necessary, and then proceeds to Step S207.

For example, in a case where the original copy control information indicates "copy-once", an allowed copy number reaches the upper limit by this copy processing. Thus, the update processing for the copy control information is processing of rewriting the copy control information to "copy prohibited", or the like.

(Step S207)

In Step S207, the information processing apparatus determines whether an unprocessed packet exists or not. In a case where an unprocessed packet exists, the information processing apparatus returns to Step S202 and then selects the next packet and repeats the processing of Steps S202 to S206.

In Step S207, in a case of determining that an unprocessed packet does not exists, the information processing apparatus proceeds to Step S208.

(Step S208)

In Step S208, the information processing apparatus copies the stream file including the copy-allowed packets to the second medium, and further executes copy processing for others such as the database file. The copy processing is executed as copy processing according to the copy control information.

Note that the copy control information is the data recorded in the additional header and is, for example, the following data items described above with reference to FIGS. 18 and 21 to 24.

(A) Digital recording control information (digital_recording_control_data)

(B) Encryption information (encryption_mode)

(C) Copy number restriction information (copy_restriction_mode)

(D) Encryption flag (encryption_flag)

As shown in FIG. 18, (A) Digital recording control information (digital_recording_control_data) has any of the following settings.

Digital recording allowed (set bit value=00)

Digital recording not allowed (11)

Digital recording allowed for only first generation (10)

As shown in FIG. 18, (B) Encryption information (encryption_mode) has any of the following settings.

Encryption necessary for output copy data (0)

Encryption unnecessary for output copy data (1)

As shown in FIG. 18, (C) Copy number restriction information (copy_restriction_mode) has any of the following settings.

With copy number restriction (1)

Without copy number restriction (0)

As described above with reference to FIGS. 23 and 24, regarding (D) Encryption flag (encryption_flag), the encryption flag=00 means that the data stored in the packet is unencrypted data (=plain text data).

The encryption flag=11 means that the data stored in the packet is encryption data.

On the basis of the encryption flag, whether or not it is necessary to perform decoding processing or re-encryption processing for copy target data can be instantly determined in a unit of packet.

Next, with reference to FIG. 47, the sequence of the copy processing in a case where the copy control information is recorded in the usage control information file (Usage File) will be described.

Processing according to the procedure shown in FIG. 47 can be executed, for example, under the control of the data processing unit (the control unit) that includes a CPU having a function of executing a program, in accordance with a program stored in the storage unit of the information processing apparatus 500.

Hereinafter, the processing of each step shown in the procedure of FIG. 47 will be sequentially described.

(Step S251)

First, in Step S251, the information processing apparatus 500 reads, from the first medium 521, a stream file that is a specified copy target, and copy target data such as the playlist file or the clip information file associated with the stream file, in accordance with the copy data designation information input by a user, for example.

(Step S252)

Next, in Step S252, the information processing apparatus 500 acquires the usage control information file (Usage File) corresponding to the acquired stream file.

(Step S253)

Next, in Step S253, the information processing apparatus 500 reads copy control information from the acquired usage control information file (Usage File).

(Step S254)

Next, in Step S254, the information processing apparatus 500 executes copy processing in accordance with the record information of the usage control information file and updates, as necessary, the copy control information recorded in the usage control information.

For example, in a case where the original copy control information indicates "copy-once", an allowed copy number reaches the upper limit by this copy processing. Thus, the update processing for the copy control information is processing of rewriting the copy control information to "copy prohibited", or the like.

[13. Configuration Example of Information Processing Apparatus]

Figure 48:
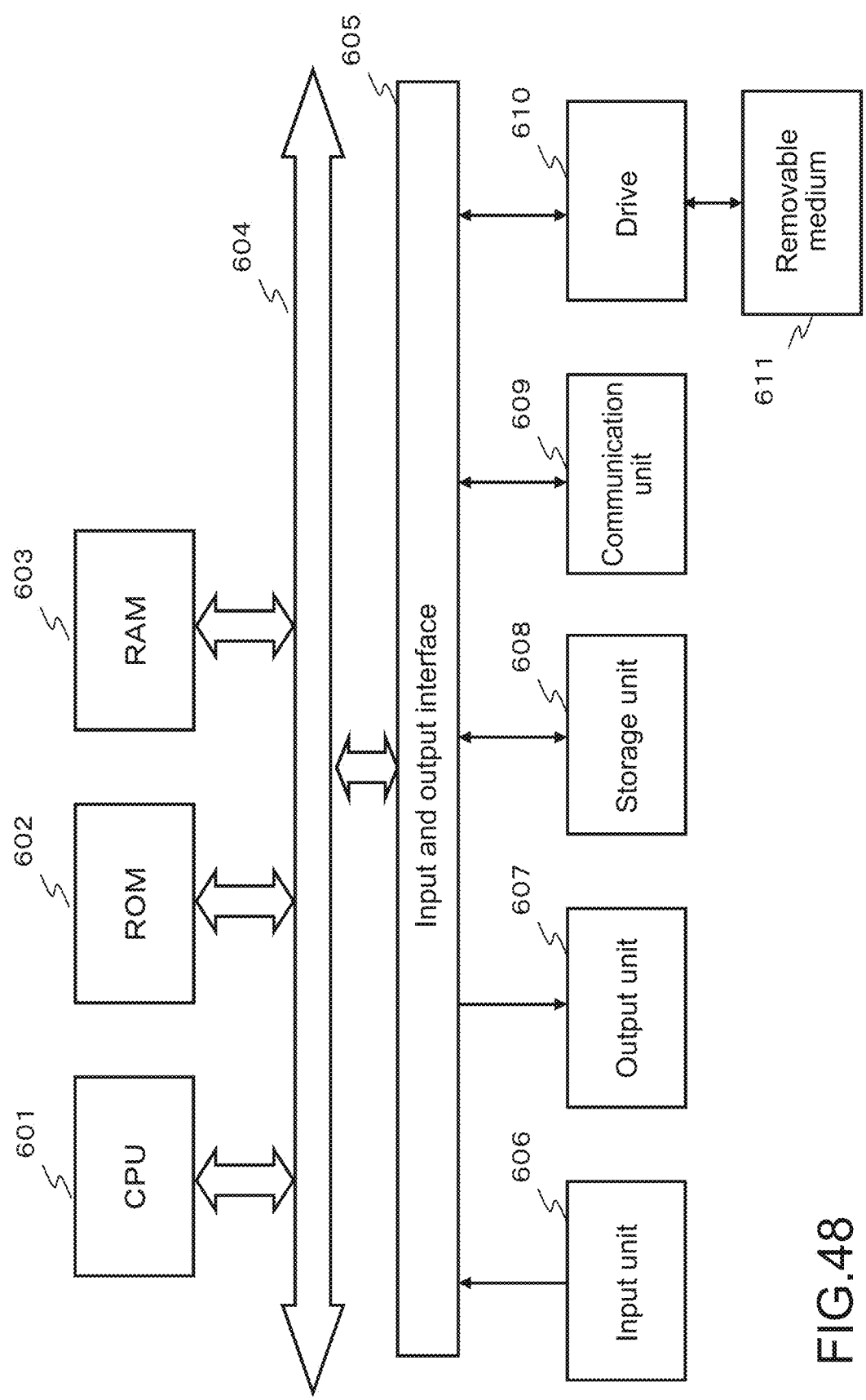
FIG. 48 is a diagram for describing a hardware configuration example of an information processing apparatus that is applied to processing of the present disclosure.

Next, a hardware configuration example of an information processing apparatus that can be applied as the information processing apparatus that executes the data recording with respect to the information recording medium and the data copy processing with respect to the information recording medium will be described with reference to FIG. 48.

A central processing unit (CPU) 601 functions as a data processing unit executing various types of processing in accordance with a program stored in a read only memory (ROM) 602 or a storage unit 608. For example, the processing according to the sequence described in the above example is executed. The program executed by the CPU 601, data, and the like are stored in the random access memory (RAM) 603. The CPU 601, the ROM 602, and the RAM 603 are connected to each other through a bus 604.

The CPU 601 is connected to an input and output interface 605 through the bus 604, and an input unit 606 including various switches, keyboards, mouses, microphones, and the like, and an output unit 607 including a display, a speaker, and the like are connected to the input and output interface 605. The CPU 601 executes various types of processing in response to a command input from the input unit 606, and outputs a processing result, for example, to the output unit 607.

The storage unit 608 connected to the input and output interface 605, for example, includes a hard disk and the like, and stores the program executed by the CPU 601, or various data items. A communication unit 609 functions as a transmission and reception unit of data communication through a network such as the internet or a local area network, and a transmission and reception unit of a broadcasting wave, and performs communication with respect to the external apparatus.

A drive 610 connected to the input and output interface 605 drives a removable medium 611 such as a magnetic disk, an optical disk, a magneto-optical disk, or a semiconductor memory such as a memory card, and executes data recording or data reading.

[14. Summary of Configuration of Present Disclosure]

As described above, the examples of the present disclosure have been described in detail, with reference to specific examples. However, it is obvious that a person skilled in the art is capable of performing correction or substitution with respect to the examples within a range not departing from the gist of the present disclosure. That is, the present invention has been described in the form of exemplification, and should not be limitingly construed. In order to determine the gist of the present disclosure, the claims should be referred to.

Note that the technology disclosed herein can be configured as follows.

(1) An information processing apparatus, including a data processing unit that receives an input of MPEG media transport (MMT) format data, for which copy control information is set, and generates record data according to a BDAV format or an SPAV format that is a data record format with respect to an information recording medium, in which the data processing unit generates, as the record data, (a) a stream file including a packet string in which the MMT format data is stored as reproduction data, and (b) copy control information corresponding to the stream file, in which the copy control information corresponding to the MMT format data included in the input data is reflected.

(2) The information processing apparatus according to (1), in which the data processing unit generates the stream file as an MMT protocol (MMTP) packet string or a type length value (TLV) packet string, and stores copy control information of each of packets included in the stream file in an additional header corresponding to each of the packets.

(3) The information processing apparatus according to (1), in which the data processing unit generates the stream file as an MMT protocol (MMTP) packet string or a type length value (TLV) packet string, and stores copy control information of each of packets included in the stream file in any of an additional header in a unit of multiple packets, an additional header in a unit of fixed data length, or an additional header in a unit of variable data length.

(4) The information processing apparatus according to (1), in which the data processing unit generates a usage control information file in which the copy control information corresponding to the stream file is stored.

(5) The information processing apparatus according to (4), in which the data processing unit records seed information for generating an encryption key in a unit of block in the usage control information file, the unit of block being a unit of encryption processing, in which a packet string to be recorded on the information recording medium is included.

(6) The information processing apparatus according to any one of (1) to (5), in which the copy control information corresponding to the stream file includes at least one information item of (A) digital recording control information that indicates digital recording allowable information, (B) encryption information that indicates information of necessity/unnecessity of encryption of output copy data, or (C) copy number restriction information that indicates a copy allowable number.

(7) The information processing apparatus according to any one of (1) to (6), in which the copy control information corresponding to the stream file includes (D) an encryption flag that indicates whether data stored in a packet is encryption data or not.

(8) The information processing apparatus according to any one of (1) to (7), in which the data processing unit generates the stream file as a packet string of MMTP packets or TLV packets, stores copy control information of each of the packets included in the stream file in an additional header corresponding to each of the packets, and encrypts each of the packets included in the stream file by using an encryption key generated on a basis of constituent data of the additional header of each of the packets.

(9) An information processing apparatus, including a data processing unit that copies record data of a first medium to a second medium, in which the first medium is a medium on which a stream file including a packet string in which MPEG media transport (MMT) format data is stored as reproduction data, and copy control information corresponding to the stream file are recorded, and the data processing unit executes copy control of the stream file in accordance with reference information by referring to the copy control information.

(10) The information processing apparatus according to (9), in which
the first medium has a configuration in which
the stream file is recorded as an MMT protocol (MMTP) packet string or a type length value (TLV) packet string, and
copy control information of each of packets included in the stream file is recorded in an additional header corresponding to each of the packets, and
the data processing unit
acquires the copy control information of each of the packets from the additional header set for each of the packets included in the stream file, and
executes the copy control in a unit of packet in accordance with the acquired information.

(11) The information processing apparatus according to (9), in which
the first medium has a configuration in which
the stream file is recorded as an MMT protocol (MMTP) packet string or a type length value (TLV) packet string, and
copy control information of each of packets included in the stream file is stored in any of an additional header in a unit of multiple packets, an additional header in a unit of fixed data length, or an additional header in a unit of variable data length, and
the data processing unit
acquires the copy control information from the additional header, and
executes the copy control of data subsequent to the additional header.

(12) The information processing apparatus according to (9), in which
the first medium has a configuration in which
the stream file is recorded as an MMT protocol (MMTP) packet string or a type length value (TLV) packet string, and
the copy control information corresponding to the stream file is recorded in a usage control information file, and
the data processing unit
acquires the copy control information from the usage control information file, and
executes the copy control in accordance with the acquired information.

(13) The information processing apparatus according to any one of (9) to (12), in which
the copy control information corresponding to the stream file includes at least one information item of
(A) digital recording control information that indicates digital recording allowable information,
(B) encryption information that indicates information of necessity/unnecessity of encryption of output copy data, or
(C) copy number restriction information that indicates a copy allowable number, and
the data processing unit performs the copy control according to each of the information items (A) to (C).

(14) The information processing apparatus according to any one of (9) to (13), in which
the copy control information corresponding to the stream file includes
(D) an encryption flag that indicates whether data stored in a packet is encryption data or not, and
the data processing unit determines whether the data stored in the packet is the encryption data or not by referring to the encryption flag.

(15) The information processing apparatus according to any one of (9) to (14), in which
when executing copy processing, the data processing unit updates the copy control information recorded on the first medium and then records the copy control information on the second medium.

(16) The information processing apparatus according to any one of (9) to (15), in which
when executing copy processing, the data processing unit
generates an encryption key in a unit of encryption processing by applying seed information acquired from the record data of the first medium,
executes encryption processing, to which the generated encryption key is applied, in the unit of encryption processing, and
records the record data on the second medium.

(17) The information processing apparatus according to (16), in which
the seed information is
constituent data of an additional header corresponding to each packet, an additional header in a unit of multiple packets, an additional header in a unit of fixed data length, or an additional header in a unit of variable data length, or
record data in the usage control information file.

(18) An information recording medium, including
a configuration in which
a stream file including an MMTP packet string or a TLV packet string in which MPEG media transport (MMT) format data is stored, and copy control information in a unit of MMTP packet or TLV packet are recorded in an additional header of each packet, in which
the information recording medium includes record data with which an information processing apparatus that executes copy processing of the record data on the information recording medium is capable of executing copy control in a unit of packet included in the stream file.

(19) An information processing method that is executed in an information processing apparatus, the information processing apparatus including
a data processing unit that receives an input of MPEG media transport (MMT) format data, for which copy control information is set, and generates record data according to a BDAV format or an SPAV format that is a data record format with respect to an information recording medium, the information processing method including
generating, by the data processing unit, as the record data,
(a) a stream file including a packet string in which the MMT format data is stored as reproduction data, and
(b) copy control information corresponding to the stream file, in which the copy control information corresponding to the MMT format data included in the input data is reflected.

(20) An information processing method that is executed in an information processing apparatus, the information processing apparatus including
a data processing unit that copies record data of a first medium to a second medium,
the first medium being a medium on which a stream file including a packet string in which MPEG media transport (MMT) format data is stored as reproduction data, and copy control information corresponding to the stream file are recorded, the information processing method including
executing, by the data processing unit, copy control of the stream file in accordance with reference information by referring to the copy control information.

(21) A program that causes an information processing apparatus to execute information processing, the information processing apparatus including a data processing unit that receives an input of MPEG media transport (MMT) format data, for which copy control information is set, and generates record data according to a BDAV format or an SPAV format that is a data record format with respect to an information recording medium, the program causing the data processing unit to generate, as the record data,
(a) a stream file including a packet string in which the MMT format data is stored as reproduction data, and
(b) copy control information corresponding to the stream file, in which the copy control information corresponding to the MMT format data included in the input data is reflected.

(22) A program that causes an information processing apparatus to execute information processing, the information processing apparatus including a data processing unit that copies record data of a first medium to a second medium, the first medium being a medium on which a stream file including a packet string in which MPEG media transport (MMT) format data is stored as reproduction data, and copy control information corresponding to the stream file are recorded, the program causing the data processing unit to execute copy control of the stream file in accordance with reference information by referring to the copy control information.

In addition, a set of processing described in the specification can be executed by hardware, software, or a composite configuration of both of hardware and software. In a case where the processing is executed by software, a program in which the processing sequence is recorded can be executed by being installed in a memory in a computer that is built in dedicated hardware, or can be executed by installing the program in a general-purpose computer that is capable of executing various types of processing. For example, the program can be recorded in advance in a recording medium. The program can be installed in a computer the recording medium, or can be installed in a recording medium such as a built-in hard disk by receiving the program through a network such as a local area network (LAN) and the internet.

Note that, various types of processing described in the specification may be executed not only in chronological order as described above, but also in parallel or individually, in accordance with processing capability of an apparatus executing the processing or necessity. In addition, herein, the system is a logical assembly configuration of a plurality of apparatuses, but the apparatuses of each configuration are not limited to be in the same housing.

INDUSTRIAL APPLICABILITY

As described above, according to the configuration of one example of the present disclosure, the configuration capable of recording MMT format data on a medium as BDAV format data and performing copy control according to the original copy control information is achieved.

Specifically, the MMT format data, for which copy control information is set, is input and recorded on an information recording medium as BDAV format data. As record data, (a) a stream file including a packet string in which the MMT format data is stored, and (b) copy control information corresponding to the stream file, in which the copy control information corresponding to the MMT format data is reflected, are generated and recorded as an additional header of a packet included in the stream file or as another file.

The configuration capable of reproducing the MMT format data by recording it on a medium as BDAV format data or SPAV format data is achieved.

According to this configuration, the configuration capable of recording the MMT format data on a medium as BDAV format data and performing copy control according to the original copy control information is achieved.

REFERENCE SIGNS LIST 20 transmission apparatus
21 broadcasting server
22 data distribution server
30 information processing apparatus
31 recording/reproducing apparatus
32 TV
33 PC
34 mobile terminal
40 information recording medium (medium)
41 BD
42 HDD
43 flash memory
280 usage control information file (Usage File)
400 information processing apparatus
401 data input unit
402 user input unit
403 control unit
404 storage unit
405 demultiplexer
406 record data generating unit
407 recording unit
408 drive
411 caption data generating unit
412 image data generating unit
413 sound data generating unit
414 auxiliary information generating unit
415 multiplexer
416 database file generating unit
420 information recording medium
451 data analyzing unit
452 additional header generating unit
453 stream-file-recording-control-information generating unit
454 database-file-record-information generating unit
455 usage-control-information-file-record-data generating unit
461 usage-control-information-file generating unit
500 information processing apparatus
501 control unit
502 input unit
503 communication unit
504 storage unit
505 output unit
506 first medium IF
507 data buffer
508 copy control information confirming unit
509 copy record data generating unit
510 second medium IF
521 first medium
522 second medium
601 CPU
602 ROM
603 RAM
604 bus
605 input and output interface 606 input unit
607 output unit
608 storage unit
609 communication unit
610 drive
611 removable medium

The invention claimed is:

1. An information processing apparatus, comprising:
a data processing unit configured to:
receive MPEG media transport (MMT) format data, wherein the MMT format data includes first copy control information;
generate, based on the MMT format data, record data in one of a Blu-ray Disc Audio-Video (BDAV) format or an SPAV format, wherein
each of the BDAV format and the SPAV format is a data record format with respect to an information recording medium,
the record data includes:
a stream file that includes one of an MMT protocol (MMTP) packet string or a type length value (TLV) packet string, wherein the one of the MMTP packet string or the TLV packet string includes:
the MMT format data as reproduction data; and
a plurality of packets; and
second copy control information corresponding to:
the plurality of packets of the stream file, and
the first copy control information of the MMT format data,
each packet of the plurality of packets of the stream file includes a specific header, and
the specific header includes attribute information of the reproduction data; and
store the second copy control information, for at least two packets of the plurality of packets, in a first additional header in the stream file, wherein the first additional header is different from the specific header of each packet of the plurality of packets.

2. The information processing apparatus according to claim 1, wherein the data processing unit is further configured to
store the second copy control information of each packet of the plurality of packets in one of a second additional header of a unit of fixed data length or a third additional header of a unit of variable data length.

3. The information processing apparatus according to claim 1, wherein the second copy control information corresponding to the stream file includes at least one of:
digital recording control information that indicates digital recording allowable information,
encryption information that indicates information of one of necessity of encryption of output copy data or unnecessity of the encryption of the output copy data, or
copy number restriction information that indicates a copy allowable number.

4. The information processing apparatus according to claim 1, wherein
the second copy control information corresponding to the stream file includes an encryption flag, and
the encryption flag indicates whether data in a packet of the at least two packets is one of encryption data or unencrypted data.

5. The information processing apparatus according to claim 1, wherein the data processing unit is further configured to:
generate an encryption key based on data of the first additional header; and
encrypt each packet of the at least two packets of the stream file based on the encryption key.

6. An information processing apparatus, comprising:
a data processing unit configured to:
control acquisition of record data from a first medium, wherein
the record data includes a stream file and copy control information of the stream file,
the stream file includes a first additional header and one of an MPEG media transport protocol (MMTP) packet string or a type length value (TLV) packet string,
the one of the MMTP packet string or the TLV packet string includes:
MPEG media transport (MMT) format data as reproduction data; and
a plurality of packets,
each packet of the plurality of packets of the stream file includes a specific header different from the first additional header,
the specific header includes attribute information of the reproduction data, and
the first additional header in the stream file includes the copy control information of at least two packets of the plurality of packets; and
execute copy control of the stream file based on the copy control information in the first additional header, wherein the execution of the copy control of the stream file corresponds to copy of the stream file on a second medium.

7. The information processing apparatus according to claim 6, wherein
the copy control information of each packet of the plurality of packets in the stream file is in one of a second additional header of a unit of fixed data length or a third additional header of a unit of variable data length, and
the data processing unit is further configured to:
acquire the copy control information from the one of the second additional header or the third additional header; and
execute the copy control of data subsequent to the one of the second additional header or the third additional header.

8. The information processing apparatus according to claim 6, wherein
the copy control information corresponding to the stream file includes at least one of:
digital recording control information that indicates digital recording allowable information,
encryption information that indicates information of one of necessity of encryption of output copy data or unnecessity of the encryption of the output copy data, or
copy number restriction information that indicates a copy allowable number, and
the data processing unit is further configured to execute the copy control based on each of the digital recording control information, the encryption information, and the copy number restriction information.

9. The information processing apparatus according to claim 6, wherein the copy control information corresponding to the stream file includes an encryption flag that indicates whether data in a packet of the at least two packets is one of encryption data or unencrypted data, and the data processing unit is further configured to determine, based on the encryption flag, whether the data in the packet is one of the encryption data or the unencrypted data.

10. The information processing apparatus according to claim 6, the data processing unit is further configured to:
update, based on the execution of the copy control, the copy control information recorded on the first medium; and
record the updated copy control information on the second medium.

11. The information processing apparatus according to claim 6, the data processing unit is further configured to:
generate an encryption key, in a unit of an encryption process, based on seed information of the acquired record data;
execute the encryption process in the unit of the encryption process, wherein the encryption process is executed based on the generated encryption key; and
record the record data on the second medium based on the execution of the encryption process.

12. The information processing apparatus according to claim 11, wherein the seed information is constituent data of one of the first additional header corresponding to each packet of the at least two packets, a second additional header of a unit of fixed data length, or a third additional header in a unit of variable data length.

13. A non-transitory computer-readable medium having stored thereon computer-executable instructions which, when executed by a processor, cause the processor to execute operations, the operations comprising:
storing a stream file and copy control information of the stream file, wherein
the stream file includes one of an MPEG media transport protocol (MMTP) packet string or a type length value (TLV) packet string,
the one of the MMTP packet string or the TLV packet string includes:
MPEG media transport (MMT) format data as reproduction data; and
a plurality of packets,
each packet of the plurality of packets of the stream file includes a specific header,
the specific header includes attribute information of the reproduction data,
the copy control information for at least two packets of the plurality of packets is stored in an additional header in the stream file, and
the additional header is different from the specific header of each packet of the plurality of packets; and
executing copy control of the stream file based on the copy control information in the additional header, wherein the execution of the copy control of the stream file is in a unit of packet of the plurality of packets in the stream file.

14. An information processing method, comprising:
receiving MPEG media transport (MMT) format data, wherein the MMT format data includes first copy control information;
generating, based on the MMT format data, record data in one of a Blu-ray Disc Audio-Video (BDAV) format or an SPAV format, wherein
each of the BDAV format and the SPAV format is a data record format with respect to an information recording medium,
the record data includes:
a stream file that includes one of the MMT protocol (MMTP) packet string or a type length value (TLV) packet string, wherein the one of the MMTP packet string or the TLV packet string includes:
the MMT format data is stored as reproduction data; and
a plurality of packets; and
second copy control information corresponding to:
the plurality of packets of the stream file, and
the first copy control information of the MMT format data,
each packet of the plurality of packets of the stream file includes a specific header, and
the specific header includes attribute information of the reproduction data; and
storing the second copy control information, for at least two packets of the plurality of packets, in an additional header in the stream file, wherein the additional header is different from the specific header of each packet of the plurality of packets.

15. An information processing method, comprising:
controlling acquisition of record data from a first medium, wherein
the record data includes a stream file and copy control information of the stream file,
the stream file includes an additional header and one of an MPEG media transport protocol (MMTP) packet string or a type length value (TLV) packet string,
the one of the MMTP packet string or the TLV packet string includes:
MPEG media transport (MMT) format data as reproduction data; and
a plurality of packets,
each packet of the plurality of packets of the stream file includes a specific header different from the additional header,
the specific header includes attribute information of the reproduction data, and
the additional header in the stream file includes the copy control information of at least two packets of the plurality of packets; and
executing copy control of the stream file based on the copy control information in the additional header, wherein the execution of the copy control of the stream file corresponds to copy of the stream file on a second medium.

16. A non-transitory computer-readable medium having stored thereon, computer-executable instructions which, when executed by a computer, cause the computer to execute operations, the operations comprising:
receiving MPEG media transport (MMT) format data, wherein the MMT format data includes first copy control information;
generating, based on the MMT format data, record data in one of a Blu-ray Disc Audio-Video (BDAV) format or an SPAV format, wherein
each of the BDAV format and the SPAV format is a data record format with respect to an information recording medium,
the record data includes:
a stream file that includes one of the MMT protocol (MMTP) packet string or a type length value (TLV) packet string, wherein the one of the MMTP packet string or the TLV packet string includes:
the MMT format data is stored as reproduction data; and
a plurality of packets; and
second copy control information corresponding to:
the plurality of packets of the stream file, and
the first copy control information of corresponding to the MMT format data,
each packet of the plurality of packets of the stream file includes a specific header, and
the specific header includes attribute information of the reproduction data; and
storing the second copy control information, for at least two packets of the plurality of packets, in an additional header in the stream file, wherein the additional header is different from the specific header of each packet of the plurality of packets.

17. A non-transitory computer-readable medium having stored thereon, computer-executable instructions which, when executed by a computer, cause the computer to execute operations, the operations comprising:
controlling acquisition of record data from a first medium, wherein
the record data includes a stream file and copy control information of the stream file,
the stream file includes an additional header and one of an MPEG media transport protocol (MMTP) packet string or a type length value (TLV) packet string,
the one of the MMTP packet string or the TLV packet string includes:
MPEG media transport (MMT) format data as reproduction data; and
a plurality of packets,
each packet of the plurality of packets of the stream file includes a specific header different from the additional header,
the specific header includes attribute information of the reproduction data, and
the additional header in the stream file includes the copy control information of at least two packets of the plurality of packets; and
executing copy control of the stream file based on the copy control information in the additional header, wherein the execution of the copy control of the stream file corresponds to copy of the stream file on a second medium.

* * * * *